United States Patent [19]
Nixon et al.

[11] Patent Number: 5,995,916
[45] Date of Patent: Nov. 30, 1999

[54] PROCESS CONTROL SYSTEM FOR MONITORING AND DISPLAYING DIAGNOSTIC INFORMATION OF MULTIPLE DISTRIBUTED DEVICES

[75] Inventors: Mark Nixon; Larry O. Jundt, both of Round Rock; Robert B. Havekost; Ron Ottenbacher, both of Austin, all of Tex.

[73] Assignee: Fisher-Rosemount Systems, Inc., Austin, Tex.

[21] Appl. No.: 08/631,557

[22] Filed: Apr. 12, 1996

[51] Int. Cl.$^6$ .............................. G06F 3/00; G06F 15/00
[52] U.S. Cl. .................... 702/182; 364/188; 364/468.24; 364/131; 395/182.09
[58] Field of Search .............................. 395/295, 200.14, 395/200.09, 182.09; 364/551.01, 131, 188, 473; 235/150.01; 702/182

[56] References Cited

U.S. PATENT DOCUMENTS

| | | | |
|---|---|---|---|
| 3,665,172 | 5/1972 | Spaargaren et al. | 235/150.1 |
| 4,302,820 | 11/1981 | Struger et al. | 364/900 |
| 4,639,852 | 1/1987 | Motomiya | 364/138 |
| 4,641,269 | 2/1987 | Japenga et al. | 364/473 |
| 4,663,704 | 5/1987 | Jones et al. | 364/188 |
| 4,672,530 | 6/1987 | Schuss | 364/133 |
| 5,129,087 | 7/1992 | Will | 395/650 |
| 5,134,574 | 7/1992 | Beaverstock et al. | 364/551.01 |
| 5,164,894 | 11/1992 | Cunningham-Reid et al. | 364/131 |
| 5,307,346 | 4/1994 | Fieldhouse | 370/85.1 |
| 5,371,895 | 12/1994 | Bristol | 395/800 |

(List continued on next page.)

OTHER PUBLICATIONS

John R. Gyorki, "PLC's drive standard buses", Machine Designs, May 11, 1995, pp. 83–90.

Moore Products Co., "Control System", POWER Apr. 1995, p. 11`4, vol. 139, No. 4, Copyright 1995, McGraw–Hill, Inc.

Moore Products Co., "Apacs Control System", POWER Jun., 1995, p. 81, vol. 139, No. 6, Copyright 1995, McGraw–Hill, Inc.

Robert R. Lyons, "New Telemecanique Programmable Controllers Feature Multiple Programming Languages", Telemacanique, Arlington Heights, IL, Feb. 11, 1995.

Clifford J. Peshek et al., "Recent Developments and Future Trends in PLC Programming Languages and Programming Tools for Real–Time Control", IEEE Cement Industry Technical Conference, May 1993, Toronto, Canada, pp. 219–230.

C.K. Duffer et al., "High–Level Control Language Customizes Application Programs", Power Technologies, Inc., IEEE Computer Applications in Power, ®Apr. 1991, pp. 15–18.

H.J. Beestermöller et al., "An online and offline programmable Multiple–Loop Controller for Distributed Systems", ®1994 IEEE, pp. 15–20.

*Primary Examiner*—Kamini Shah
*Attorney, Agent, or Firm*—Skjerven, Morrill, MacPherson, Franklin & Friel LLP; Ken J. Koestner

[57] ABSTRACT

A process control system includes a diagnostic monitoring and display functionality for viewing, in a coherent manner, diagnostic information relating to a process that operates over multiple devices and system components. Although the multiple devices and system components typically encompass widely different device types and operational standards, the process control system incorporates diagnostic information relating to all devices and presents this information to a system user in a uniform manner so that an operating control strategy and the diagnostic information are presented as though all control actions and diagnostic information were performed or generated at a single location. A user-defined diagnostic program is assembled as a set of function blocks and control modules and represented as a set of layers of interconnected control objects identified as modules which include informational structures accessed as attributes. Information is accessed using device hierarchy attribute addressing, supporting direct addressing of I/O signals from modules, bypassing the use of I/O function blocks and avoiding I/O function block behavior.

40 Claims, 31 Drawing Sheets

U.S. PATENT DOCUMENTS

| | | | |
|---|---|---|---|
| 5,432,711 | 7/1995 | Jackson et al. | 364/514 |
| 5,442,639 | 8/1995 | Crowder et al. | 370/20.1 |
| 5,444,851 | 8/1995 | Woest | 395/200.1 |
| 5,452,201 | 9/1995 | Pieronek et al. | 364/188 |
| 5,475,856 | 12/1995 | Kogge | 395/800 |
| 5,481,741 | 1/1996 | McKaskle et al. | 395/800 |
| 5,485,620 | 1/1996 | Sadre et al. | 395/700 |
| 5,491,791 | 2/1996 | Glowny et al. | 395/183.13 |
| 5,493,534 | 2/1996 | Mok | 365/226 |
| 5,504,902 | 4/1996 | McGrath et al. | 395/700 |
| 5,513,095 | 4/1996 | Pajonk | 364/131 |
| 5,530,643 | 6/1996 | Hodorowski | 364/191 |
| 5,549,137 | 8/1996 | Lenz et al. | 137/486 |
| 5,550,980 | 8/1996 | Pascucci et al. | 395/200.05 |
| 5,566,320 | 10/1996 | Hubert | 395/424 |
| 5,576,946 | 11/1996 | Bender et al. | 364/146 |
| 5,623,592 | 4/1997 | Carlson et al. | 395/348 |
| 5,801,942 | 9/1998 | Mark et al. | 364/188 |
| 5,828,851 | 10/1998 | Mark et al. | 395/285 |
| 5,862,052 | 1/1999 | Andrew et al. | 364/188 |

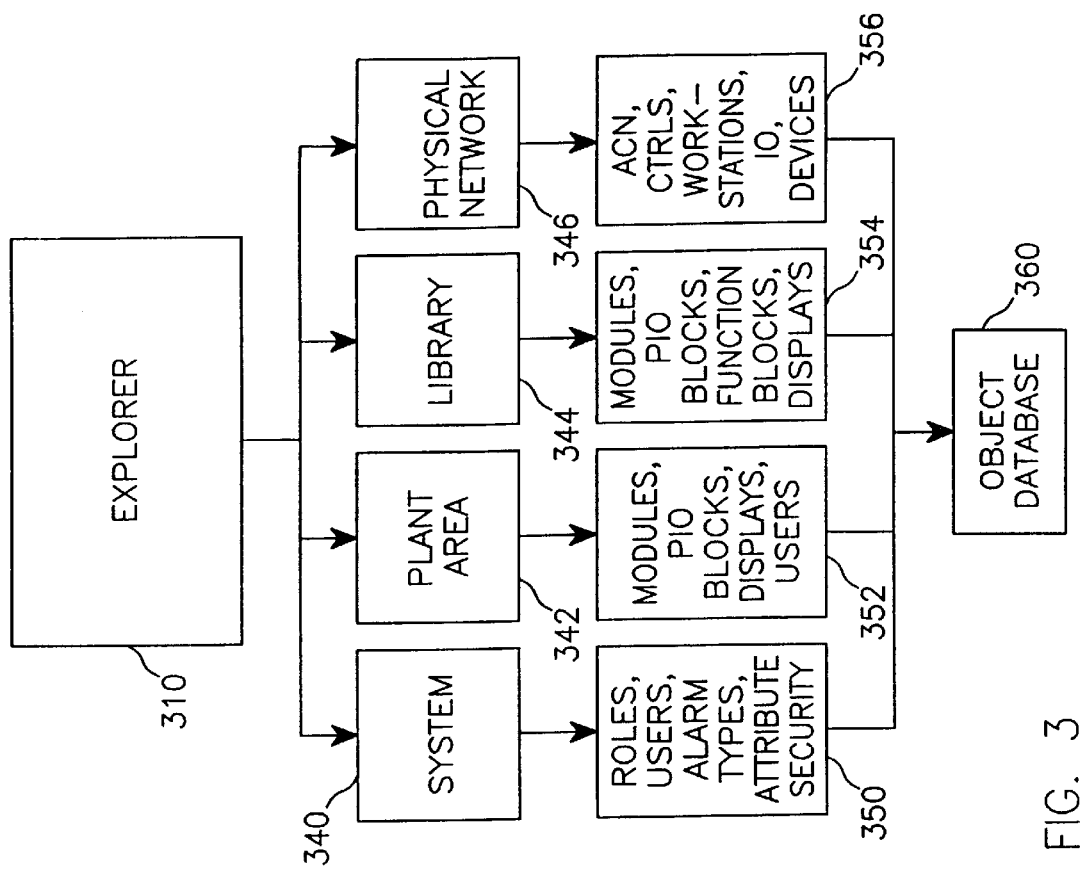
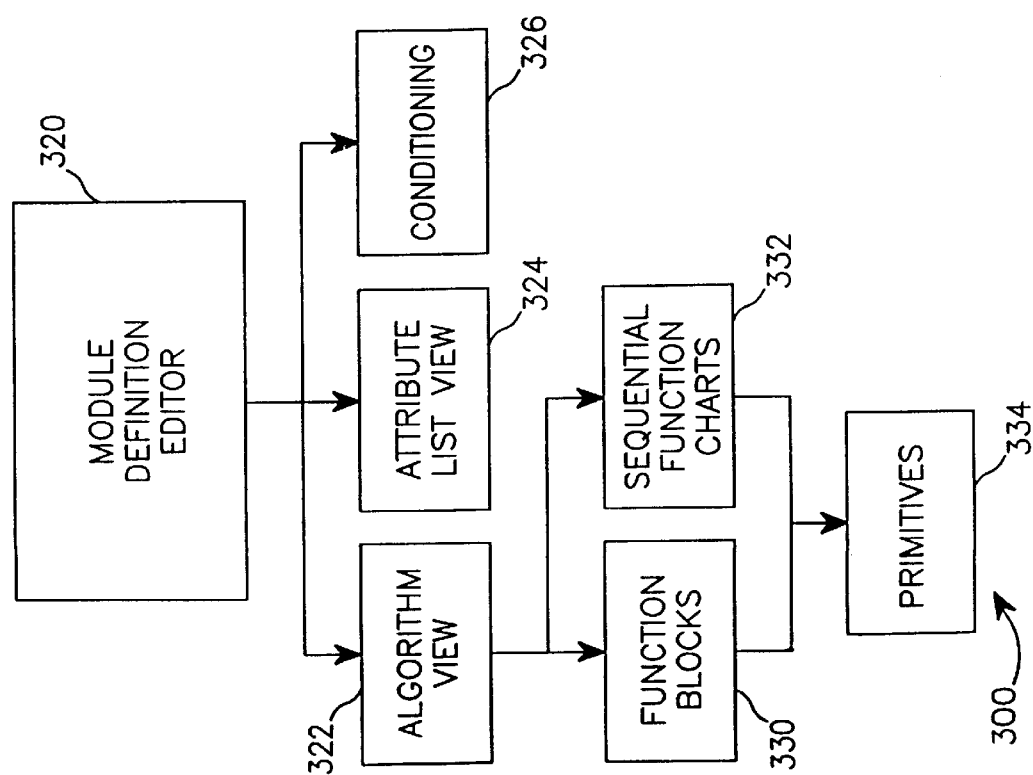
FIG. 3

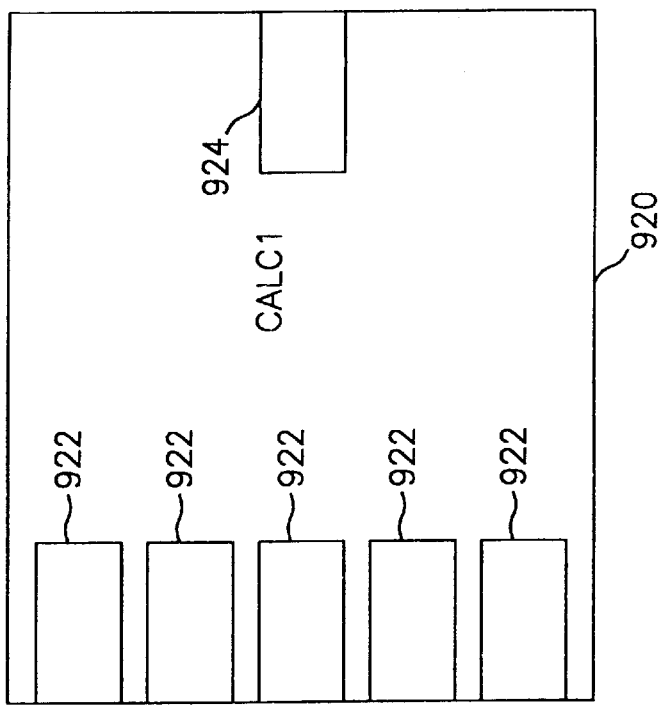
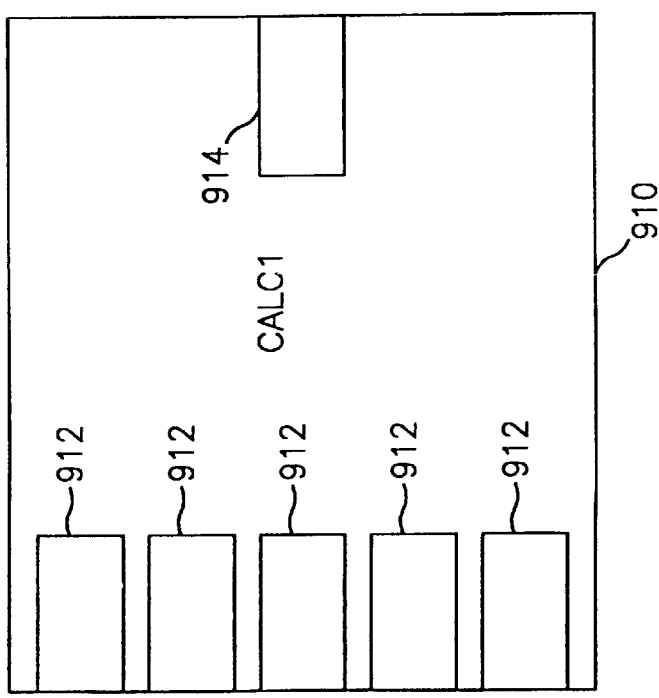
FIG. 9

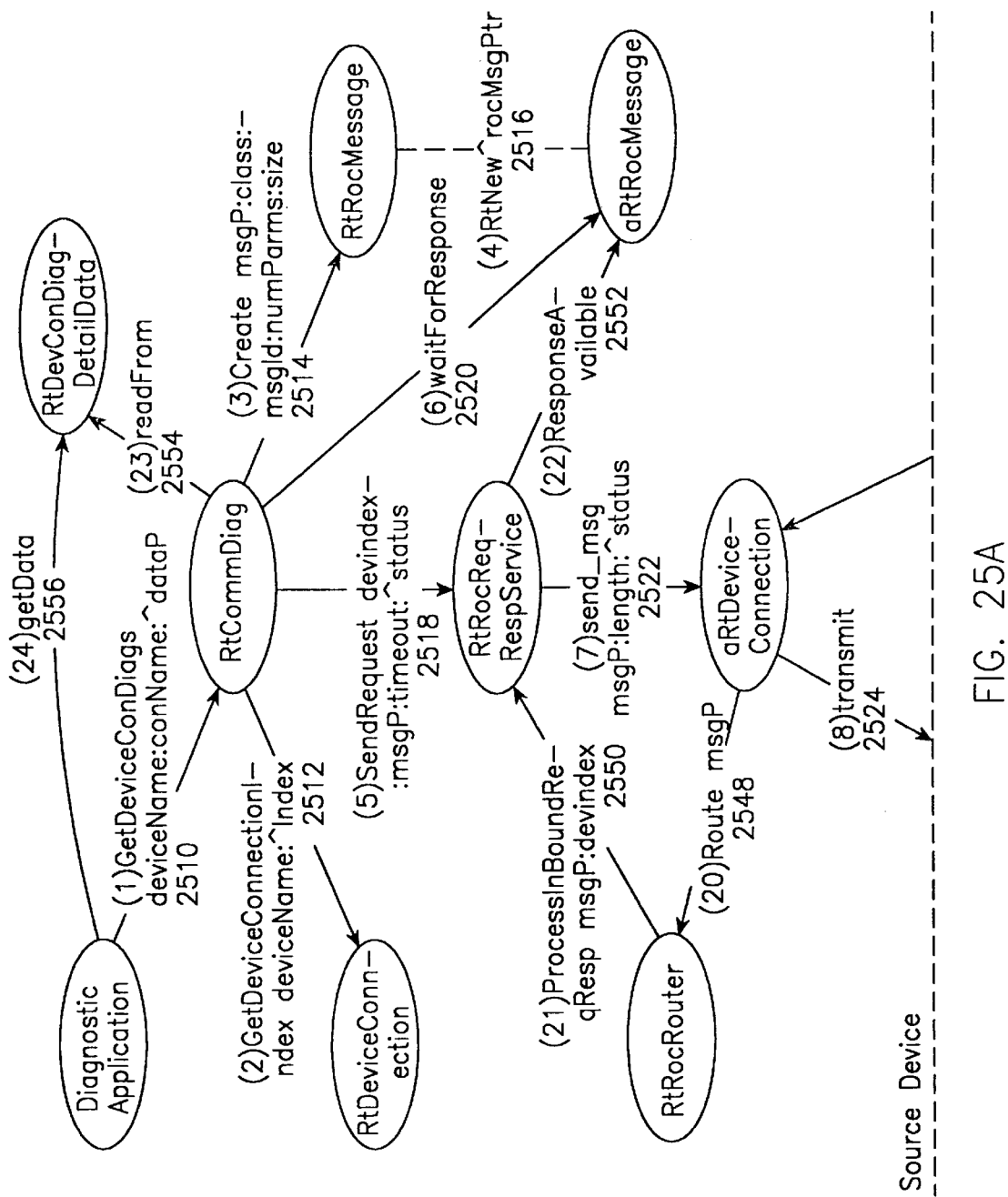
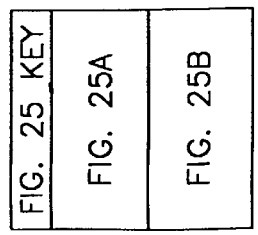
FIG. 25A

PROCESS CONTROL SYSTEM FOR MONITORING AND DISPLAYING DIAGNOSTIC INFORMATION OF MULTIPLE DISTRIBUTED DEVICES

CROSS-REFERENCE TO RELATED APPLICATIONS

This application is related to copending application by Nixon et al., entitled "A Process Control System Using Standard Protocol Control of Standard Devices and Nonstandard Devices", filed on even date herewith, U.S. patent application Ser. No. 08/631,862, which application is hereby incorporated by reference in its entirety, including any appendices and references thereto.

This application is related to copending application by Nixon et al., entitled "A Process Control System for Versatile Control of Multiple Process Devices of Various Device Types", filed on even date herewith, U.S. patent application Ser. No. 08/631,521, which application is hereby incorporated by reference in its entirety, including any appendices and references thereto.

This application is related to copending application by Nixon et al., entitled "Process Control System Including Automatic Sensing and Automatic Configuration of Devices", filed on even date herewith, U.S. patent application Ser. No. 08/631,519, which application is hereby incorporated by reference in its entirety, including any appendices and references thereto.

This application is related to copending application by Nixon et al., entitled "A Process Control System User Interface Including Selection of Multiple Control Languages", filed on even date herewith, U.S. patent application Ser. No. 08/631,517, which application is hereby incorporated by reference in its entirety, including any appendices and references thereto.

This application is related to copending application by Dove, entitled "System for Assisting Configuring a Process Control Environment", filed on even date herewith, U.S. patent application Ser. No. 08/631,458, which application is hereby incorporated by reference in its entirety, including any appendices and references thereto.

This application is related to copending application by Nixon et al., entitled "Process Control System Using a Control Strategy Implemented in a Layered Hierarchy of Control Modules", filed on even date herewith, U.S. patent application Ser. No. 08/631,520, which application is hereby incorporated by reference in its entirety, including any appendices and references thereto.

This application is related to copending application by Dove et al., entitled "System for Configuring a Process Control Environment", filed on even date herewith, U.S. patent application Ser. No. 08/631,863, which application is hereby incorporated by reference in its entirety, including any appendices and references thereto.

This application is related to copending application by Nixon et al., entitled "A Process Control System Using a Process Control Strategy Distributed Among Multiple Control Elements", filed on even date herewith, U.S. patent application Ser. No. 08/631,518, which application is hereby incorporated by reference in its entirety, including any appendices and references thereto.

This application is related to copending application by Nixon et al., entitled "Improved Process System", filed on even date herewith, U.S. Provisional Patent Application No. 60/007,700, which application is hereby incorporated by reference in its entirety, including any appendices and references thereto.

BACKGROUND OF THE INVENTION

1. Field of the Invention

This invention relates to process control systems. More specifically, the present invention relates to a process control system which monitors and uniformly displays diagnostic information of devices of multiple different types.

2. Description of the Related Art

Present-day process control systems use instruments, control devices and communication systems to monitor and manipulate control elements, such as valves and switches, to maintain at selected target values one or more process variables, including temperature, pressure, flow and the like. The process variables are selected and controlled to achieve a desired process objective, such as attaining the safe and efficient operation of machines and equipment utilized in the process. Process control systems have widespread application in the automation of industrial processes such as the processes used in chemical, petroleum, and manufacturing industries, for example.

Control of the process is often implemented using microprocessor-based controllers, computers or workstations which monitor the process by sending and receiving commands and data to hardware devices to control either a particular aspect of the process or the entire process as a whole. The specific process control functions that are implemented by software programs in these microprocessors, computers or workstations may be individually designed, modified or changed through programming while requiring no modifications to the hardware. For example, an engineer might cause a program to be written to have the controller read a fluid level from a level sensor in a tank, compare the tank level with a predetermined desired level, and then open or close a feed valve based on whether the read level was lower or higher than the predetermined, desired level. The parameters are easily changed by displaying a selected view of the process and then by modifying the program using the selected view. The engineer typically would change parameters by displaying and modifying an engineer's view of the process.

In addition to executing control processes, software programs also monitor and display a view of the processes, providing feedback in the form of an operator's display or view regarding the status of particular processes. The monitoring software programs also signal an alarm when a problem occurs. Some programs display instructions or suggestions to an operator when a problem occurs. The operator who is responsible for the control process needs to view the process from his point of view. A display or console is typically provided as the interface between the microprocessor based controller or computer performing the process control function and the operator and also between the programmer or engineer and the microprocessor based controller or computer performing the process control function.

Diagnostic information is one type of information that is useful to monitor and display in a process control system. However with the various types of devices in a process control system, including a wide variety of field devices, diagnostic information is not generally monitored in a consistent manner from one device to the next. Furthermore, important diagnostic information typically relates to the interaction of multiple portions of the control system, for example, the combined operations of a controller and device or multiple devices and controllers. Diagnostic information relating to multiple circuits in a system is typically not handled by existing process control systems.

Diagnostic information is most useful when related to the various control operations that are occurring when the diagnostic information is monitored. Conventional process control systems typically access and display diagnostic information with no relation to the control operations or control schemes that are functioning during diagnostic testing.

One problem associated with the use of graphical views for diagnostic displays is that existing systems allow only the equipment manufacturer, not a user of this equipment, to define the diagnostic information to be monitored, along with associated graphical views, or modify the predefined diagnostic functions within the provided library.

What is needed is a uniform or universal design environment that can easily be used, not only by a designer or manufacturer but also a user, to customize monitoring and display of diagnostic operations for a variable number and type of devices and components of a process control system. What is further needed is a personal computer-based process control system that includes a flexible diagnostic monitoring and display functionality that is easily implemented within substantially any size process and which is updated by users, without the aid of the control system designer, to monitor and display diagnostic information for various combinations of process field devices.

SUMMARY OF THE INVENTION

In accordance with the present invention, a process control system includes a diagnostic monitoring and display functionality for viewing, in a coherent manner, diagnostic information relating to a process that operates over multiple devices and system components. Although the multiple devices and system components typically encompass widely different device types and operational standards, the process control system incorporates diagnostic information relating to all devices and presents this information to a system user in a uniform manner so that an operating control strategy and the diagnostic information are presented as though all control actions and diagnostic information were performed or generated at a single location. A user-defined diagnostic program is assembled as a set of function blocks and control modules and represented as a set of layers of interconnected control objects identified as modules which include informational structures accessed as attributes. Information is accessed using device hierarchy attribute addressing, supporting direct addressing of I/O signals from modules, bypassing the use of I/O function blocks and avoiding I/O function block behavior.

In accordance with one embodiment of the present invention, a process control system includes a field device supplying a source of diagnostic information, a controller connected to the field device, a workstation connected to the controller and including a user interface and a software system implementing a diagnostic monitoring and display program for the process control system. The diagnostic monitoring and display program include a plurality of diagnostic modules selectively apportioned from the diagnostic monitoring and display program and selectively distributed among the field device, the controller and the workstation. The diagnostic modules operating mutually independently and in parallel accessing the source of diagnostic information. The process control system also includes a display routine for accessing diagnostic information from the plurality of diagnostic modules and displaying the diagnostic information accessed from the plurality of diagnostic modules uniformly for all diagnostic modules in the process control system so that the diagnostic information relating to a process that operates both in the controller and in the field device is displayed in the same manner regardless of the source of the diagnostic information.

In accordance with another embodiment of the invention, a process control system includes a field device supplying a source of diagnostic information, a controller connected to the field device, a workstation connected to the controller and including a user interface and a software system implementing a diagnostic monitoring and display program for the process control system. The diagnostic monitoring and display program includes a plurality of control modules for selectively implementing a process control strategy, a plurality of diagnostic modules selectively apportioned from the diagnostic monitoring and display program and selectively distributed among the field device, the controller and the workstation. The diagnostic modules operate mutually independently and access the source of diagnostic information in parallel. The diagnostic monitoring and display program include a display routine for accessing diagnostic information from the plurality of diagnostic modules and for accessing a control scheme from the plurality of control modules. The display routine respectively displays the diagnostic information accessed from the plurality of diagnostic modules and the control strategy accessed from the plurality of control modules so that the diagnostic information and the control information are accessed in the same manner.

Many advantages are achieved using the described process control method. One advantage is that the control scheme and the diagnostic monitoring are configured in the system in the same manner, saving system resources and improving system reliability. Another advantage is that configuration of the diagnostics is highly versatile, achieving a wide range of diagnostic behaviors. A further advantage is that the same display objects and procedures are used to display all types of information including configuration information, status information, diagnostics and virtually any other information generated or stored in the system.

BRIEF DESCRIPTION OF THE DRAWINGS

The features of the invention believed to be novel are specifically set forth in the appended claims. However, the invention itself, both as to its structure and method of operation, may best be understood by referring to the following description and accompanying drawings.

FIG. 3 is a block diagram illustrating a user interface for usage with both configuration and run-time models of the process control environment.

FIG. 9 is a block diagram showing a module instance, specifically a control module instance, which is created in accordance with the control module definition depicted in FIG. 8.

DETAILED DESCRIPTION OF THE PREFERRED EMBODIMENTS

Figure 1A:
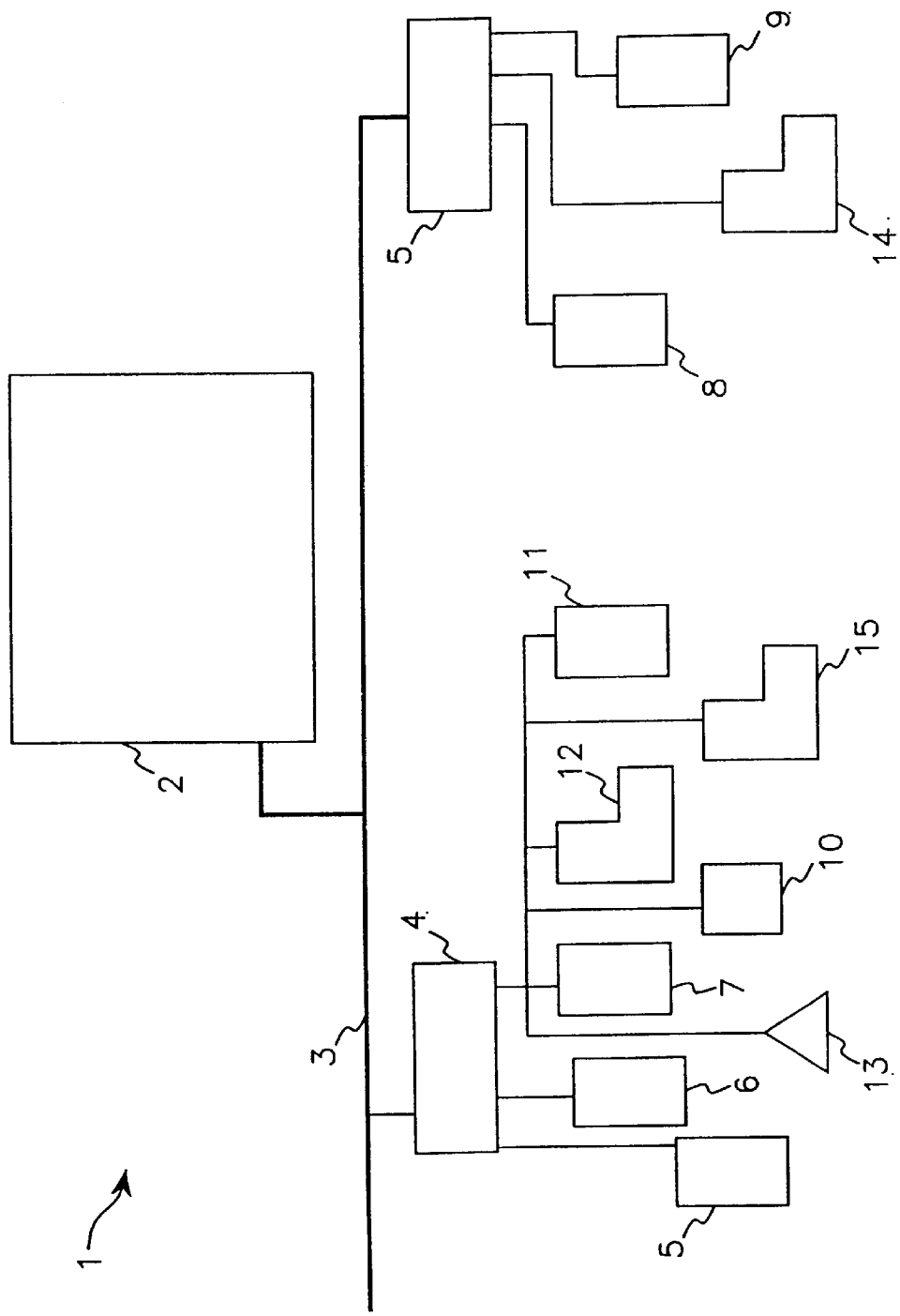
FIGS. 1A, 1B and 1C illustrate a screen display, a first schematic block diagram and a second schematic block diagram, respectively, process control systems in accordance with a generalized embodiment of the present invention which furnishes a capability to create a new control template and a capability to modify an existing control template for only one view, such as an engineering view.

Referring to FIG. 1A, a control system is shown. In general, the system 1 includes a main processing device, such as personal computer 2, that is connected to a local area network ("LAN") 3 via a local area network card. Although any local area network protocol may be used, a non-proprietary Ethernet protocol is beneficial in many applications because it allows for communications with the local area network 3. The local area network 3 is dedicated to carrying control parameters, control data and other relevant information concerned in the process control system. As such, the LAN 3 may be referred to as an area controlled network or ACN 3. The ACN 3 may be connected to other LANs for sharing information and data via a hub or gateway without affecting the dedicated nature of ACN 3.

In accordance with standard Ethernet protocol, a plurality of physical devices may be connected to the ACN 3 at various "nodes." Each physical device connected to the ACN 3 is connected at a node and each node is separately addressable according the LAN protocol used to implement ACN 3.

To establish a redundant system, it may be desirable to construct ACN 3 from two or more Ethernet systems such that the failure of a single Ethernet or LAN system will not result in the failure of the entire system. When such "redundant Ethernets" are used the failure of one Ethernet LAN can be detected and an alternate Ethernet LAN can be mapped in to provide for the desired functionality of ACN 3.

The main personal computer ("PC") A forms a node on the ACN 3. The PC 2 may, for example, be a standard personal computer running a standard operating system such as Microsoft's Window NT system. Main PC 2 is configured to generate, in response to user input commands, various control routines that are provided via the ACN 3 to one or more local controllers identified as element 4 and 5 which implement the control strategy defined by the control routines selected and established in main PC 2. Main PC 2 may also be configured to implement direct control routines on field devices such as pumps, valves, motors and the like via transmission across the ACN 3, rather than through a local controller 4 or 5.

Local controllers 4 and 5 receive control routines and other configuration data through the ACN 3 from PC 2. The local controllers then generate signals of various types to various field devices (such as pumps, motors, regulator valves, etc.) 6 through 15 which actually implement and perform physical steps in the field to implement the control system established by the routines provided by PC 2.

Two types of field devices may be connected to local controller 4 and 5 including field devices 6 through 10 which are responsive to specific control protocol such as FieldBus, Profibus and the like. As those in the art will appreciate, there are standard control protocols (e.g. FieldBus) according to which specific protocol instructions are provided to a protocol-friendly field devices (e.g., a Fieldbus field devices) will cause a controller located within the field device to implement a specific function corresponding to the protocol function. Accordingly, field devices 6 through 11 receive protocol specific (e.g., FieldBus) control commands from either the local controllers 4 and 5 or the personal computer 2 to implement a field device-specific function.

Also connected to local controllers 4 and 5 are non-protocol field devices 12 through 15, which are referred to as non-protocol because they do not include any local processing power and can respond to direct control signals. Accordingly, field devices 12 through 15 are not capable of implementing functions that would be defined by specific control protocol such as the FieldBus control protocol.

Functionality is supplied to allow the non-protocol field devices 12 through 15 to operate as protocol-friendly (e.g., FieldBus specific) devices 6 through 11. Additionally, this same functionality allows for the implementation of the protocol-specific control routines to be distributed between the local field devices 6 through 11, the local controllers 4 and 5 and the personal computer 2.

Figure 1B:
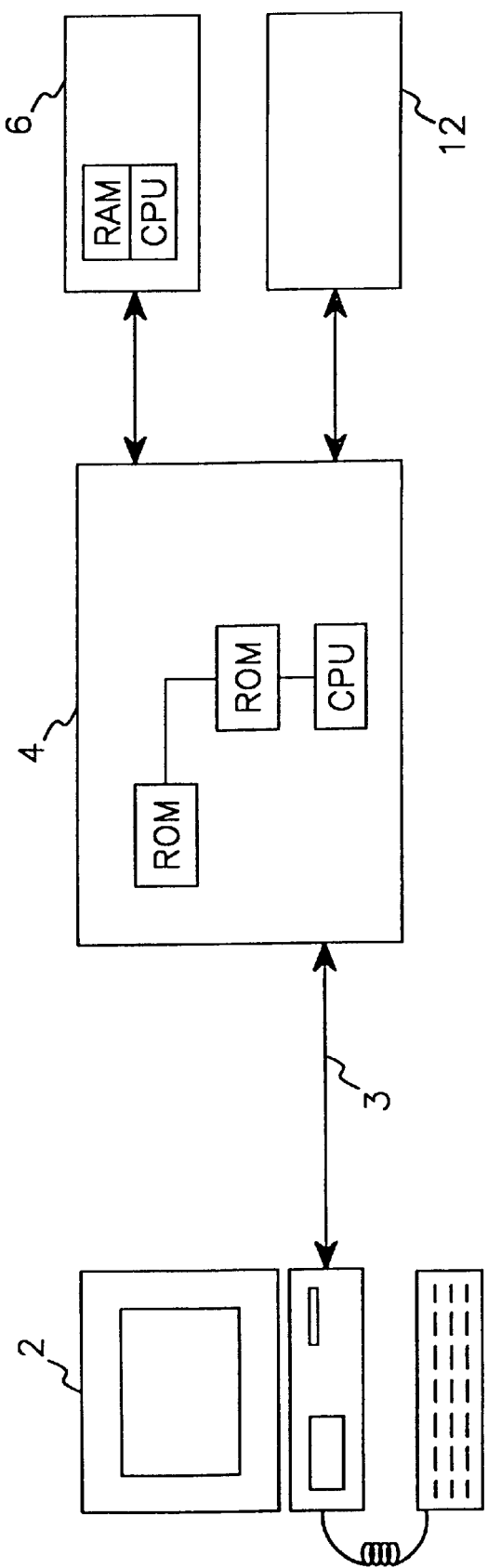

The distribution of protocol-specific control routines is illustrated in more detail in FIG. 1B. FIG. 1B refers to one portion of the system shown in FIG. 1A, specifically the personal computer 2, the Ethernet 3, local controller 4, a smart field device 6 and a dumb device 12, in greater detail.

Personal computer 2 includes program software routines for implementing standard functional routines of a standard control protocol such as the FieldBus protocol. Accordingly, personal computer 2 is programmed to receive FieldBus commands and to implement all of the functional routines for which a local field device having Fieldbus capabilities could implement. The ability and steps required to program personal computer 2 to implement FieldBus block functionality will be clearly apparent to one of ordinary skill in the art.

Connected to personal computer 2 by the Ethernet 3 is local controller 4. Local controller 4 includes a central processing unit connected to a random access memory which provides control signals to configure the central processing unit to implement appropriate operational functions. A read only memory is connected to the random access memory. The read only memory is programmed to include control routines which can configure the central processing unit to implement all of the functional routines of a standard control protocol such as FieldBus. Personal computer 2 sends signals through Ethernet 3 to the local controller 4 which causes one, more or all of the programmer routines in the read only memory to be transferred to the random access memory to configure the CPU to implement one, more or all of the standard control protocol routines such as the Field-Bus routines.

The smart field device 6 includes a central processing unit which implements certain control functions. If the devices is, for example, a FieldBus device then the central processing unit associated with the field device 6 is capable of implementing all of the FieldBus functionality requirements.

Because the local controller 4 has the ability to implement FieldBus specific controls, controller 4 operates so that non-protocol device 12 acts and is operated as a FieldBus device. For example, if a control routine is running either in personal computer 2 or on the CPU of local controller 4, that control routine can implement and provide FieldBus commands to FieldBus device 6 and non-protocol device 12, operating as a Fieldbus device. Since field device 6 is a FieldBus device, device 6 receives these commands and thereby implements the control functionality dictated by those commands. Non-protocol device 12, however, works in conjunction with the central processing unit of local controller 4 to implement the FieldBus requirements such that the local controller in combination with the field device implements and operates FieldBus commands.

In addition to allowing non-FieldBus device 12 to act and operate as a FieldBus device, the described aspect allows for distribution of FieldBus control routines throughout the system 1 shown in FIG. 1A. For example, to the extent that a control routine initially requests field device 6 to implement more than one FieldBus control routine, the system 1 allows for control to be divided between the local controller 4 and the local controller 5 such that a portion of the FieldBus control routines are being implemented by local controller 5 and other FieldBus routines are implemented by the use of the FieldBus routines stored on local controller 4. The division of FieldBus routine implementation may allow for more sophisticated and faster control and more efficient utilization of the overall processing power of the system. Still further, the fact that personal computer 2 has the ability to implement FieldBus control routines, the FieldBus routines are further distributed between the local controller 4 and the personal computer 2. In this manner, the system allows personal computer 2 to implement one or all of the FieldBus routines for a particular control algorithm.

Still further, the system allows for the implementation of FieldBus controls to a non-FieldBus device connected directly to the Ethernet 3 through use of the FieldBus control routines stored on personal computer 2 in the same manner that FieldBus routines are implemented on non-FieldBus device 12 through use on the FieldBus routines stored on local controller 4.

Figure 1C:
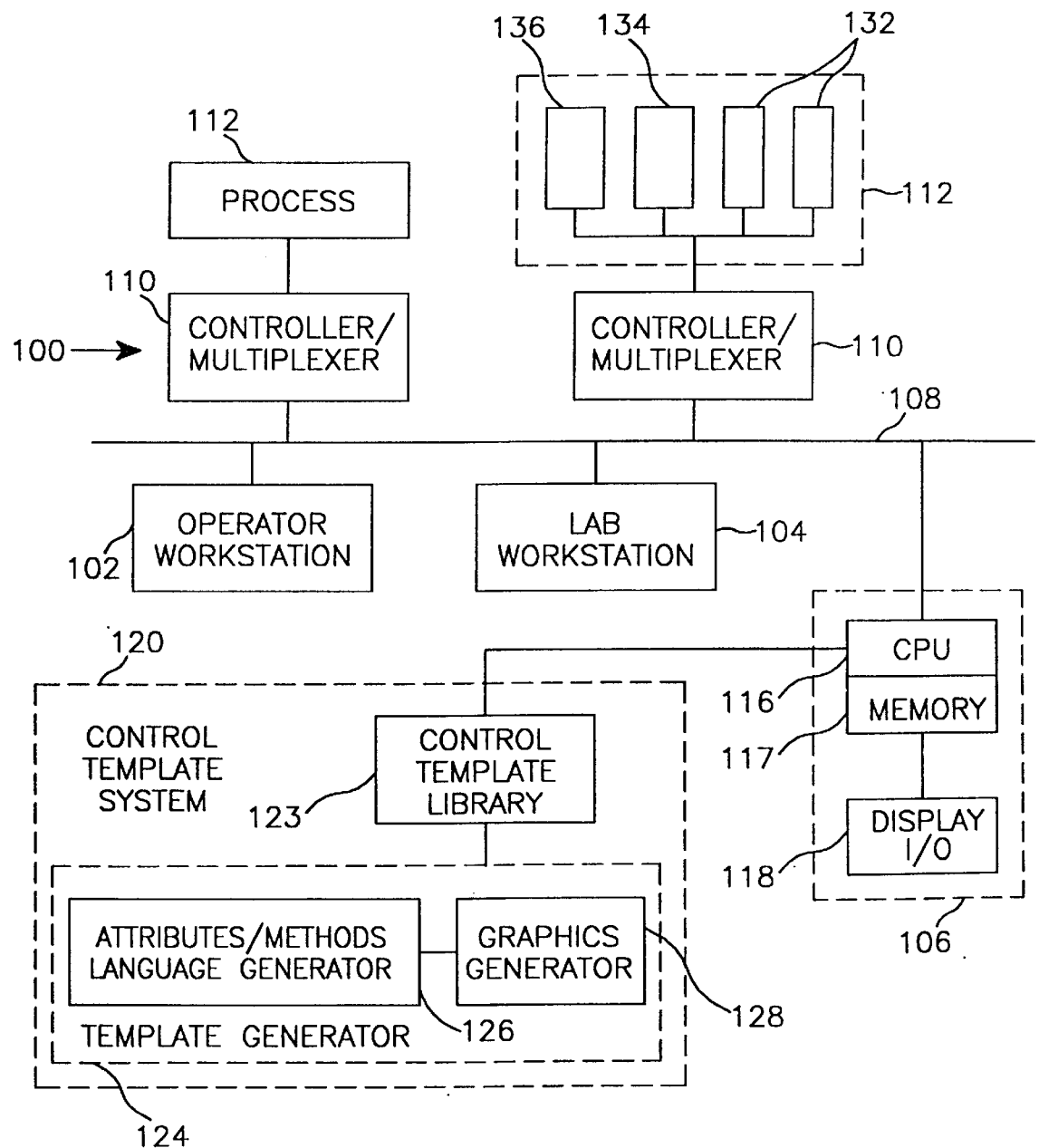

A process control environment 100 is shown in FIG. 1C and illustrates a control environment for implementing a digital control system, process controller or the like. The process control environment 100 includes an operator workstation 102, a laboratory workstation 104, and an engineering workstation 106 electrically interconnected by a local area network ("LAN") 108 for transferring and receiving data and control signals among the various workstations and a plurality of controller/multiplexers 110. The workstations 102, 104, 106 are shown connected by the LAN 108 to a plurality of the controller/multiplexers 110 that electrically interface between the workstations and a plurality of processes 112. In multiple various embodiments, the LAN 108 includes a single workstation connected directly to a controller/multiplexer 110 or alternatively includes a plurality of workstations, for example three workstations 102, 104, 106, and many controller/multiplexers 110 depending upon the purposes and requirements of the process control environment 100. In some embodiments, a single process controller/multiplexer 110 controls several different processes 112 or alternatively controls a portion of a single process.

In the process control environment 100, a process control strategy is developed by creating a software control solution on the engineering workstation 106, for example, and transferring the solution via the LAN 108 to the operator workstation 102, lab workstation 104, and to controller/multiplexer 110 for execution. The operator workstation 102 and lab workstation 104 supply interface displays to the control/monitor strategy implemented in the controller/multiplexer 110 and communicates to one or more of the controller/multiplexers 110 to view the processes 112 and change control attribute values according to the requirements of the designed solution. The processes 112 are formed from one or more field devices, which may be smart field devices or conventional (non-smart) field devices. The process 112 is illustratively depicted as two Fieldbus devices 132, a HART (highway addressable remote transducer) device 134 and a conventional field device 136.

In addition, the operator workstation 102 and lab workstation 104 communicate visual and audio feedback to the operator regarding the status and conditions of the controlled processes 112. The engineering workstation 106 includes a central processing unit (CPU) 116 and a display and input/output or user-interface device 118 such as a keyboard, light pen and the like. The CPU 116 typically includes a dedicated memory 117. The dedicated memory 117 includes a digital control system program (not shown) that executes on the CPU 116 to implement control operations and functions of the process control environment 100. The operator workstation 102, the lab workstation 104 and other workstations (not shown) within the process control environment 100 include at least one central processing unit (not shown) which is electrically connected to a display (not shown) and a user-interface device (not shown) to allow interaction between a user and the CPU. In one embodiment, the process control environment 100 includes workstations implemented using a Motorola 68040 processor and a Motorola 68360 communications processor running in companion mode with the 68040 with primary and secondary Ethernet ports driven by the 68360 processor (SCC1 and SCC3 respectively).

The process control environment 100 also includes a template generator 124 and a control template library 123 which, in combination, form a control template system 120. A control template is defined as the grouping of attribute functions that are used to control a process and the methodology used for a particular process control function, the control attributes, variables, inputs, and outputs for the particular function and the graphical views of the function as needed such as an engineer view and an operator view.

The control template system 120 includes the control template library 123 that communicates with the template generator 124. The control template library 123 contains data representing sets of predefined or existing control template functions for use in process control programs. The control template functions are the templates that generally come with the system from the system designer to the user. The template generator 124 is an interface that advantageously allows a user to create new control template functions or modify existing control template functions. The created and modified template functions are selectively stored in the control template library 123.

The template generator 124 includes an attributes and methods language generator 126 and a graphics generator 128. The attributes and methods language generator 126 supplies display screens that allow the user to define a plurality of attribute functions associated with the creation of a new control template function or modification of a particular existing control template function, such as inputs, outputs, and other attributes, as well as providing display screens for enabling the user to select methods or programs that perform the new or modified function for the particular control template. The graphics generator 128 furnishes a user capability to design graphical views to be associated with particular control templates. A user utilizes the data stored by the attributes and methods language generator 126 and the graphics generator 128 to completely define the attributes, methods, and graphical views for a control template. The data representing the created control template function is generally stored in the control template library 123 and is subsequently available for selection and usage by an engineer for the design of process control solutions.

The process control environment 100 is implemented using an object-oriented framework. An object-oriented framework uses object-oriented concepts such as class hierarchies, object states and object behavior. These concepts, which are briefly discussed below, are well known in the art. Additionally, an object-oriented framework may be written using object-oriented programming languages, such as the C++ programming language, which are well-known in the art, or may be written, as is the case with the preferred embodiment, using a non-object programming language such as C and implementing an object-oriented framework in that language.

The building block of an object-oriented framework is an object. An object is defined by a state and a behavior. The state of an object is set forth by fields of the object. The behavior of an object is set forth by methods of the object. Each object is an instance of a class, which provides a template for the object. A class defines zero or more fields and zero or more methods.

Fields are data structures which contain information defining a portion of the state of an object. Objects which are instances of the same class have the same fields. However, the particular information contained within the fields of the objects can vary from object to object. Each field can contain information that is direct, such as an integer value, or indirect, such as a reference to another object.

A method is a collection of computer instructions which can be executed in CPU 116 by computer system software. The instructions of a method are executed, i.e., the method is performed, when software requests that the object for which the method is defined perform the method. A method can be performed by any object that is a member of the class that includes the method. The particular object performing the method is the responder or the responding object. When performing the method, the responder consumes one or more arguments, i.e., input data, and produces zero or one result, i.e., an object returned as output data The methods for a particular object define the behavior of that object.

Classes of an object-oriented framework are organized in a class hierarchy. In a class hierarchy, a class inherits the fields and methods which are defined by the superclasses of that class. Additionally, the fields and methods defined by a class are inherited by any subclasses of the class. I.e., an instance of a subclass includes the fields defined by the superclass and can perform the methods defined by the superclass. Accordingly, when a method of an object is called, the method that is accessed may be defined in the class of which the object is a member or in any one of the superclasses of the class of which the object is a member. When a method of an object is called, process control environment 100 selects the method to run by examining the class of the object and, if necessary, any superclasses of the object.

A subclass may override or supersede a method definition which is inherited from a superclass to enhance or change the behavior of the subclass. However, a subclass may not supersede the signature of the method. The signature of a method includes the method's identifier, the number and type of arguments, whether a result is returned, and, if so, the type of the result. The subclass supersedes an inherited method definition by redefining the computer instructions which are carried out in performance of the method.

Classes which are capable of having instances are concrete classes. Classes which cannot have instances are abstract classes. Abstract classes may define fields and methods which are inherited by subclasses of the abstract classes. The subclasses of an abstract class may be other abstract classes; however, ultimately, within the class hierarchy, the subclasses are concrete classes.

All classes defined in the disclosed preferred embodiment, except for mix-in classes which are described below, are subclasses of a class, Object. Thus, each class that is described herein and which is not a mix-in class inherits the methods and fields of class Object.

Figure 2:
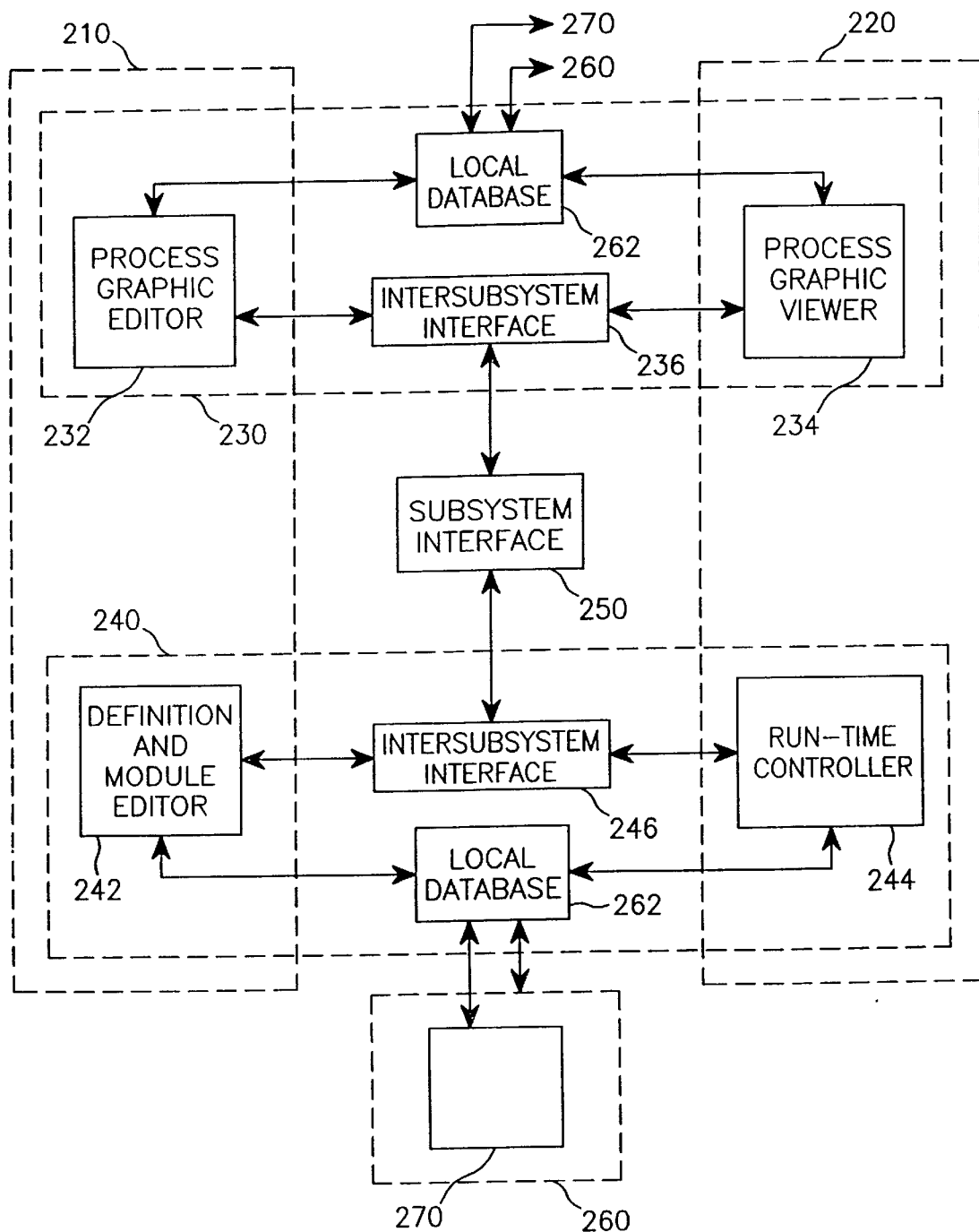
FIG. 2 is a schematic block diagram showing the process control environment in a configuration implementation and a run-time implementation.

The process control environment 100 exists in a configuration model or configuration implementation 210 and a run-time model or run-time implementation 220 shown in FIG. 2. In the configuration implementation 210, the component devices, objects, interconnections and interrelationships within the process control environment 100 are defined. In the run-time implementation 220, operations of the various component devices, objects, interconnections and interrelationships are performed. The configuration implementation 210 and the run-time implementation 220 are interconnected by downloading. The download language creates system objects according to definitions supplied by a user and creates instances from the supplied definitions. Specifically, a completely configured Device Table relating to each device is downloaded to all Workstations on startup and when the Device Table is changed. For controller/ multiplexers 110, a downloaded Device Table only includes data for devices for which the controller/multiplexer 110 is to initiate communications based on remote module data configured and used in the specific controller/multiplexer 110. The Device Table is downloaded to the controller/ multiplexer 110 when other configuration data is downloaded. In addition to downloading definitions, the download language also uploads instances and instance values. The configuration implementation 210 is activated to execute in the run-time implementation 220 using an installation procedure. Also, network communications parameters are downloaded to each device when configuration data are downloaded and when a value is changed.

The process control environment 100 includes multiple subsystems with several of the subsystems having both a configuration and a run-time implementation. For example, a process graphic subsystem 230 supplies user-defined views and operator interfacing to the architecture of the process control environment 100. The process graphic subsystem 230 has a process graphic editor 232, a part of the configuration implementation 210, and a process graphic viewer 234, a portion of the run-time implementation 220. The process graphic editor 232 is connected to the process graphic viewer 234 by an intersubsystem interface 236 in the download language. The process control environment 100 also includes a control subsystem 240 which configures and installs control modules and equipment modules in a definition and module editor 242 and which executes the control modules and the equipment modules in a run-time controller 244. The definition and module editor 242 operates within the configuration implementation 210 and the run-time controller 244 operates within the run-time implementation 220 to supply continuous and sequencing control functions. The definition and module editor 242 is connected to the run-time controller 244 by an intersubsystem interface 246 in the download language. The multiple subsystems are interconnected by a subsystem interface 250.

The configuration implementation 210 and the run-time implementation 220 interface to a master database 260 to support access to common data structures. Various local (non-master) databases 262 interface to the master database 260, for example, to transfer configuration data from the master database 260 to the local databases 262 as directed by a user. Part of the master database 260 is a persistent database 270. The persistent database 270 is an object which transcends time so that the database continues to exist after the creator of the database no longer exists and transcends space so that the database is removable to an address space that is different from the address space at which the database was created. The entire configuration implementation 210 is stored in the persistent database 270.

The master database 260 and local databases 262 are accessible so that documentation of configurations, statistics and diagnostics are available for documentation purposes.

The run-time implementation 220 interfaces to the persistent database 270 and to local databases 262 to access data structures formed by the configuration implementation 210. In particular, the run-time implementation 220 fetches selected equipment modules, displays and the like from the local databases 262 and the persistent database 270. The run-time implementation 220 interfaces to other subsystems to install definitions, thereby installing objects that are used to create instances, when the definitions do not yet exist, instantiating run-time instances, and transferring information from various source to destination objects.

Device Tables are elements of the configuration database that are local to devices and, in combination, define part of the configuration implementation 210. A Device Table contains information regarding a device in the process control environment 100. Information items in a Device Table include a device ID, a device name, a device type, a PCN network number, an ACN segment number, a simplex/ redundant communication flag, a controller MAC address, a comment field, a primary internet protocol (IP) address, a primary subnet mask, a secondary IP address and a secondary subnet mask.

Referring to FIG. 3, a block diagram illustrates a user interface 300 for usage with both the configuration and run-time models of the process control environment 100 shown in FIG. 1C. Part of the user interface 300 is the Explorer™ 310, an interfacing program defined under the Windows NT™ operating system which features a device-based configuration approach. Another part of the user interface 300 is a module definition editor 320 for interfacing to the process control environment 100 using a control-based configuration approach.

The Explorer™ 310 is operated by a user to select, construct and operate a configuration. In addition, the Explorer™ 310 supplies an initial state for navigating across various tools and processors in a network. A user controls the Explorer™ 310 to access libraries, areas, process control equipment and security operations. FIG. 3 illustrates the relationship between various tools that may be accessed by a task operating within the process control environment 100 and the relationship between components of the process control environment 100 such as libraries, areas, process control equipment and security. For example, when a user selects a "show tags" function from within an area, a "tag list builder" is displayed, showing a list of control and I/O flags. From the tag list builder, the user can use an "add tag" function to add a module to a list, thereby invoking a "module editor".

Figure 4:
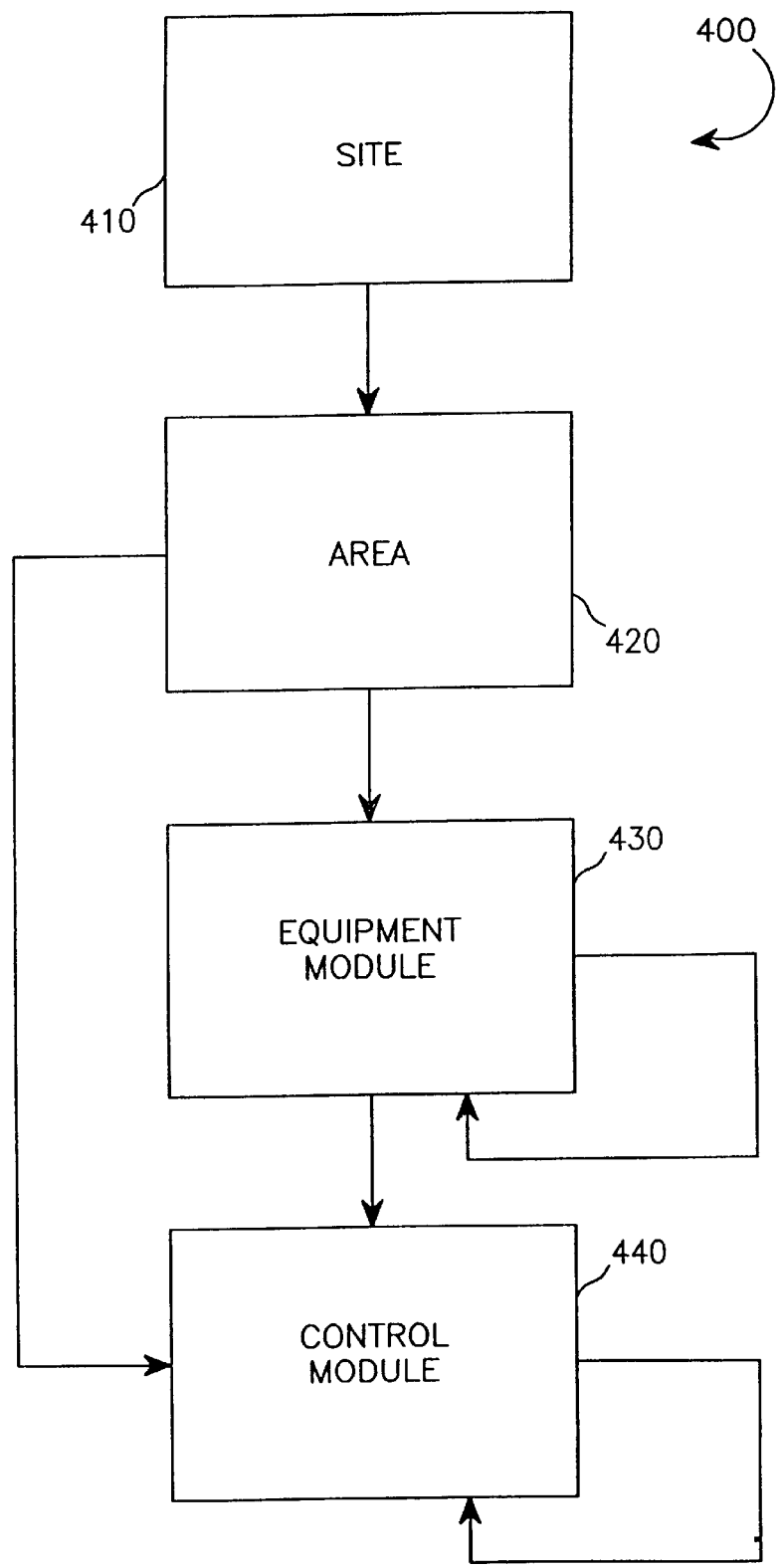
FIG. 4 is a schematic block diagram which depicts a hierarchical relationship among system objects of a configuration model in accordance with an embodiment of the present invention.

Referring to FIG. 4, a schematic block diagram illustrates a hierarchical relationship among system objects of a configuration model 400. The configuration model 400 includes many configuration aspects including control, I/O, process graphics, process equipment, alarms, history and events. The configuration model 400 also includes a device description and network topology layout.

The configuration model hierarchy 400 is defined for usage by a particular set of users for visualizing system object relationships and locations and for communicating or navigating maintenance information among various system objects. For example, one configuration model hierarchy 400, specifically a physical plant hierarchy, is defined for usage by maintenance engineers and technicians for visualizing physical plant relationships and locations and for communicating or navigating maintenance information among various instruments and equipment in a physical plant. An embodiment of a configuration model hierarchy 400 that forms a physical plant hierarchy supports a subset of the SP88 physical equipment standard hierarchy and includes a configuration model site 410, one or more physical plant areas 420, equipment modules 430 and control modules 440.

The configuration model hierarchy 400 is defined for a single process site 410 which is divided into one or more named physical plant areas 420 that are defined within the configuration model hierarchy 400. The physical plant areas 420 optionally contain tagged modules, each of which is uniquely instantiated within the configuration model hierarchy 400. A physical plant area 420 optionally contains one or more equipment modules 430. An equipment module 430 optionally contains other equipment modules 430, control modules 440 and function blocks. An equipment module 430 includes and is controlled by a control template that is created according to one of a number of different graphical process control programming languages including continuous function block, ladder logic, or sequential function charting ("SFC"). The configuration model hierarchy 400 optionally contains one or more control modules 440. A control module 440 is contained in an object such as a physical plant area 420, an equipment module 430 or another control module 440. A control module 440 optionally contains objects such as other control modules 440 or function blocks. The control module 440 is thus a container class, having instances which are collections of other objects. The control module 444 is encapsulated so that all of the contents and the implementation of the methods of the control module are hidden.

Figure 5:
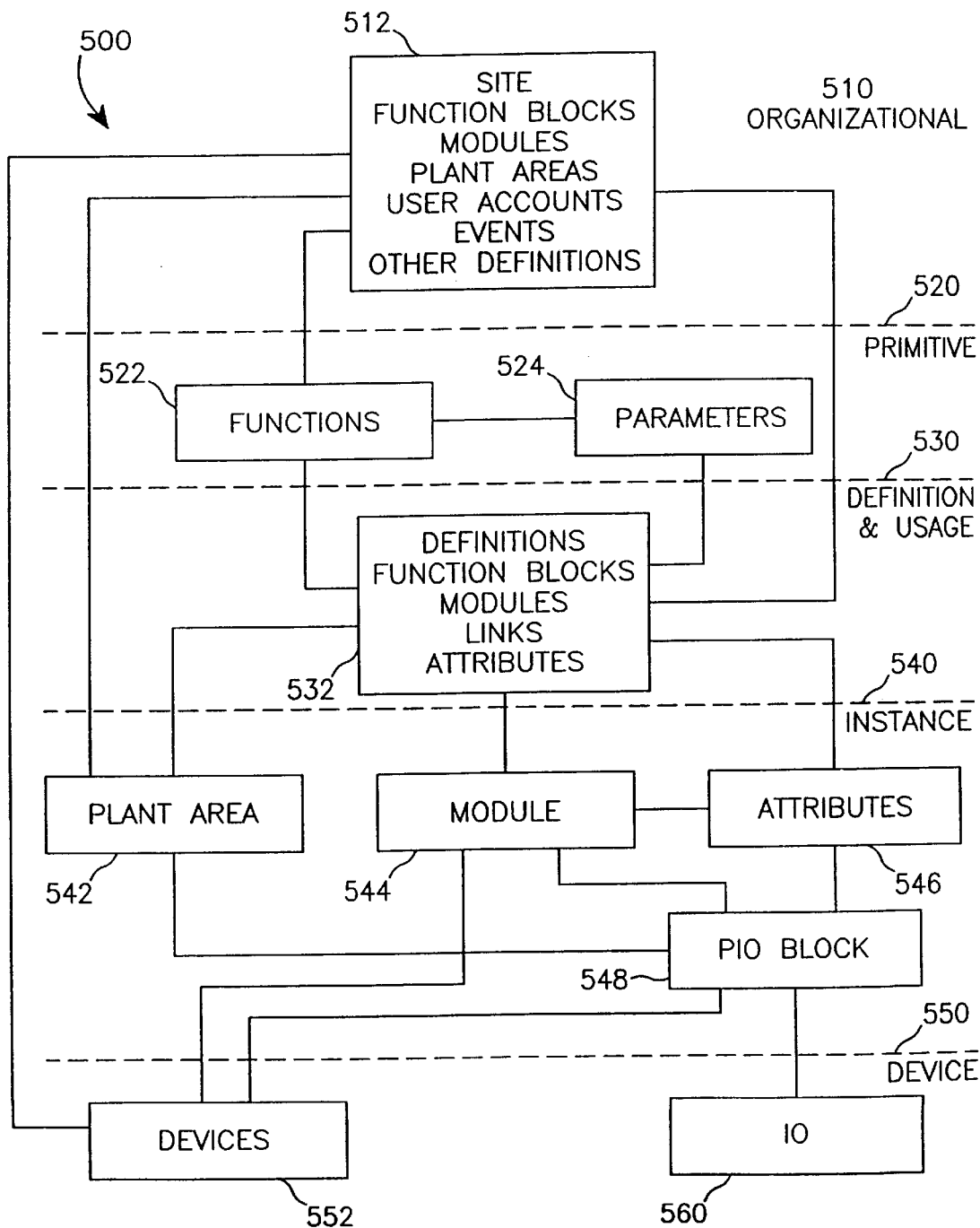
FIG. 5 is a schematic block diagram which depicts a configuration architecture that operates within the hierarchical relationship illustrated in FIG. 4.

Referring to FIG. 5, a schematic block diagram shows a configuration architecture 500 that operates within the configuration model hierarchy 400 illustrated in FIG. 4. The configuration architecture 500 includes a several objects and classes at multiple levels of abstraction. At an organizational level of abstraction 510, the configuration architecture 500 includes a site class 512 which contains "named" objects and classes within the configuration architecture 500. Named objects and classes are definitions, display components such as screens and graphics and other items. The named objects and classes include function blocks, user accounts, modules, plant areas, events, libraries and other site-wide information. Examples of named items are block definitions, equipment module definitions, control module definitions, plant area names and the like.

At a primitive level of abstraction 520, the configuration architecture 500 includes primitives that define the interfaces to functions within the configuration architecture 500, including hard-coded functions such as "+". The primitive level of abstraction 520 includes the classes of functions 522 and parameters 524. Functions 522 are operational functions at the lowest level of abstraction in the configuration architecture 500. Functions 522 are typically coded in the C or C++ languages. In one embodiment of the configuration architecture 500, the full set of implemented function blocks 522 are primitives. Objects and classes at the primitive level of abstraction 520 are defined throughout the site class 512. Parameters 524 are classes and objects at the lowest level of abstraction in the configuration architecture. Parameters 524 include integer numbers, real numbers, vectors, arrays and the like. Attribute values are mapped into parameters 524 for usage within a function block 522. In one embodiment, function blocks 522 at the primitive level of abstraction 520 include the function block primitives listed in TABLE I, as follows:

TABLE I

Function Blocks

| Function Block | Description/Comments |
| --- | --- |
| Action | Handles simple assignment statements using a defined expression capability. |
| ADD | Simple Add function with extensible inputs. |
| AI | FF Standard Analog Input |
| AI Lite | A scaled back version of the FF analog input. |
| AI HART | The FF Standard Analog Input with some extra ability to handle HART devices. |
| AND | Simple And function with extensible inputs. |
| AO | FF Standard Analog Output. (From FF standard specification) |
| Arithmetic | FF Standard Arithmetic Block. (From FF standard specification) |
| BDE_TRIGGER | Simple bi-directional edge trigger. |
| BIASGAIN | FF Standard Bias/Gain. (From FF standard specification) |
| CALC/LOGIC | Advanced calculation and logic block that has its own language as well as the ability to handle simple ST (1131). It has extensible inputs, extensible outputs, and the ability to create temporary variables. |
| Condition | Handles simple condition statements using the defined expression capability. |
| Counter | Simple up/down counter that handles several different Accumulation methods. |
| CTLSEL | FF Standard Control Selector. (From FF standard specification) |
| DI | FF Standard Discrete Input. (From FF standard specification) |
| DI Lite | A scaled back version of the FF discrete input. |
| DIVIDE | Simple Divide. |
| DO | FF Standard Discrete Output. (From FF standard specification) |
| DT | FF Standard Deadtime with advanced control research implemented. (From FF standard specification) |
| DtoI | A boolean fan in that converts up to 16 discrete inputs to a 16-bit integer value. Also has some special abilities for capturing input patterns. |
| FILT | Simple filter. |
| H/L MON LIMIT | Simple high/low signal monitor and limiter. |
| INTEGRATOR | FF Standard Integrator block. (From FF standard specification) |
| ItoD | Boolean fan-out. Takes a 16-bit integer and translates it into 16 discrete outputs. |
| L/L | FF Standard LeadLag with 2 additional types of equations to select. (From FF standard specification) |
| LOOP | An I/O and control block with the abilities of AI, PID, and AO rolled into one block. |
| LOOPD | An I/O and control block with the abilities of DI, Device Control, and DO rolled into one block. |
| MAN | FF Standard Manual Loader. (From FF standard specification) |
| MULTIPLEX | Simple multiplexor with extensible inputs. |
| MULTIPLY | Simple multiply with extensible inputs. |
| NDE_TRIGGER | Simple negative edge trigger. |
| NOT | Simple not. |
| OFF_DELAY | Simple off-delay timer. |
| ON_DELAY | Simple on-delay timer. |
| OR | Simple logical or with extensible inputs. |
| P/PD | FF Standard P/PD. (From FF standard specification) |
| PDE_TRIGGER | Simple positive directional edge trigger. |
| PERIOD | Simple monitor that triggers when an input is true for a specified period |
| PI | FF Standard Pulse Input. (From FF standard specification) |
| PID | FF Standard PID with many additions including the ability to choose algorithm type, form, and structure. (From FF standard specification) |
| RAMP | Simple ramp generator. |
| RATELIM | Simple rate limiter generator. |
| RATIO | FF Standard Ratio block. (From FF standard specification) |
| RETENTIVE | Simple retentive timer. |
| RS | Simple reset dominant flip-flop. |
| RUNAVE | Simple running average calculator. |
| SCALER | Simple scaler. |

TABLE I-continued

Function Blocks

| Function Block | Description/Comments |
| --- | --- |
| SIGGEN | Generates square waves, sm waves, random waves, or any combination of the three. |
| SIGNALCHAR | FF Standard Signal Characterizer. (From FF standard specification) |
| SIGSEL | Simple signal selector. |
| SPLITTER | FF Standard Splitter. (From FF standard specification) |
| SR | Simple set dominant flip-flop. |
| SUBTRACT | Simple subtract block. |
| TP | Simple timed pulse block. |
| TRANSFER | Simple transfer block. |
| XOR | Simple exclusive or block. |

At a definition and usage level of abstraction 530, the configuration architecture 500 includes definitions 532 and usages. Definitions 532 and usages, in combination, define the algorithm and the interface for objects including function blocks, control modules, equipment modules, links and attributes. The definitions 532 define algorithms and interfaces for function blocks, modules, links and attributes. Usages are objects and classes at the definition and usage level of abstraction 530 that represent the usage of one definition within another.

At an instance level of abstraction 540, the configuration architecture 500 includes instances, which are "tagged" items within the configuration. Plant areas 542, modules 544, attributes 546, and PIO blocks 548 are tagged instances. Instances are defined according to definitions 532. A plant area 542 represents a geographical or logical segmentation of a process site class 512. All objects and classes at the instance level of abstraction 540 are defined throughout the plant area level so that all module instances have a 0 or 1 association with a plant area 542. To be installed in a run-time system, the module instances must have a 1 association, meaning that the module is viewed as being "contained by" or "scoped" in this context of a plant area. A module instance 544 is an installable object that is associated to a specific object of plant equipment. An attribute instance 546 is a visible parameter in a module instance 544, a plant area instance 542 or other device. An attribute instance 546 may be used for an input signal, an output signal, data storage or the like.

At a device level of abstraction 550, the configuration architecture 500 includes devices 552 such as controllers, smart devices and consoles, and input/output devices (IO) 560 such as a PIO block, and the like, which represent physical process control equipment in the physical plant. A process input/output (PIO) block is an abstraction that represents various high density and low density conventional input/output devices including Hart, FieldBus and other input and output devices that are interfaced into the configuration architecture 500. High or low density relates to the number of channels on an I/O card. For example, 8 channels are typical on a low density card while a high density card may have 32 channels. Devices 552 are process control equipment in the configuration architecture 500 and include objects such as controllers, input/output devices, consoles and the like. Input/output devices (IO) 560 are the physical process input and output devices in the configuration architecture 500.

A smart device is a field device that is implemented to transmit and receive digital data pertaining to a device, including data relating to device calibration, configuration, diagnostics and maintenance. Typically, the smart device is also adapted to transmit a standard analog signal that is indicative of various information including, for example, a process value measured by a field device. Examples of smart field devices include field devices which follow a HART (highway addressable remote transducer) protocol, a Fieldbus protocol, a Modbus protocol and a device net protocol.

Various hierarchical relationships among system objects are implemented to facilitate navigation through the process control environment 100 shown in FIG. 1C by different users and to accomplish different tasks. Four different hierarchical relationships are defined including control, control system, operations and physical plant hierarchies. A specific system object may be implemented in multiple hierarchical systems.

The control hierarchy is a subset of a standard SP88 hierarchy and has system objects including site, physical area, equipment module, control module and control element objects. The control hierarchy is used to organize control operations and to define the scope of named objects. A user interacts with the control hierarchy on the basis of a site instance, equipment module definitions, control module definitions, a plant area instance, equipment module instances, control module instances, display module instances, and process I/O module/block instances, having signal tags.

The control system hierarchy includes operator/configuration stations, host computers, controllers, I/O devices, smart devices, gateways and the like, which are associated using various network standards including area control network (ACN), process control network (PCN) and other I/O network standards. In one embodiment, the ACN hardware includes standard 10-base-T Ethernet communication ports and a workstation contains standard Ethernet 10-base-T interface cards and software drivers. A user interacts with the control system hierarchy on the basis of a defined site instance, a network definition, a defined network instance, devices, and subsystems such as files, cards, channels, controllers, operation stations, and Fieldbus segments.

The area control network (ACN) includes communication functionality at two levels, a remote object communications (ROC) level and a low level communications level. ROC level controls the interface between the programmed applications and the ACN communications system. The low level communications support the interface with the TCP/IP sockets and the actual transmission of messages.

Remote Object Communications (ROC) are system operations supporting communication of objects in the process control environment 100 shown in FIG. 1C and particularly supporting communication between objects whether the objects reside in the same device or in remote devices. The ROC communication level supports communications message services including request/response, unsolicited reporting, event/alarm reporting and broadcast message service.

Request/Response is a service by which applications send messages to a remote device and receive a response from the device. Unsolicited Reporting is a service for periodically sending updated data to a remote device. Unchanged data is not reported. Event/Alarm Reporting is a guaranteed delivery message service which is used for the transmission of events, alarms and other vital information for delivery to a remote device. The broadcast message service is used to send messages to all program application devices on the communications network. The ROC level also sets communications policies for the communications subsystem. This means that it is responsible for managing what message get sent and when as well as how incoming messages are processed. Communications flow control will also be the responsibility of the ROC portion.

Low level communications support is included for device connection management, ACN redundancy and communications systems diagnostics. Device connection management establishes a communications connection between two devices and manages the transmission of messages between the two devices. ACN Redundancy handles the detection of communications link failures, controls the switch from one link to another and tracks the status of communication links between a host device and connected remote devices. Communications subsystem diagnostics tracks communication integrity and statistical information, responds to requests for communications diagnostic data.

Device connection management in an ACN communications system supports both UDP and TCP type device connections. UDP connections are used for normal real time data transfers between devices. TCP connections are used for special applications using a streaming protocol such as file transfers, device flash downloads, and the like. Communications between devices is managed by a Device Connection Object. The Device Connection Object transmits data and maintains the status of the communications links between two communicating devices.

All normal device connection message traffic is directed through a single UDP communications port. A Device Connection Object starts the communications system by creating the communication socket associated with this UDP port as well as creating the queues needed for management of the device connection message traffic. The Device Connection Object receives all incoming messages on a Device Connection communications socket and routes messages to the proper device connection instance for processing. The Device Connection Object handles timing functions of device connections, including notifying device connection instances when messages time out waiting to be acknowledged, when communications link checks are due and when device connection resyncs have timed out.

UDP type communications are used for the transfer of real-time data among devices. The remote object communications (ROC) subsystem passes messages to a UDP Device Connection for transmission to a destination device. A pool of message buffers is created on startup of each device. The message pool is used for all data transferred between devices, preventing the communications subsystem from exhausting memory and ensuring that no other task exhausts memory, thereby preventing the communication subsystem from running. Communication flow control is implemented in the Device Connection Object. If the number of message buffers in the communications buffer pool reaches a predefined low level, all remote devices are inhibited from sending messages until the low buffer problem is resolved in the affected device preventing loss of messages.

TCP-type communications are used for applications using a streaming-type protocol such as file transfers and device flash downloads. TCP-type connections are temporary connections established for the duration of the applications needs and terminated once the application has completed a communications task. For reasons of interoperability, compatibility, and availability, a TCP/IP protocol stack is employed. The TCP/IP stack supplies a connection-oriented, byte stream protocol (TCP) and a connectionless, message oriented protocol (UDP). The device connection supports request/response messages, unsolicited data, and event and alarm data between devices. The communication system maintains the device connection through one of two available communications links in the event of a single communications failure, typically a cable fault. Detection of a fault and switch to an alternate communications path transpires in a short, deterministic time span which is less than one second.

The operations hierarchy is defined for a particular set of users, specifically operators and maintenance engineers, generally for the purpose of accessing displays, reports, and other informational items. A user interacts with the operations hierarchy on the basis of a site instance, User Group definitions, a plant area instance, equipment module instances, control module instances, display instances, and report instances.

The physical plant hierarchy is defined for a particular set of users, specifically maintenance engineers and technicians, typically for the purpose of determining physical relationships among objects and navigating maintenance information about plant instruments and equipment. A user interacts with the physical plant hierarchy on the basis of a site instance, a maintenance area instance, a plant area instance, room instances, cabinet instances, node/device instances and display instances.

The system objects that are implemented in the multiple hierarchical systems are arranged into a plurality of subsystems including control, process I/O, control system hardware, redundancy management, event/alarm management, history services, process graphics, diagnostics presentation, user environment, management organization and field management system (FMS) subsystems. The control subsystem includes routines for configuring, installing and executing control modules and equipment modules. The process I/O subsystem is a uniform interface to devices including HART, Fieldbus, conventional I/O and other input/output systems. The control system hardware subsystem defines a control system topology, devices within the topology and capabilities and functions of the devices. The control system hardware subsystem also includes objects and data structures for accessing device level information indicative of status and diagnostics.

The redundancy management subsystem establishes a redundant context between primary and secondary control applications and manages switching in context between the primary and secondary control applications. The redundancy management subsystem also maintains and monitors redundant context diagnostic information including state information and data latency information. Network redundancy is accomplished using two separate Ethernet communications links or networks. The primary communication link is the preferred communications path. The secondary link is only used if the primary has failed. Communications switchovers are performed on a per device basis. For example, if device A is communicating with devices B and C and the primary link to device C fails, device A continues to communicate with device B on the primary link but switches to the secondary link to communicate with device C. Each Ethernet link is a separate, dedicated network having a dedicated set of IP addresses and a subnet mask.

The device connection object manages redundant communications including controlling when to switch to the secondary link and when to switch back to the primary link. Each device in the process control system tracks the communication status of all current links to remote devices by periodically sending link test messages when no other communications is occurring, to check the status of the communications links to each device. Redundancy switchovers are performed on a device connection basis.

The event/alarm management subsystem configures, monitors, and supplies notification of significant system states, acknowledgments and priority calculations. The history services subsystem stores and retrieves process and event information. The process graphics subsystem supplies user-defined views for display and operator interfacing onto the defined system architecture. The diagnostics presentation subsystem furnishes displays of diagnostic information, typically at the request of a user. The user environment subsystem supplies a user interface, allowing a user to enter commands to control operation of the process control environment 100 shown in FIG. 1C. The management organization subsystem sets an organizational structure of the process control environment 100 including specification of site, area, primitives, access to user libraries, and location of defined objects and instances. The FMS supplies user interfaces, views, and organization structure for the configuration, installation and monitoring of HART and Fieldbus devices.

A Fieldbus device implements localized control of a process within the process, in contrast to a longer-used and more conventional approach of controlling device functions from a main or centralized digital control system. A Fieldbus device achieves localized control by including small, localized controller/multiplexers 110 which are closely associated with field devices within the Fieldbus device. The small, localized controllers of a Fieldbus implement standardized control functions or control blocks which operate on the field devices within the Fieldbus device and which also operate on other smart field devices that are connected to the Fieldbus device.

Thus, the process control environment 100 implements smart field device standards, such as the Fieldbus H1 standard, Profibus standard, CAN standard and other bus-based architecture standards so that communications and control among devices, particularly Fieldbus devices, are performed so that Fieldbus-type control operations are transparent to a user.

The process control environment 100 allows attachment to a substantially unlimited number and type of field devices including smart devices, such as Fieldbus and HART devices, and conventional non-smart devices. Control and communication operations of the various numbers and types of devices are advantageously performed simultaneously and in parallel.

The process control environment 100 implements and executes a standard set of function blocks or control functions defined by a standard Fieldbus protocol, such as the Fieldbus H1 standard, so that Fieldbus-type control is achieved with respect to non-Fieldbus-type devices, such as a HART device 134 and a conventional device 136. In addition, the process control environment 100 enables Fieldbus devices to implement the standard set of function blocks and control functions. Advantageously, the process control environment 100 implements an overall strategy as if all connected devices are Fieldbus devices. This implementation is achieved, in part, by the usage of a function block as a fundamental building block for control structures. These function blocks are defined to create control structures for all types of devices. Usage of function blocks as fundamental building blocks is described in FIGS. 6, 7, 8 and 9.

The process control environment 100 implements an overall, user-developed control strategy through the definition of function blocks and control modules by downloading or installing specific portions of the control strategy into smart devices and non-smart devices. Thereafter, the smart devices automatically perform the downloaded portions of the overall strategy independently of other control system operations. For example, the portions of the control strategy downloaded or installed into the devices operate independently of and in parallel with the control operations of the controller/multiplexers 110 and the workstations, while other control operations manage the smart devices and implement other portions of the control strategy. In effect, the process control environment 100 implements a control strategy using the controller/multiplexers 110 within the smart devices.

Figure 6:
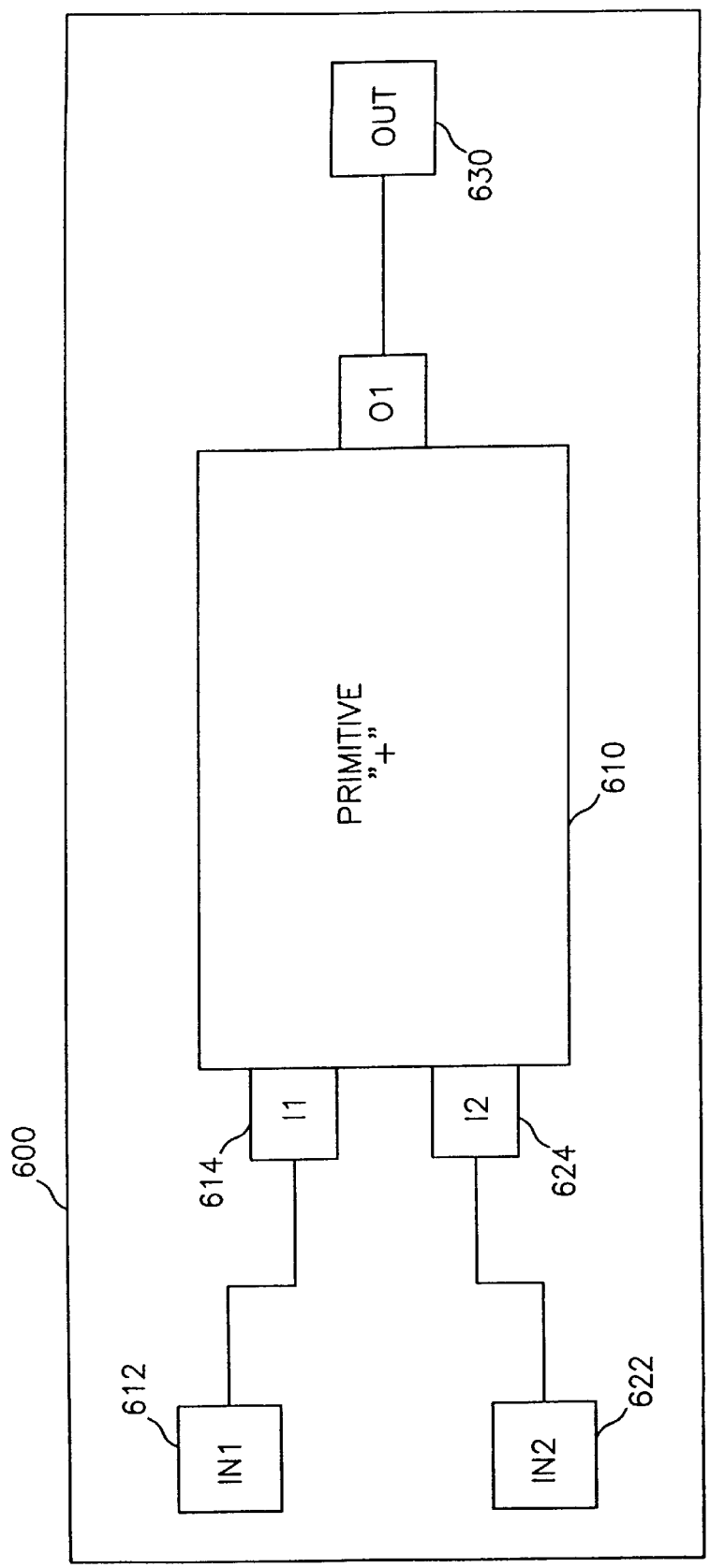
FIG. 6 is a block diagram illustrating an example of an elemental function block, which is one type of system object within the configuration model definition.

An example of a block diagram defining a function block of the functions 522 shown in FIG. 5 is illustrated in FIG. 6. Specifically, FIG. 6 depicts an "elemental" function block definition 600 which is defined to contain only primitive objects. The elemental function block definition 600 defines a sum function and includes a "+" primitive 610, a first input attribute 612 which is a first parameter 614 applied to the primitive 610, and a second input attribute 622 which is a second parameter 624 applied to the primitive 610. The primitive 610 produces a result that is supplied as an output attribute 630. In this example, the elemental function block definition 600 is a block definition that is created and named SUM.

Figure 7:
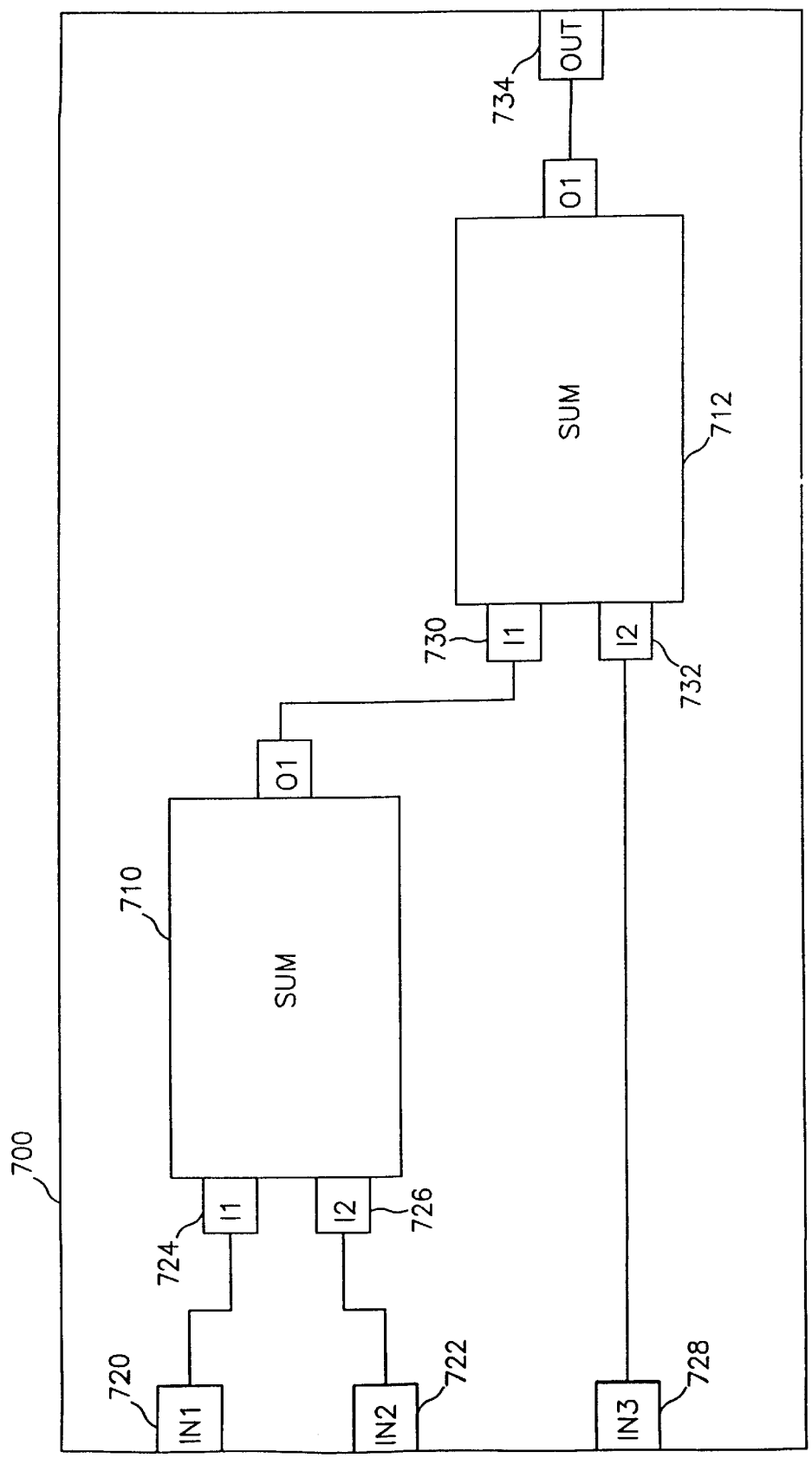
FIG. 7 is a block diagram depicting an example of a composite function block, which is another type of system object within the configuration model definition.

A second example of a block diagram defining a function block of the functions 522 shown in FIG. 5 is illustrated in FIG. 7. Specifically, FIG. 7 depicts a "composite" function block definition 700 which is defined to contain one or more elemental function blocks 600 and, optionally, one or more primitive objects. The composite function block definition 700 defines a composite sum function and includes a first SUM elemental function block 710 and a second SUM elemental function block 712, each of which is the same as the SUM elemental function block 600 illustrated in FIG. 6. The composite function block 700 has a first input attribute 720 and a second input attribute 722 which are respective first and second parameters 724 and 726 applied to the first SUM elemental function block 710. The first elemental function block 710 produces a result that is applied to the second SUM elemental function block 712 as a first parameter 730. The composite function block 700 has a third input attribute 728 that is a second parameter 732 applied to the second SUM elemental function block 712. The second SUM elemental function block 712 produces a result that is supplied as an output attribute 734. In this example, the composite function block definition 700 is a block definition that is created and named SUM3.

Figure 8:
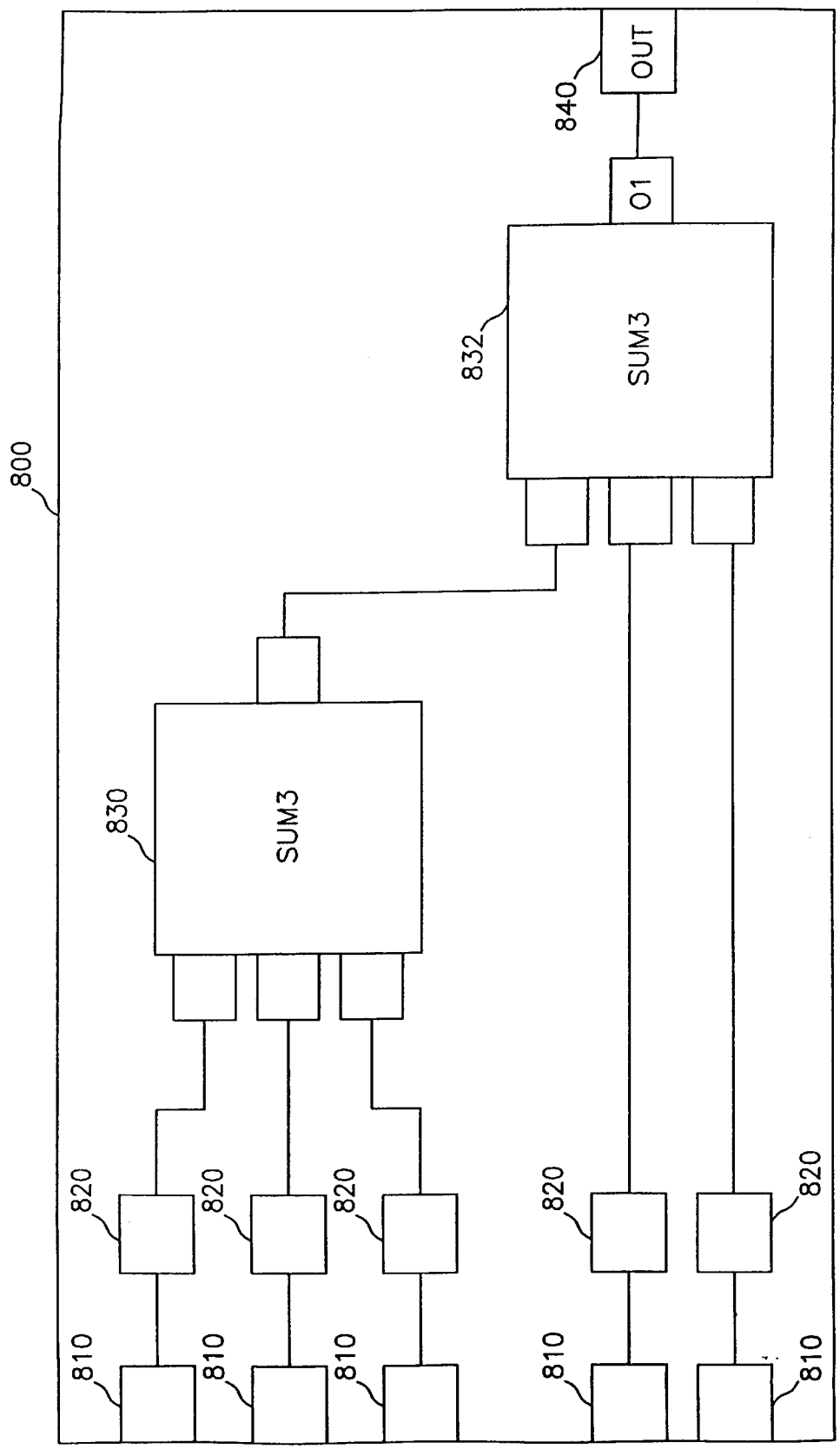
FIG. 8 is a block diagram illustrating an example of a control module, which is another type of system object within the configuration model definition.

An example of a block diagram defining a control module of the control modules 440 shown in FIG. 4 is illustrated in FIG. 8. Specifically, FIG. 8 depicts a control module definition 800 which is defined and contains various input attributes 810, elemental function blocks 820, a first SUM3 composite function block 830 and a second SUM3 composite function block 832. The exemplary control module 440 includes five input attributes 810 which are connected to five respective elemental function blocks 820, three of which are parameters applied to the first SUM3 composite function block 830. The first SUM3 composite function block 830 produces a result that is supplied as a parameter to the second SUM3 composite function block 832 in combination with parameters supplied by the remaining two elemental function blocks 820. The second SUM3 composite function block 832 produces a result that is supplied as an output attribute 840. In this example, the control module 800 is a control module definition that is created and named CM1.

Examples of block diagrams defining a module instance of the module instances 544 are shown in FIG. 5, specifically a control module instance, are shown in FIG. 9. Control module instances 910 and 920 are created in accordance with the CM1 control module definition so that each control module instance 910 and 920 includes five input attributes 912 and 922, respectively, that correspond to the five input attributes 810 shown in FIG. 8. Each control module instance 910 and 920 also includes one output attribute 914 and 924, respectively, that correspond to the output attribute 840 shown in FIG. 8. In this example, the control module instances 910 and 920 are control module instances that are created and tagged CALC1 and CALC2, respectively.

Using a definition editor, a system user creates and names definitions, such as the SUM elemental function block definition, the SUM3 composite function block definition and the CM1 control module definition. Then, using a module editor, the system user creates and tags instances, such as the CALC1 and CALC2 control module instances.

Figure 10:
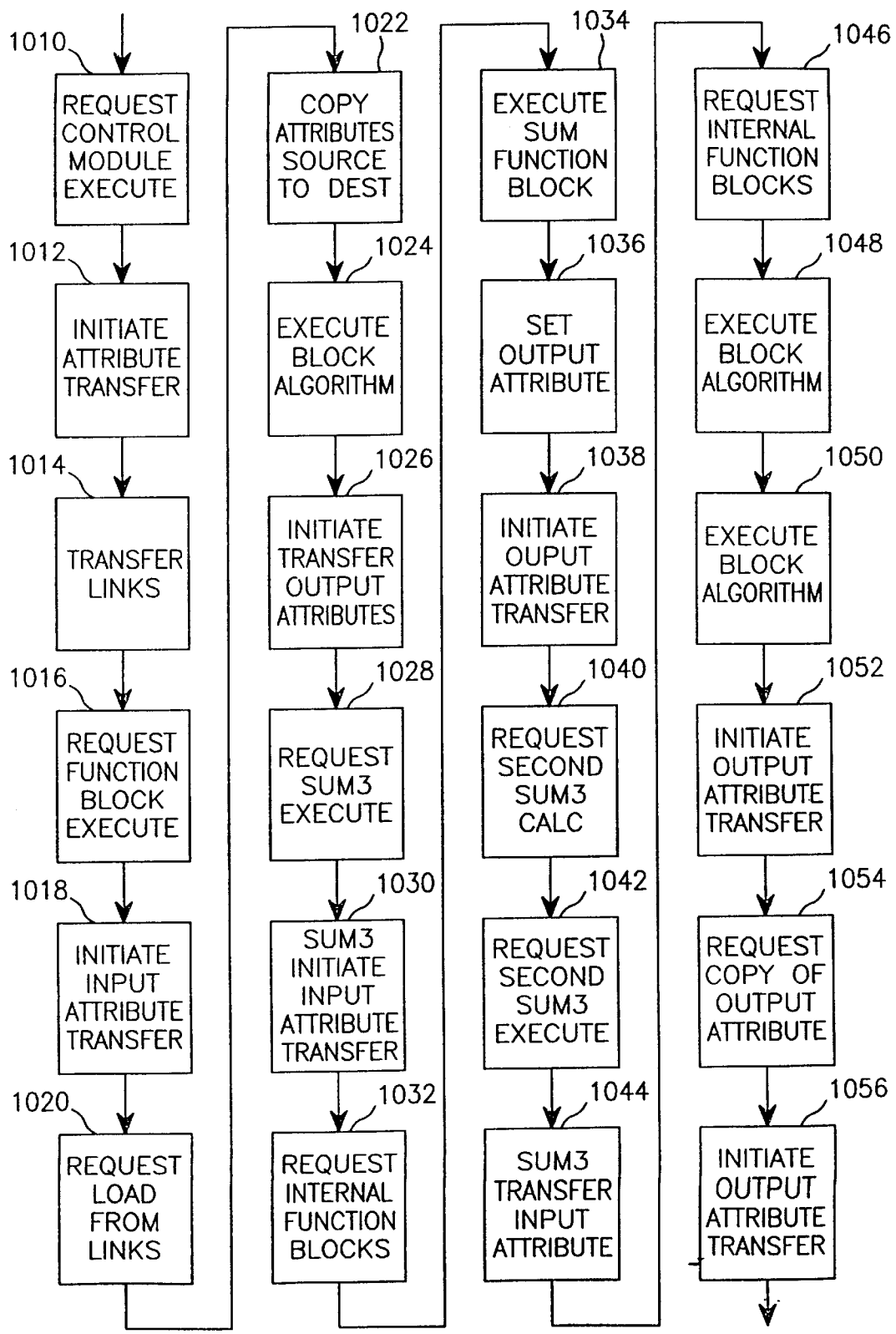
FIG. 10 is a flow chart which shows an example of execution of a control module at run-time.

Referring to FIG. 10, a flow chart shows an example of control module execution at run-time. A run-time program includes a scheduler routine. Scheduler routines are well-known in the computing arts. The scheduler routine requests execution 1010 of a composite control module, for example the composite control module 440 with tag CM1 shown in FIG. 8. The CM1 composite control module 440 initiates transfer 1012 of the input attributes 820, causing any associated links, or attribute associations, to transfer 1014. A database definition typically refers to "associations" while a runtime definition relates to "links". In steps 1016 through 1056 the CM1 composite control module 440 requests each elemental function block 820, first SUM3 composite function block 830 and second SUM3 composite block 832 to execute in turn.

Specifically, in step 1016 the CM1 composite control module 440 requests each elemental function block 820 to execute. The elemental function blocks 820 initiate transfer 1018 of input attributes, for example first input attribute 612 shown in FIG. 6. The input attributes of the elemental function blocks 820 request 1020 loading of values from the links transferred in step 1014. The links copy 1022 values from source attributes to destination attributes. The elemental function blocks 820 execute block algorithms 1024. Upon completion of block algorithm execution, the elemental function blocks 820 initiate transfer of output attributes 1026, for example output attribute 630 shown in FIG. 6.

In step 1028 the CM1 composite control module 440 requests first SUM3 composite function block 830 to execute. First SUM3 composite function block 830 initiates transfer 1030 of input attributes, for example input attributes 722, 724 and 726 shown in FIG. 7, from the elemental function blocks 820. In step 1032, first SUM3 composite function block 830 requests internal function blocks, for example, the first SUM elemental function block 710 and the second SUM elemental function block 712 shown in FIG. 7, to execute in turn. First SUM elemental function block 710 reads input attributes, executes a block algorithm and sets an output attribute in step 1034. Second SUM elemental function block 712 reads input attributes, executes a block algorithm and sets an output attribute in step 1036. First SUM3 composite function block 830 initiates transfer of output attributes in step 1038. The output attribute of first SUM3 composite function block 830 requests an associated link to copy the value from the output attribute in step 1040.

In step 1042 the CM1 composite control module 440 requests second SUM3 composite function block 832 to execute. Second SUM3 composite function block 832 initiates transfer 1044 of input attributes from the links connected to the first SUM3 composite function block 830 output attributes. In step 1046, second SUM3 composite function block 832 requests internal function blocks, for example, the first SUM elemental function block 710 and the second SUM elemental function block 712 shown in FIG. 7, to execute in turn. First SUM elemental function block 710 reads input attributes, executes a block algorithm and sets an output attribute in step 1048. Second SUM elemental function block 712 reads input attributes, executes a block algorithm and sets an output attribute in step 1050. Second SUM3 composite function block 832 initiates transfer of output attributes in step 1052. The output attribute of second SUM3 composite function block 832 requests an associated link to copy the value from the output attribute in step 1054.

In step 1056 the CM1 composite control module 440 initiates transfer of output attributes and output attribute 840 requests a link from second SUM3 composite function block 832 to copy the value of the second SUM3 composite function block 832 output attributes. In some embodiments, output function blocks push output values to a user-configured PIO block attribute (not shown). Thus, PIO attributes are "pulled" by function blocks while output function blocks push output values to PIO Block attributes. Similarly, input function blocks pull input attribute values from PIO Block attributes.

A user defines a module control strategy by specifying function blocks that make up control modules and determine the control strategy. The user modifies or debugs a module control strategy by adding, modifying and deleting function blocks, configuring parameters associated with the function blocks and creating a view to new attributes.

By defining function blocks and control modules, a user-defined control strategy, application program or diagnostic program is represented as a set of layers of interconnected control objects identified as modules. A layer of the control strategy includes a set of modules which are interconnected in a user-specified manner. A module typically includes an algorithm for performing a specific function and display components which are used to display information to a user. A module is optionally represented to include a set of input and output connections for connecting to other modules. A module may be considered to be a "black box" which performs a specified function and is connected to other modules via specified input and output connections.

Figure 11:
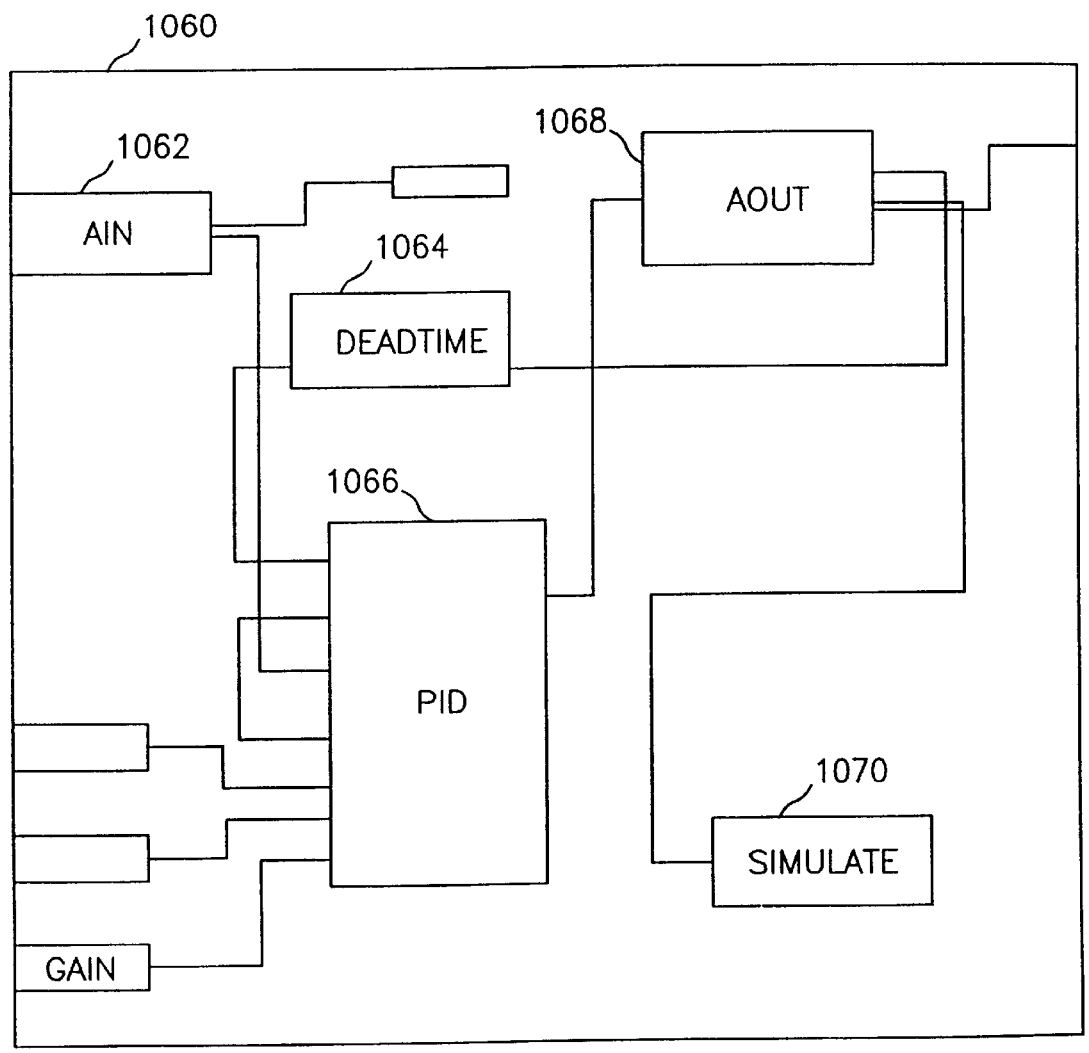
FIG. 11 is a flow chart which shows an example of a module at a highest layer of a control structure.

Referring to FIG. 11, a display screen serves as a flow chart which shows an example of a module or application program LOOPSIM 1060 at a highest layer of a control structure. The illustrated layer of the LOOPSIM 1060 application program includes an input attribute (AIN) module 1062 called AI1, a deadtime module 1064, a proportional, integral, differential (PID) control module 1066, an output attribute (AOUT) module 1068 and a simulate module 1070. Each of the illustrative modules includes named input connections and output connections which are connected to the other modules via lines. The set of modules, the input connections and the output connections of the set of modules, and the interconnections between modules define the operation of the LOOPSIM 1060 application.

At a lowest level, a module is a set of interconnected function blocks. At higher levels, a module is a set of interconnected submodules which, in turn, may include a further set of submodules. For example, the PID control module 1066 is typically a set of interconnected submodules which perform the different functions included in a PID functionality. The input and output connections of the PID module 1066 are an input connection and an output connection of one or more of the submodules within a next lower layer of the PID module 1066. The submodules in the PID module 1066 optionally include other input and output connections sufficient to define the interconnections between the submodules.

An application, a module or a submodule, at any module level, is optionally modified by a user to perform a slightly different function or to perform the same function in a different manner. Thus, a user optionally modifies the module, thereby modifying the control structure, in a desired manner. Specifically, a user optionally adds input and output connections to modules and extends the input and output connections of a module to a higher level module so customize modules for various applications. For example, a user optionally adds a new input connection or output connection to the PID module 1066 to the "edge" of the PID module 1066 which makes the input connection and output connection appear as input and output connections to the PID module 1066.

The process control environment facilitates the definition and modification of the control structure by furnishing editing operations in a plurality of control languages including IEC-1131 standard languages such as Field Blocks, Sequential Function Charts (SFC), Ladder Logic and Structured Text. Accordingly, different types of users, from different control backgrounds use the different languages to write different modules for implementing the same or different applications.

Control modules are specified to have several advantageous characteristics. Some control modules allow direct access to attributes. For example, some attributes, called "heavy" attributes, support direct (maximum performance) communications. Direct communications are advantageously used for connecting function blocks and Control Modules, supporting event/alarm detection, and high performance trending, for example. Some attributes are created automatically upon definition of a control module with a user having the option to promote or force a parameter to be exposed as an attribute of a Control Module. Other parameters are made accessible through a module, such as a Control Module, an Equipment Module, a PIO Block, or a Device, which contains the parameter but direct communications performance of the attributes does not warrant the overhead incurred in supplying this performance. These parameters are advantageously accessed to supply information relating to control system tuning, debugging and maintenance. In some embodiments, these parameters are accessed by a general purpose parameter browser applications, which use services provided by tagged containers to reveal attributes, invokeable services, and subcomponents within the containers.

Figure 12:
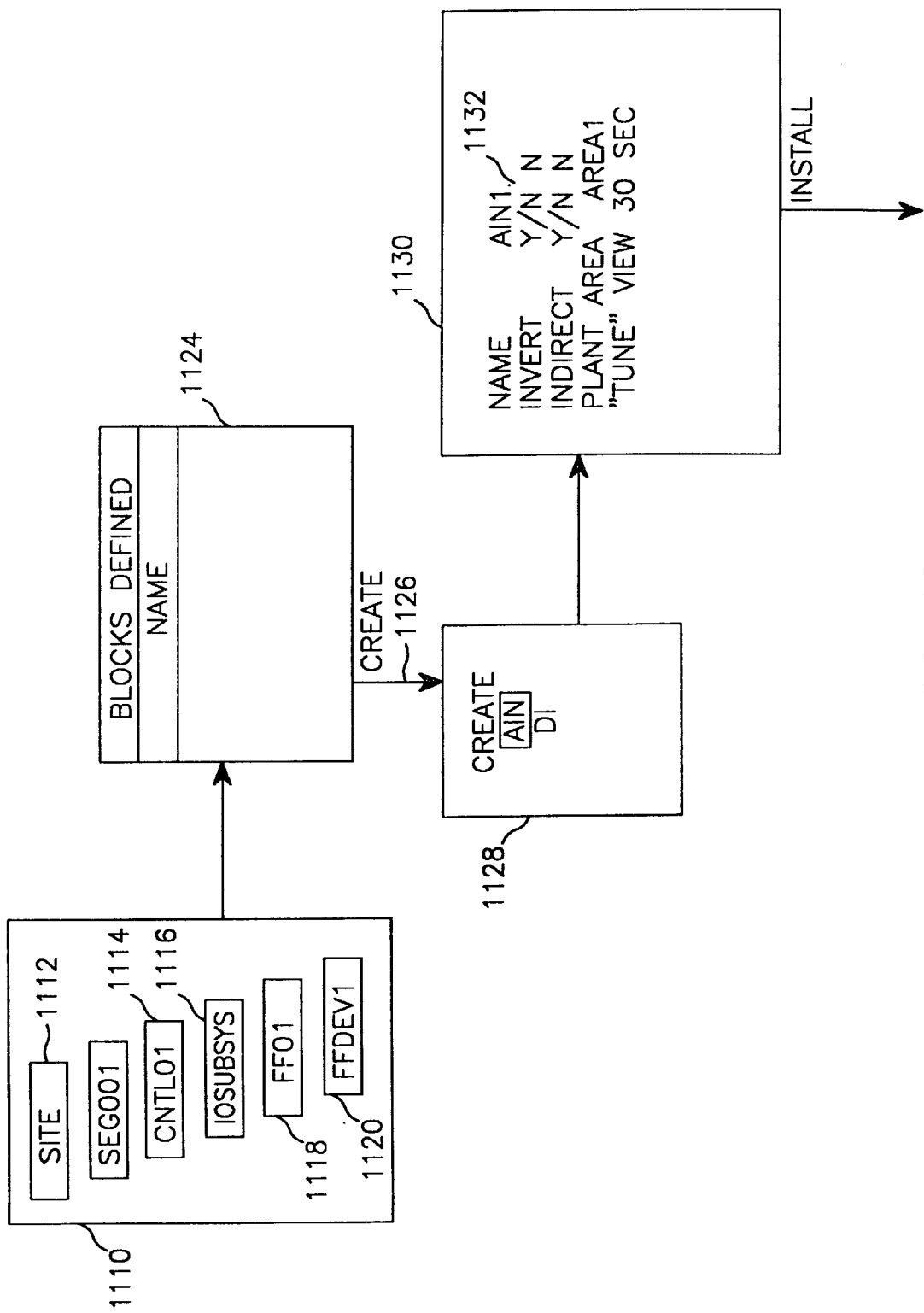
FIG. 12 is a block diagram which illustrates an object-oriented method for installing a process I/O attribute block into a PIO device.

Referring to FIG. 12, a block diagram illustrates an object-oriented method for installing a process I/O attribute block into a PIO device through the operation of the control subsystem. A block of defined objects 1110 includes a site object 1112, a controller device 1114, a controller I/O subsystem 1116, a PIO interface device 1118 and a PIO device 1120. Prior to installation of the PIO device, the controller I/O subsystem 1116 is previously created. The PIO device 1120 is also previously created, either by installation or downloading. The block of defined objects 1110 directs a detail pointer 1122 to a list of block definitions 1124 to specify a particular type of object to be created by a create pointer 1126 directing the operation of a create block 1128. The block definitions 1124 includes a PIO input attributes (AIN) block definition either as hardwired or by previous installation. Attributes of the specified object are set by a user through the operation of an editor 1130. Prior to installation of the PIO device, an input attribute (AIN) block 1132 does not exist.

Prior to installing the AIN block 1132, a user creates the PIO device 1120 then sets up initial values for AIN block attributes using the editor 1130. The user also sets a period for view parameter acquisition. The AIN block 1132 is saved and then installed.

Figure 13:
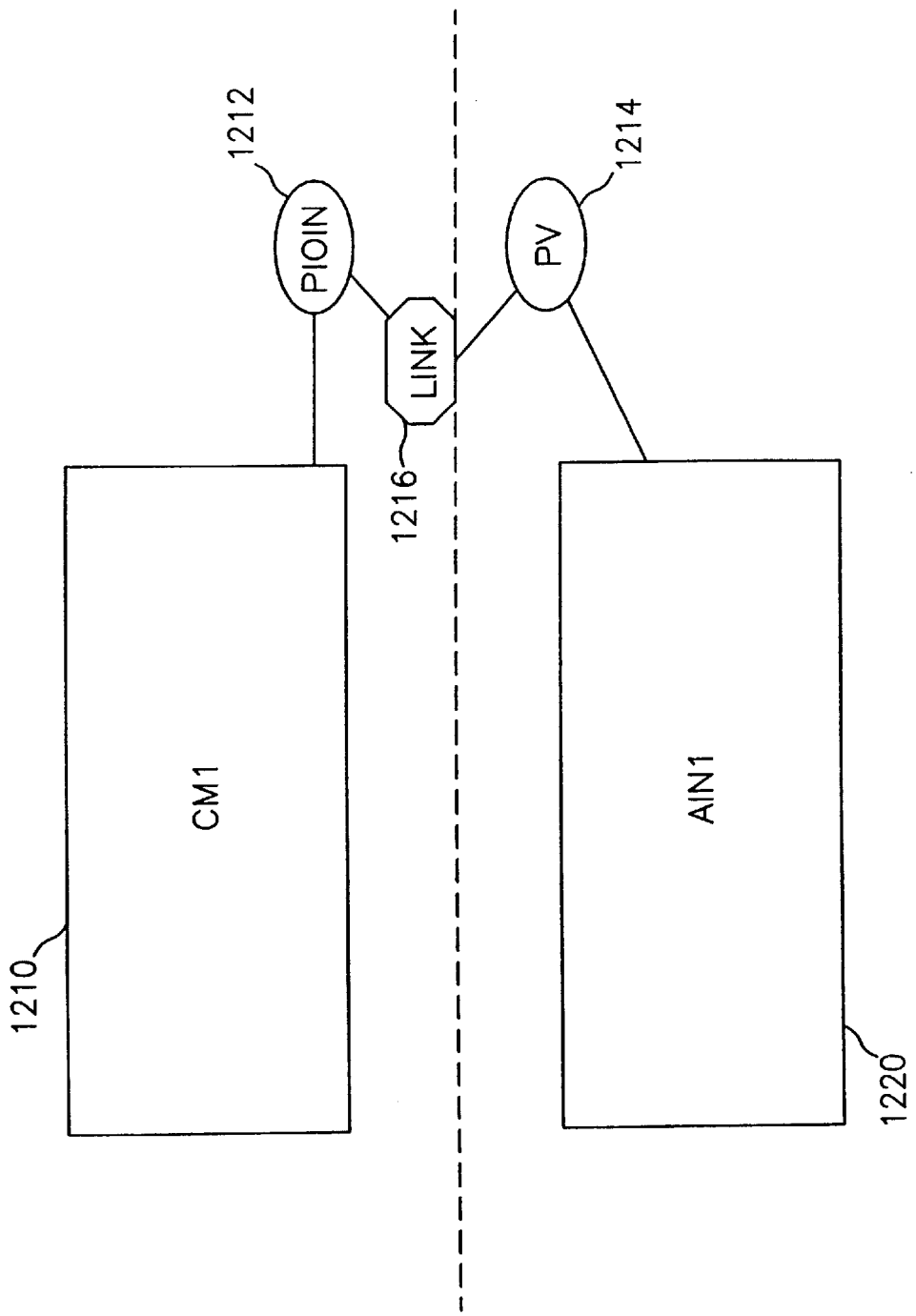
FIG. 13 is a block diagram depicting an object-oriented method for linking a control module input attribute to a PIO attribute.

Referring to FIG. 13, a block diagram illustrates an object-oriented method for linking a Control Module input attribute to a process I/O attribute. Prior to linking of the control module input attribute to the PIO attribute, the PIO block AIN 1220 is previously installed and the control module 1210 is also installed. The user specifies that a PIOIN attribute 1212 of the control module 1210 is connected to an attribute input process variable PV 1214 and requests that a link be made. A link 1216 is made as the control module finds the PIOIN attribute and returns a corresponding attribute index, locates PIO AIN in a plant area, find the process variable PV attribute and returns a corresponding attribute index, instructs the run-time linker 1216 to create a link with a source at the process variable (PV) 1214 and a destination at the PIOIN attribute 1212, creates the link and connects the link 1216. At end of a download, links are resolved by the linked objects.

Figure 14:
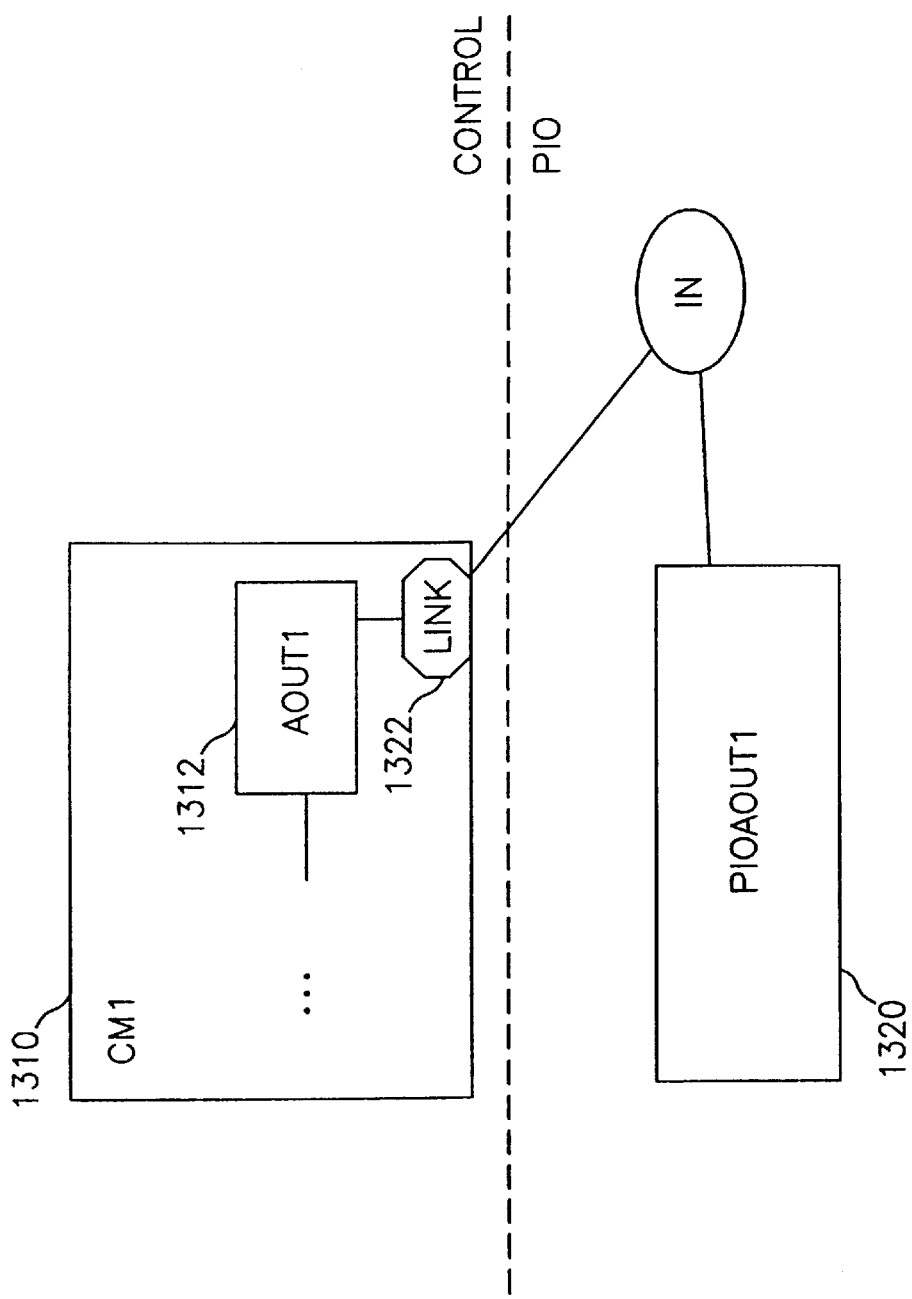
FIG. 14 is a block diagram showing an object-oriented method for linking a control module output attribute to a PIO attribute.

Referring to FIG. 14, a block diagram shows an object-oriented method for linking a control module output attribute (AOUT) 1312 attribute to a PIO output attribute (PIOAOUT) 1320. A control module 1310 is previously installed and the control module output attribute (AOUT) 1312 is installed within the control module 1310. The user specifies that the control module output attribute (AOUT) 1312 is connected to the a PIO output attribute (PIOAOUT) 1320. The link is made as the run-time implementation of the control module 1310 is sent a message to form the connection, the control module 1310 finds the AOUT attribute, requests location of the PIOAOUT attribute 1320, creates a link 1322 and connects the AOUT attribute 1312 and the PIOAOUT attribute 1320 to the link 1322.

Figure 15:
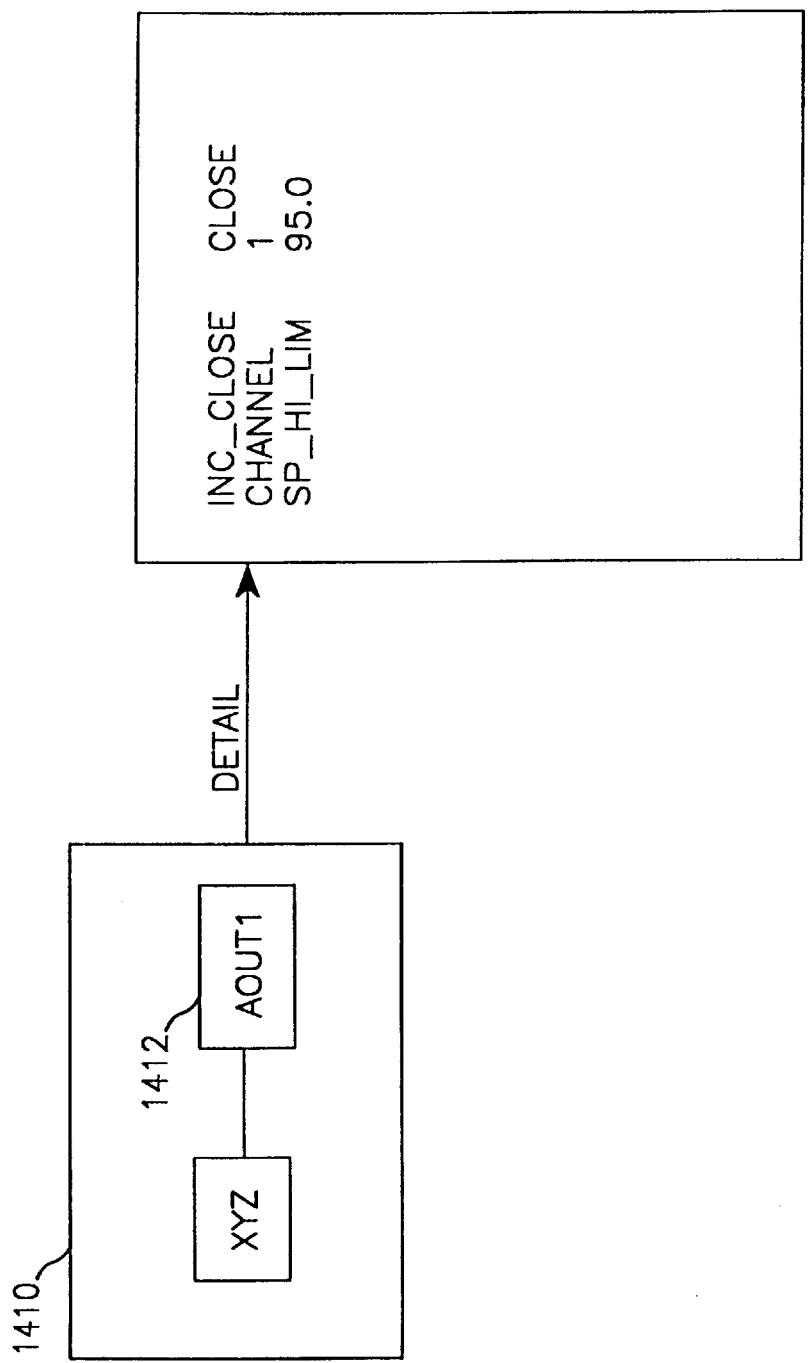
FIG. 15 is a block diagram showing an object-oriented method for reading values of contained PIO attributes.

Referring to FIG. 15, a block diagram shows an object-oriented method for reading values of contained PIO attributes. A PIO block 1410 is previously installed and an output attribute (AOUT) 1412 is previously installed within the PIO block 1410. A user, for example an engineer, requests a detailed view of the block in which all attribute values are displayed. The detailed display includes one or more sets of display groups, also called view definitions, associated with the PIO block 1410. A proxy is previously established for the PIO Block 1410. A user requests detail for the output attribute (AOUT) 1412. Attribute names and values for the AOUT block are presented by an application program requesting a proxy client routine to access a view, an AOUT proxy client setting a return view definition and creating an attribute proxy object, and the application program requesting the AOUT proxy client to read out values for attributes named with granted privileges. The application program formats and displays the data. Display group parameters are part of an I/O block definition and are, therefore, not configurable. Display groups are defined for attributes. Information is advantageously updated while a PIO block is not linked since display groups and view groups control updating of non-linked PIO attributes associated with a block.

The process control environment 100 shown in FIG. 1C implements an overall strategy as if all connected devices are Fieldbus devices not only by the usage of a function block as a fundamental building block for control structures, but also by implementing an input/output architecture that treats Fieldbus and nonFieldbus devices in the same manner. The fundamental character of the input/output architecture is based on instrument signal tags (ISTs) that furnish user-configurable names for all I/O signals including Fieldbus and nonFieldbus I/O signals.

From the perspective of a user, an IST binds a user-defined name to a signal type, to a specific signal in the I/O subsystem, to a signal path including an attribute and to a set of signal property settings.

ISTs are not installed in the manner of other system objects. Instead, signal properties inherent to the IST tag are combined with I/O Port and I/O Device properties that are made available when an I/O Card is installed. The combination of IST, I/O Port and I/O Device properties furnish information for creating a PIO function block in the run-time system. The signal path from ISTs is included in the script that defines I/O Function Blocks during installation of a module.

To communicate throughout the process control environment 100, an I/O type Function Block uses an I/O reference definition. An IST satisfies the specification for an I/O reference. Conventional I/O devices, such as MTL devices supplied by Measurement Technologies Limited of the United Kingdom have an IST for each channel. Hart and Fieldbus I/O devices may include an IST for each distinct "I/O signal" on a Port or in a field Device. IST names have system-wide scope and share the name space of Modules, Devices, and Areas. In large systems, ISTs typically correspond to instrument signal names on instrumentation drawings. In small systems, formal instrument drawings may not exist so that no obvious IST names are inferred. Typically, ISTs are automatically generated as cards are configured based on a device hierarchy path representing a controller node, I/O subsystem, card and port so that arbitrary IST names are avoided. Typically most ISTs are created automatically when a new I/O card is defined. For multiple-signal I/O devices, an IST is automatically created for only a single "primary signal". In addition to automatic IST creation, a user may also create ISTs using an "Assign . . . " menu available from the Explorer Node/IOsubsys/Port/Device tree with a Port or Device selected or using a "New . . . " menu available from the Explorer IST tree.

ISTs have a "signal type" property to ensure compatibility between the I/O signal and the I/O Function Block(s) that accesses the I/O signal. Signal type is one of: AIN, AOUT, DIN, DOUT, PCIN, PCOUT. ISTs have a set of "signal-related" attributes specific to the signal type (e.g. EU0 and EU100 for a AIN, MOMENTARY or LATCHED for a DOUT, etc.). All signal sources with the same signal type have the same set of "signal attributes". All other properties of the I/O subsystem objects are held in card, port, or device attributes.

Fully configured ISTs have a fully qualified path to a corresponding signal in the I/O system, e.g. "CON1/IO1/S01/C01/FIELD_VAL". An IST may be created without a defined path defined so that module configuration may be completed before I/O structure details are fully defined. Modules with I/O Function Blocks using ISTs with no defined path may be configured and installed but the run-time system must deal appropriately with missing I/O paths of missing ISTs on I/O Function blocks. A signal source has no more than one IST. Attempts to configure more than one IST with the same path are rejected.

A user may delete an IST, thereby deleting associated signal properties and possibly leaving some unresolvable IST references in I/O Function Blocks. A deleted IST does not affect card/port/device properties with a normal display of the IST on the Port/Device in the Explorer tree indicating no associated IST.

I/O-interface Function Blocks have at least one IST-Reference property. An IST-Reference property is either left blank to indicate that the function block does not connect to a IST, or is designated with a valid IST name. An IST-Reference property in an I/O Function Block is compatible with exactly one IST signal type. For example, the IST-Reference in the AI Function Block has an IST with a signal type "AIN" only. Several I/O Function Blocks are compatible with the same IST signal type.

For compatibility with Fieldbus I/O Function Block definitions, Fieldbus I/O Function Blocks have attributes such as XD_SCALE, OUT_SCALE which overlap with some of the signal properties in ISTs. When a valid IST-Reference is made, the configured values of these over-lapped Function Block attributes are ignored in the Run-time system and the corresponding properties from the IST are used instead. An engineer configuring Fieldbus I/O Function Blocks uses an indication of ignored attributes when a IST reference is in place. Such an indication is typically presented on a display as grayed out and non-editable text with values copied from the IST. The I/O Function Block holds a private setting for the ignored attributes which are typically downloaded and promptly overridden. If the IST-Reference is removed, the setting for these attributes retains utility.

I/O Cards, Ports and Devices are incorporated into a configuration by a user operating a user interface, either the Explorer™ or the Module Definition Editor. The channels on conventional I/O cards are called "ports" and treated as an I/O Port so that special case terminology for conventional I/O is avoided. The user interface also allows a user to delete I/O Cards, Ports or Devices. Multiple I/O Card types are supported including, for example, 8-chan MTL AI, 8-chan MTL AO, 8-chan MTL DI, 8-chan MTL DO, 4-chan MTL Thermocouple/RTD, 8-chan HART input, 8-chan HART output, and 4-chanSolenoid. Some I/O Card types have a combination of I/O Port types on the same I/O Card. Deletion of an I/O Card deletes all subordinate Ports. Deletion of an I/O Port deletes all subordinate Devices. Deletion of I/O Ports or I/O Devices does not delete related instrument signal tags (ISTs), but the path of the IST path to the associated I/O signal no longer is operable. If another I/O Port or I/O Device is created which has the same path, the IST automatically rebinds to the I/O Port or I/O Device, so long as the signal type is compatible.

A user can initiate the Install of an I/O subsystem, which installs or reinstalls all I/O Cards defined in the Subsystem. The user can initiate the Install of a single I/O Card, which installs the card properties and all properties for subordinate I/O Ports and I/O Devices.

The Explorer™ and the Module Definition Editor configure the I/O subsystem by accessing current signal values, status, and selected properties that are directly addressable as Attributes in the I/O subsystem. The user displays a graphic indicative of the current status of cards, ports, devices, and signal values and status by accessing the respective cards, ports, devices and signal values and status using device hierarchy attribute path addressing (for example, "CON1/IO1/C01/P01/FIELD_VAL").

I/O subsystem attributes are communicated using the physical device path (for example, CON1/IO1/C01/P01/

D01/FIELD_VAL) for addressing in communications between devices. Communication of I/O subsystem attributes is advantageously used to transmit attributes from a controller/multiplexer 110 to a workstation 102, 104, 106 as shown in FIG. 1C for display and from a first to a second controller/multiplexer 110 for virtual I/O handling.

Figure 16:
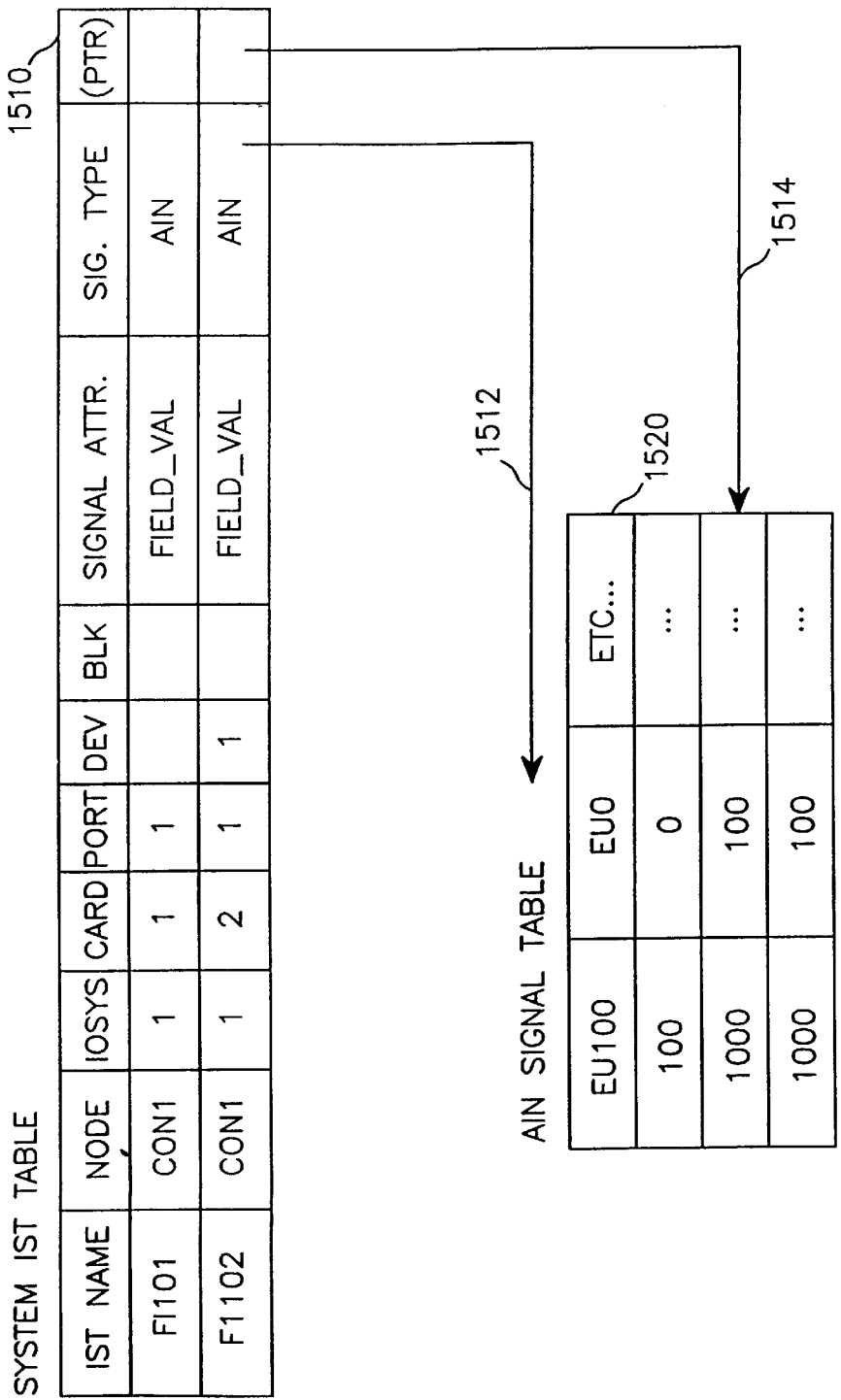
FIG. 16 is a block diagram which illustrates an organization of information for an instrument signal tag.

Referring to FIG. 16, a block diagram illustrates an organization of information for an instrument signal tag (IST). An system IST table 1510 contains information relating to an IST including path information and pointers to a system object. A first pointer 1512 designates a signal type which points to an attribute signal table 1520. A second pointer 1514 designates an entry in the attribute signal table 1520.

Accessing of information using device hierarchy attribute addressing advantageously allows system diagnostic displays to be designed and built for system integration checkout before Control Module work is complete. Device hierarchy attribute addressing also supports direct addressing of I/O signals from Modules, bypassing the use of I/O function blocks and avoiding I/O function block behavior. I/O Card, I/O Port and I/O Device identifiers are generally defined automatically according to slot position information and the like.

Figure 17:
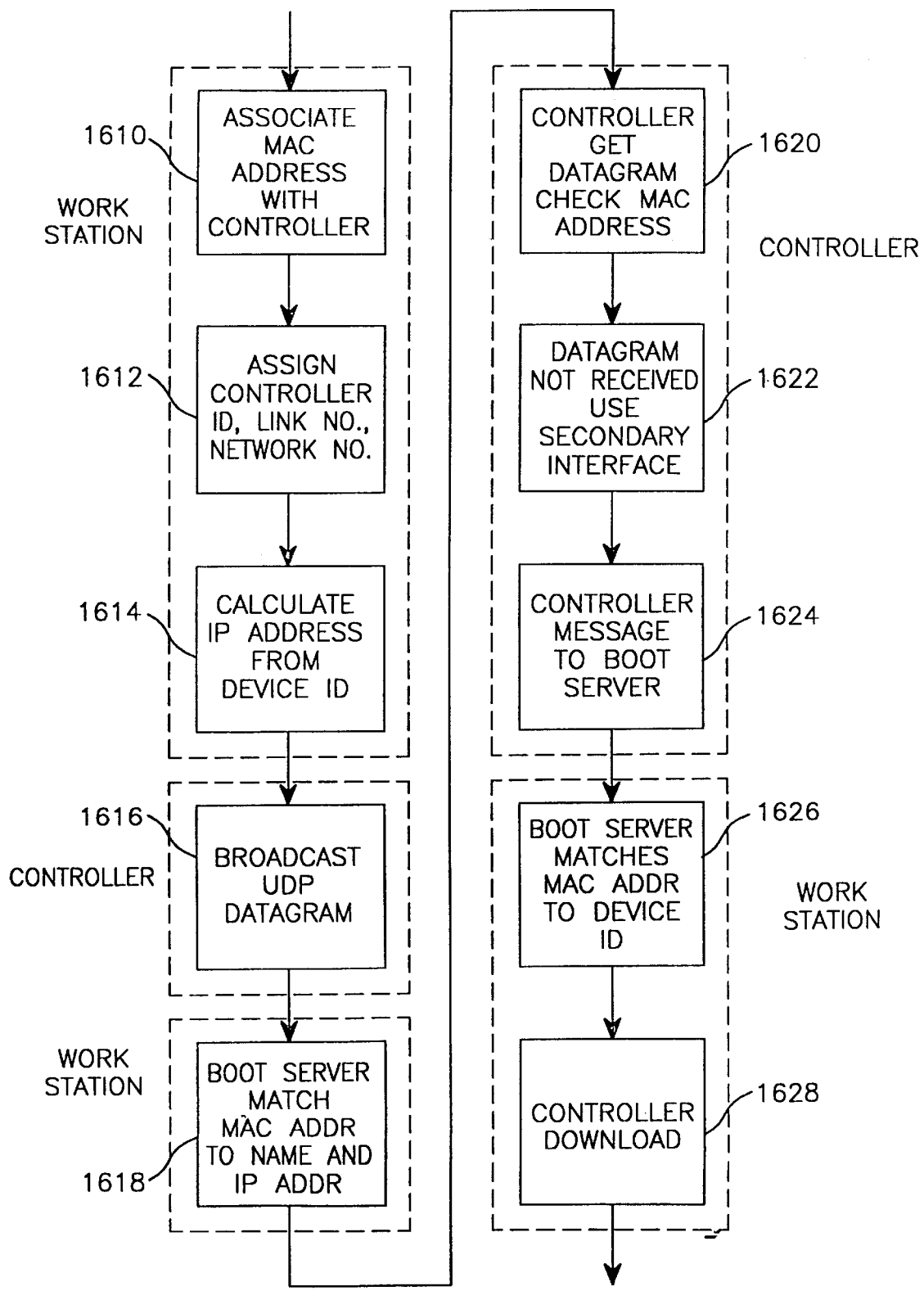
FIG. 17 is a flow chart illustrating a method for bootstrap loading a control system throughout a network in the process control environment.

Referring to FIG. 17, a flow chart illustrates a method for bootstrap loading a control system throughout a network in the process control environment 100, including the operations of assigning the controller/multiplexers 110 to a set of IP Addresses, a node name and other startup information that is not stored in flash ROMs of a controller/multiplexer 110. A process 1600 for assigning internet protocol (IP) Addresses to a Controller upon its initial bootup includes the step of associating a MAC address in a Boot server, a Windows NT™ workstation, with a controller/multiplexer name 1610. The MAC address alone designates the controller/multiplexer identity. In step 1612, the name of the controller/multiplexer is assigned an arbitrary device ID, and an ACN link number and a PCN network number that are determined by the cable attached to the controller/multiplexer. In step 1614, an IP address of a device is calculated from the device ID, the ACN link number and the PCN network number. In step 1616, a UDP datagram, which designates default primary and secondary IP addresses that are reserved for booting nodes and includes the controller/multiplexer MAC address in the UDP user data, is broadcast to a special UDP reserved boot port using the default primary IP address for the source address on the primary interface. In step 1618, the boot server matches the MAC address with the assigned name and IP addresses, and broadcasts the assigned name and IP addresses with an echo of the MAC address to the UDP boot port. By broadcasting, the problem of doing any routing or ARP static entry manipulation is avoided. In step 1620, the controller/multiplexer receives the datagram, checks the MAC address, and if the MAC address matches, sets the IP addresses and saves the node name and device ID. If the datagram is not received, the procedure is repeated using the secondary interface through the operation of branch step 1622. In step 1624, the controller/multiplexer, using the new address, sends a message to the boot server saying indicating that the controller/multiplexer is operational.

In step 1626, a user enters a Device Name, Device MAC Address, ACN Link Number and PCN Network Number. The device ID can be automatically assigned by configuration software. The communications subsystem calculates the devices three IP addresses from the configured ACN Link number, PCN Network Number and the assigned device ID.

In step 1628, controller/multiplexer or I/O card software is flash downloaded over the ACN network by passing messages and S-Record files between devices on the ACN.

Figure 18A:
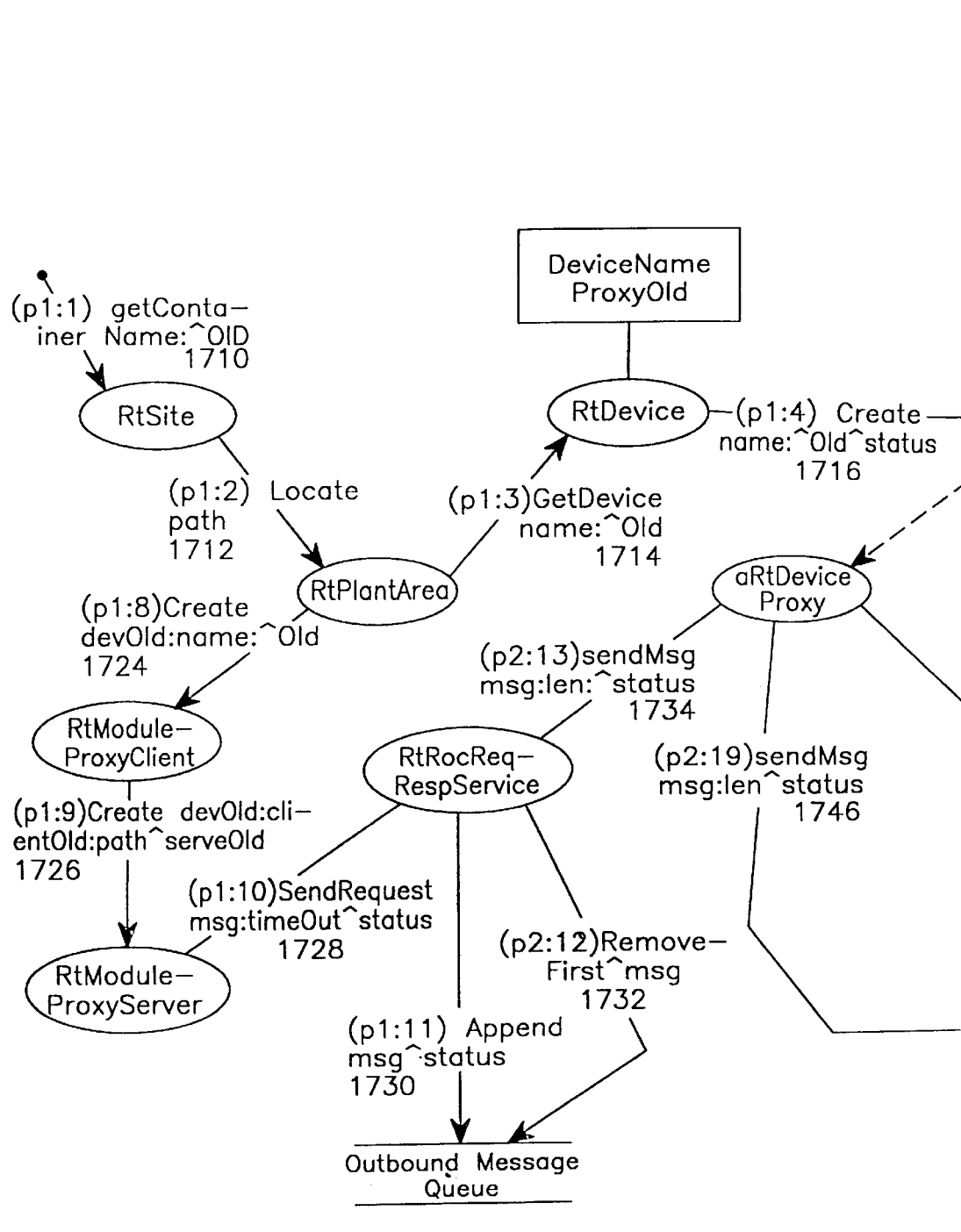
FIG. 18 is an object communication diagram illustrating a method for creating a device connection for an active, originating side of the connection.
Figure 18B:
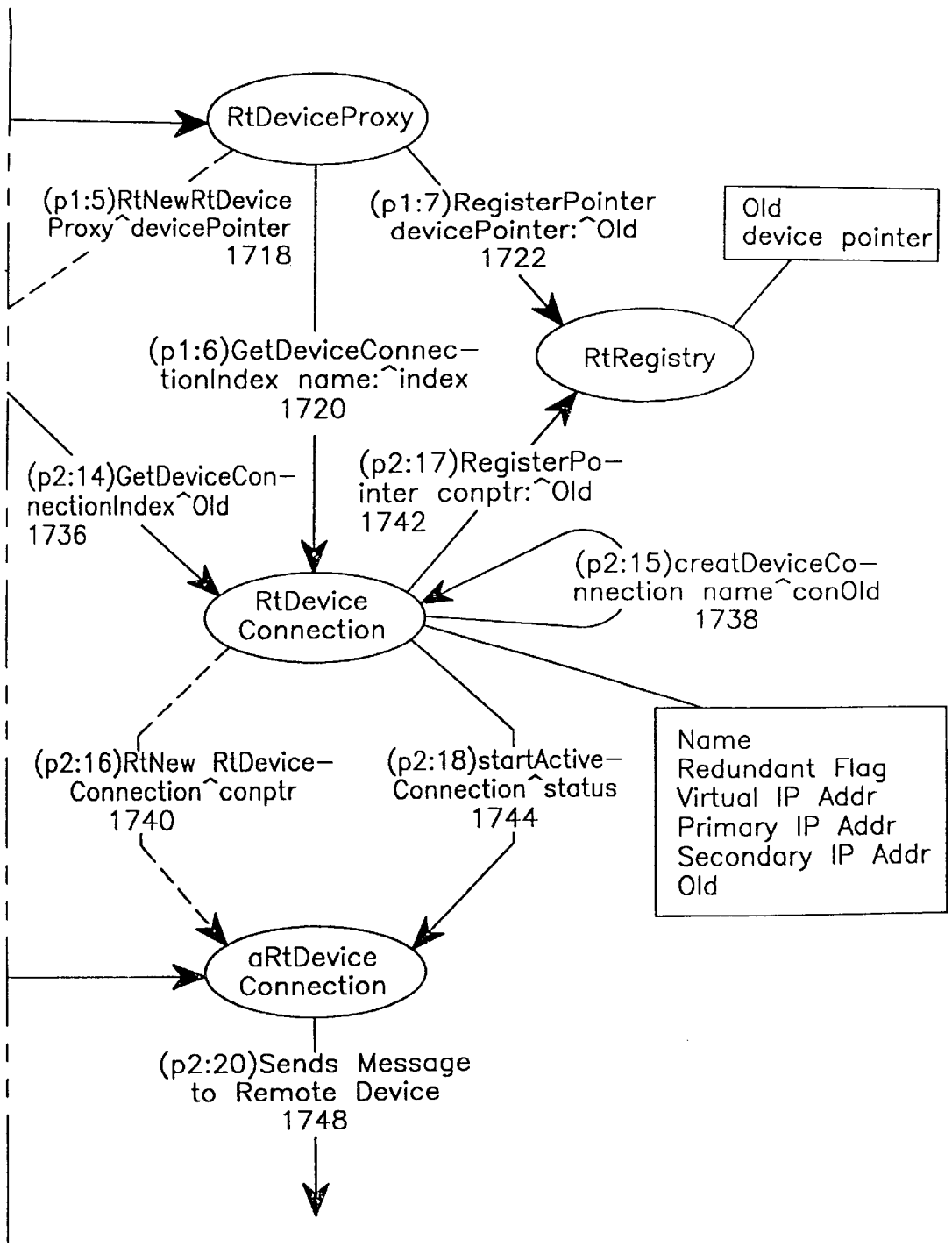

Referring to FIG. 18, an object communication diagram shows a method for creating a device connection for the active, originating side of a connection. An application program in either a workstation or a controller/multiplexer requests access to an attribute which is contained in another device. A UDP communications connection to the other device is established by the communication services so that the attribute can be accessed. Creation of a device connection spans two separate application programs. The application program which initiates the connection by requesting data located in another device and the Remote Object Communications (ROC) Services application program that actually sends the messages to the other device. If no connection exists when the ROC Services process is ready to send a message to a device, the ROC services create a connection to that device.

Prior to creating the device connection, a device to be connected has a valid Device Table containing the source device, is operating and includes an object RtDeviceConnection which monitors messages on the device connection port. After the device connection is created, a connection is established between the two devices and an RtDeviceConnection instance is created in the active device to handle the connection.

In step 1710, an application program sends a message getContainer to object RtSite which returns the object ID of the module found or created. In step 1712, object RtSite sends a Locate message to object RtPlantArea which locates the module and return its object ID. In step 1714, object RtSite sends a GetDevice message to object RtDevice which returns the object ID of the device containing the module. In step 1716, assuming that a proxy for the remote device does not exist, object RtDevice sends a Create message to object RtDeviceProxy. In step 1718, object RtDeviceProxy creates an instance of object RtDeviceProxy using template RtNew. In step 1720, object RtDeviceProxy asks object RtDeviceConnection to GetDeviceConnectionIndex which returns the index of the device name in the device connection table managed by object RtDeviceConnection. In step 1722, object RtDeviceProxy registers the pointer to the RtDeviceProxy instance for the connected device by sending a RegisterPointer message to the object RtRegistry and returns the device proxy Object ID to object RtDevice. In step 1724, object RtPlantArea sends a Create message to object RtModuleProxyClient to create a proxy client for the remote module. In step 1726, object RtModuleProxyClient sends a Create message to object RtModuleProxyServer to create a proxy server for the module in the remote device. In step 1728, object RtModuleProxyServer builds a create proxy server message and asks object RtRocReqRespService to SendRequest to the remote device. In step 1730, object RtRocReqRespService Appends the message to the Outbound Message Queue for the ROC Communications Services process to send to the remote device. In step 1732, object RtRocReqRespService in the ROC Comm Services process issues a RemoveFirst command to the Outbound Message Queue and gets the create proxy server message. In step 1734, the RtRocReqRespService sends the message by issuing a sendMsg command to the aRtDeviceProxy instance for the destination device. In step 1736, the aRtDeviceProxy instance issues a GetDeviceConnection command to RtDeviceConnection to get the Object ID for the RtDeviceConnection instance for the destination device. Assuming that a device connection does not already exist, in step 1738, object RtDeviceConnection performs a createDeviceConnection. In step 1740, object RtDeviceConnection creates an instance of RtDeviceConnection using template RtNew. In step 1742, object RtDeviceConnection registers the pointer to the RtDeviceConnection instance by sending a RegisterPointer message to the object RtRegistry and returns the device connection Object ID to object RtDeviceConnection. In step 1744, object RtDeviceConnection sends a startActiveConnection message to the aRtDeviceConnection instance. The aRtDeviceConnection instance performs the necessary steps to establish the connection to the other device. In step 1746, the RtDeviceProxy instance issues a sendMsg to the aRtDeviceConnection instance to send the create server message to the remote device. In step 1748, the aRtDeviceConnection instance sends the message to the remote device over the newly created connection.

Figure 19:
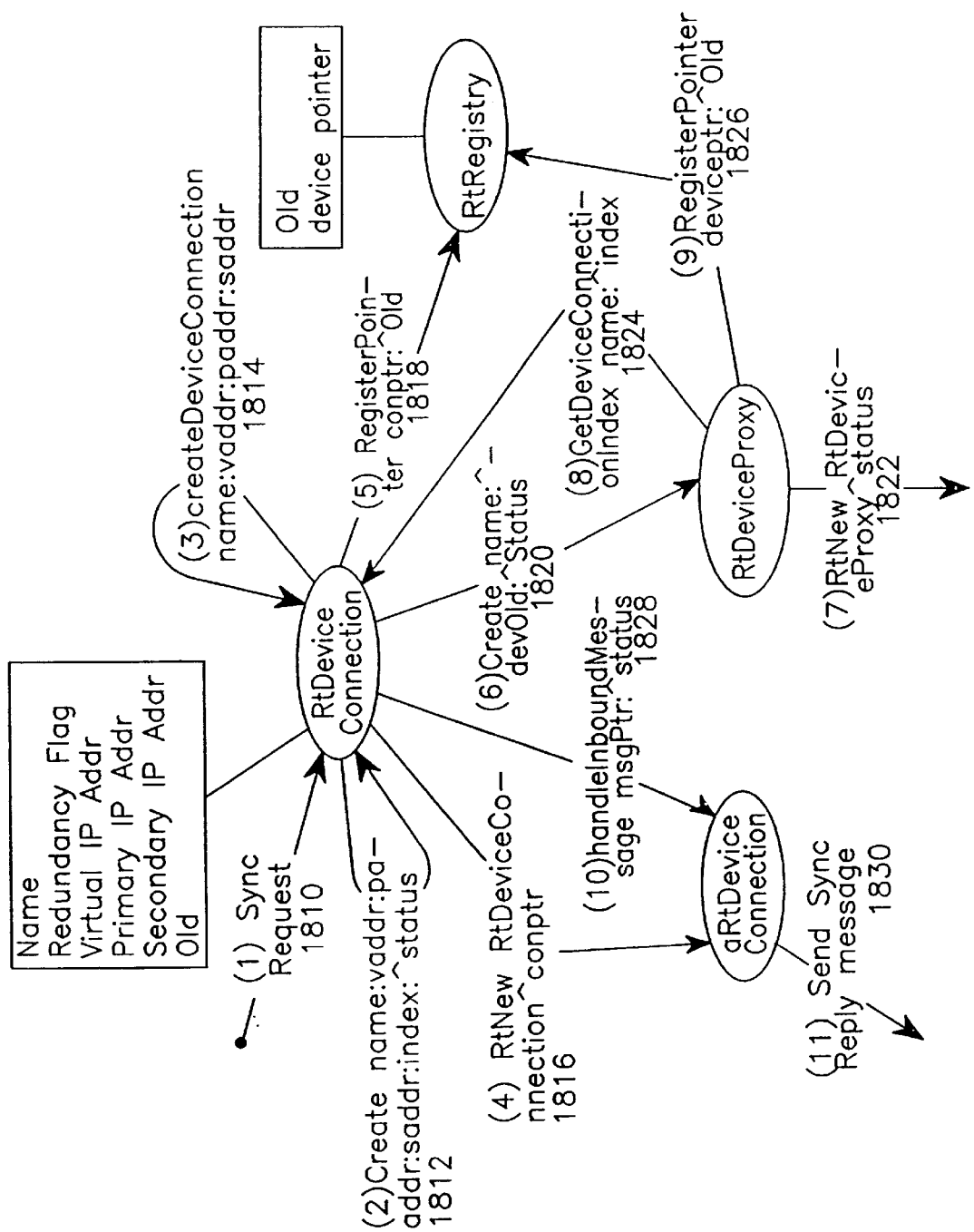
FIG. 19 is an object communication diagram illustrating a method for creating a device connection for a passive, listening side of the connection.

Referring to FIG. 19, an object communication diagram shows a method for creating a device connection for the passive, listening side of a connection. A request to establish a device connection is received from another workstation or controller/multiplexer. The communications services establishes a UDP communications connection with the requesting device.

Previous to creation of the connection, a device to be connected to is operating and contains an object RtDeviceConnection which is ready to establish a connection. Object RtDevice Connection exists in the device and is listening for input messages in the form of a sync request. After the connection is created, a connection is established between the two devices and an RtDeviceConnection instance is created in the passive device to handle the connection.

In step 1810, object RtDeviceConnection receives a sync request message from a remote device. In step 1812, object RtDeviceConnection sends a Create message to object RtDeviceConnection to create a connection to the requesting device. Assuming that a device connection does not already exist, object RtDeviceConnection performs a createDeviceConnection in step 1814. In step 1816, object RtDeviceConnection creates an instance of RtDeviceConnection using template RtNew. In step 1818, object RtDeviceConnection registers the pointer to the RtDeviceConnection instance by sending a RegisterPointer message to the RtRegistry and returns the device connection object ID to object RtDeviceConnection. In step 1820, object RtDeviceConnection sends a Create message to object RtDeviceProxy to create a device proxy for the requesting device. In step 1822, object RtDeviceProxy creates an instance of RtDeviceProxy using template RtNew. In step 1824, object RtDeviceProxy sends a GetDeviceConnectionIndex message to the object RtDeviceConnection to have the index of the device in the device connection table managed by RtDeviceConnection for later use. In step 1826, object RtDeviceProxy registers the pointer to the RtDeviceProxy instance by sending a RegisterPointer message to the RtRegistry and returns the device proxy object ID to RtDeviceConnection. In step 1828, object RtDeviceConnection passes the sync request message to the aRtDeviceConnection instance for processing via the handleInboundMessage method. In step 1830, object aRtDeviceConnection sends a sync response message back to the remote device to indicate successful completion of the Device Connection creation.

Figure 20:
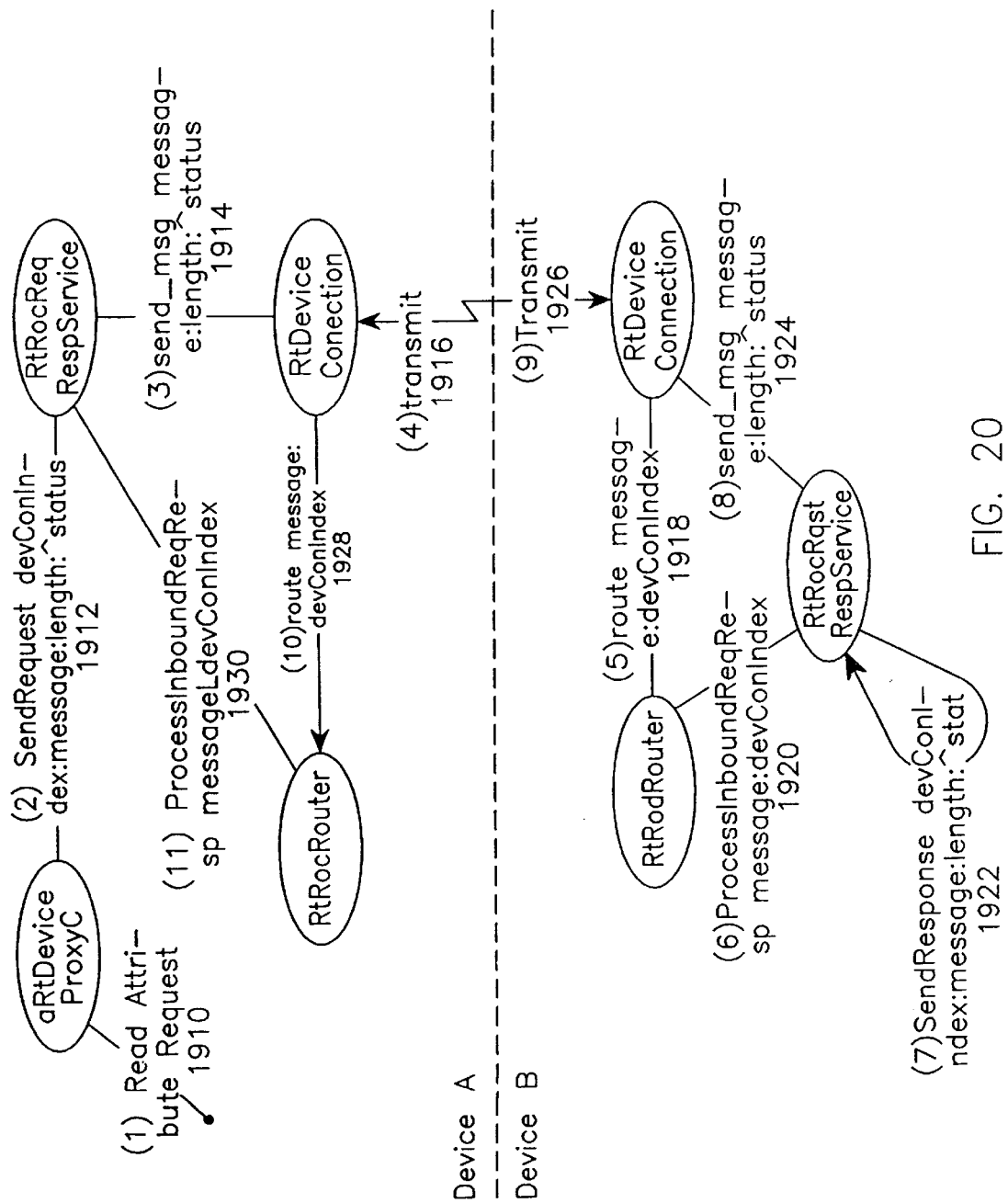
FIG. 20 is an object communication diagram illustrating a method for sending request/response messages between devices.

Referring to FIG. 20, an object communication diagram illustrates a method for sending request/response messages between devices. The remote object communications (ROC) service in one device sends a request message to the ROC service in another device. The request message is processed and a response message is sent back to the originating device.

Prior to sending messages, a UDP device connection is established between devices. Following the sending of request/response messages between devices, a response message from a remote device has been received and is ready for processing by ROC services.

In step 1910, a read attribute request is issued by an application program to an aRtDeviceProxy instance associated with a remote device. In step 1912, the aRtDeviceProxy instance builds a request message to be sent to the remote device to read the attribute value and asks the RtRocReqRespService to send the message using the SendRequest method. In step 1914, object RtRocReqRespService sends the message to the instance of RtDeviceConnection associated with the connection to the remote device using the send_msg method. In step 1916, the instance of RtDeviceConnection then transmits the message to the remote device over the device connection. In step 1918, the instance of RtDeviceConnection in the remote device receives the message and requests the RtRocRouter class to route the message to the correct inbound message service. In step 1920, object RtRocRouter determines that the message is a request/response message and requests object RtRocReqRespService to ProcessInboundReqResp. After the message is processed by the ROC services and the message consumer a response message is built, in step 1922 object RtRocRqstRespService sends the response message to the originating device using the SendResponse method. In step 1924, the outbound message queue processing of RtRocReqRespService sends the response message to the instance of RtDeviceConnection associated with the connection to the source device using the send_msg method. In step 1926, the instance of RtDeviceConnection then transmits the response message back to the original device. In step 1928, the instance of RtDeviceConnection in the original device receives the message and requests the RtRocRouter class to route the message to the correct inbound message service. In step 1930, object RtRocRouter determines that the message is a request/response message and requests RtRocReqRespService to ProcessInboundReqResp.

Figure 21A:
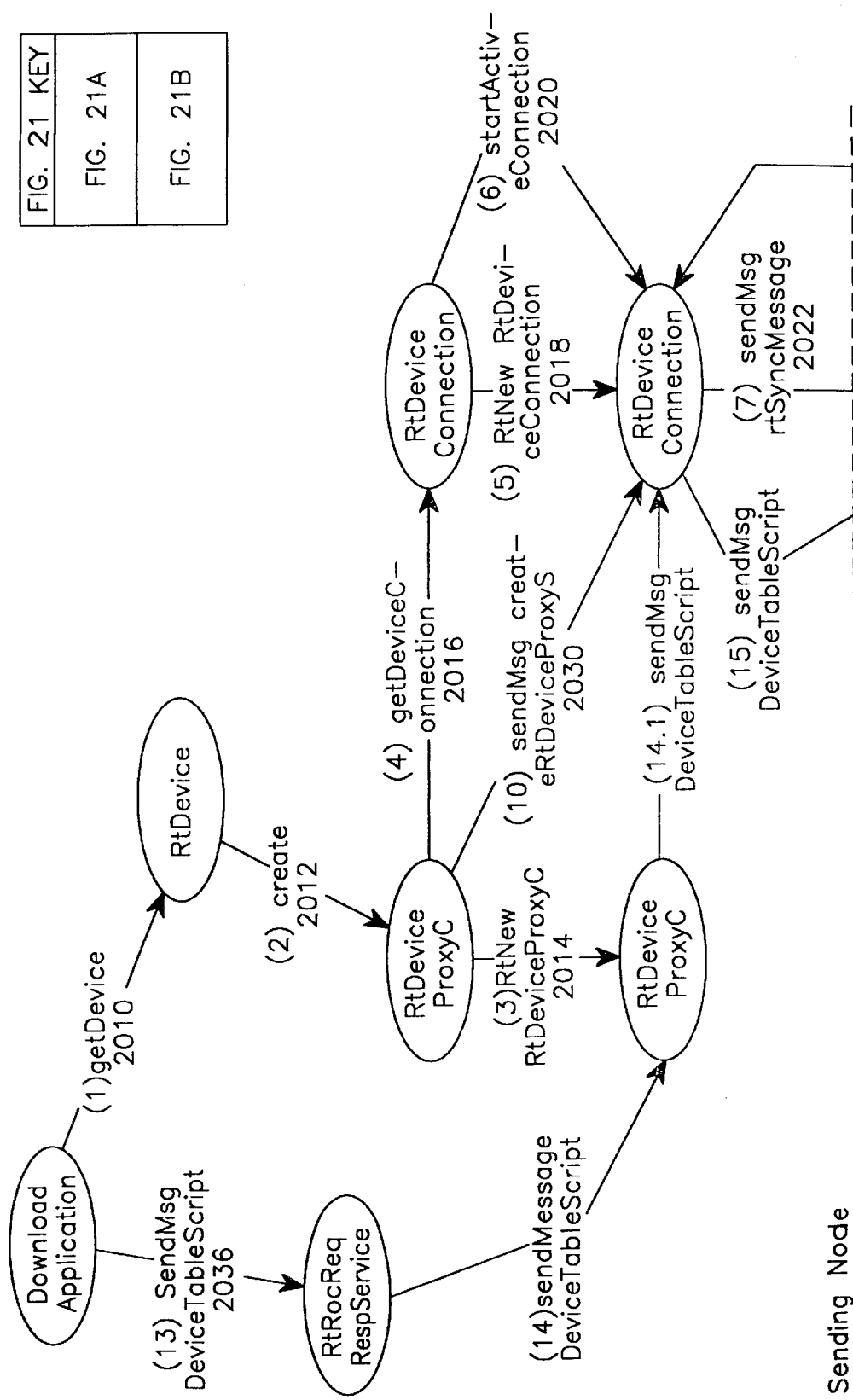
FIG. 21 is an object communication diagram illustrating a method downloading a network configuration.
Figure 21B:
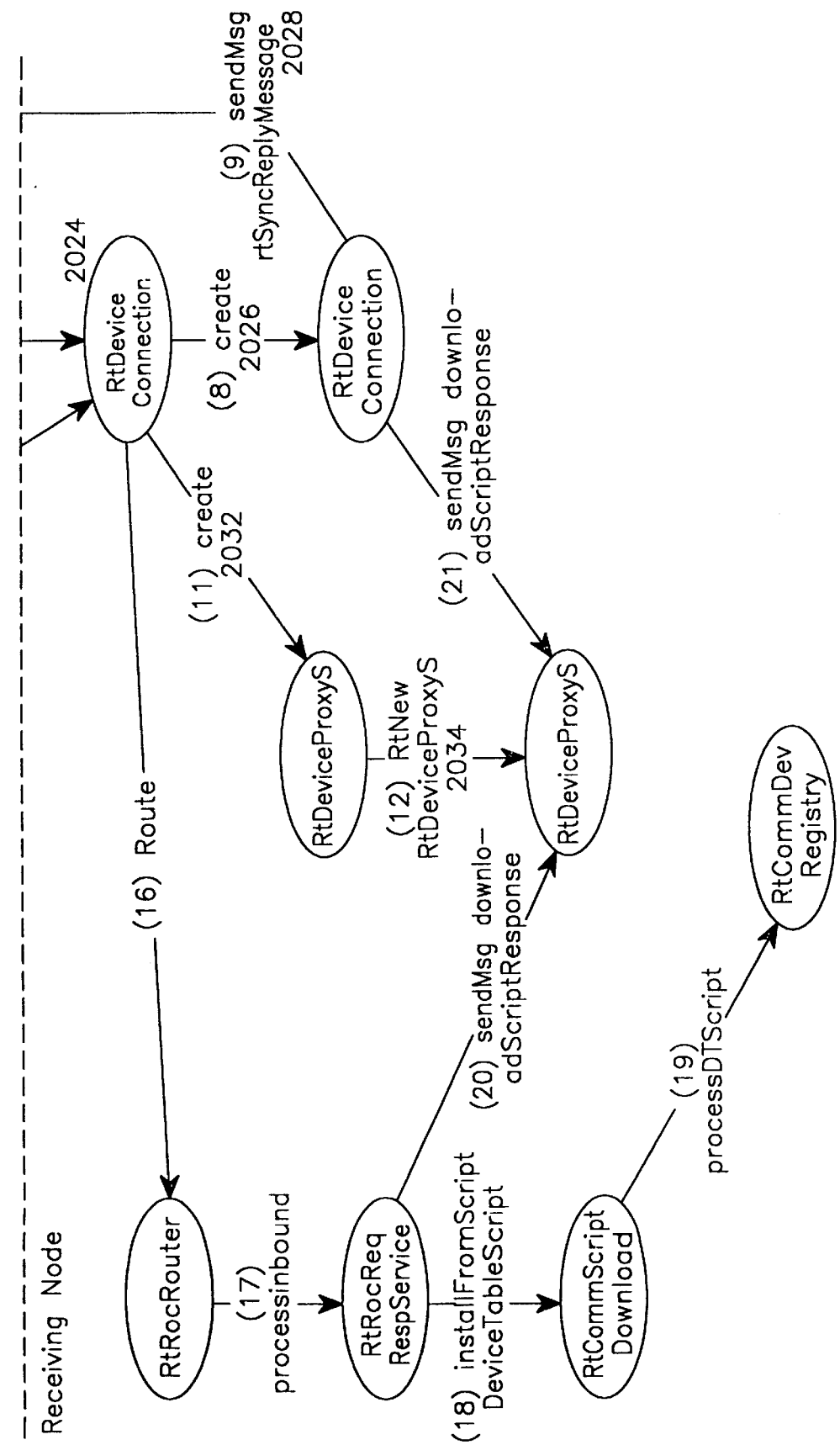

Referring to FIG. 21 an object communication diagram illustrates a method downloading a network configuration. A user, following completion of the device configuration for a system, initiates a download to a controller/multiplexer. A device table configuration script is built by the configuration application. Using communications services, the configuration application establishes a device connection with the controller/multiplexer to receive the download and sends a download script to the controller device. The controller/multiplexer receives the download script messages and processes the device table. In step 2010, a configuration download application program builds remote object communications (ROC) script download messages containing the device table download script. In step 2012, the Download application issues a GetDevice message to RtDevice to get the Object ID for the RtDeviceProxy for the remote device. In step 2014, the RtDeviceProxy does not yet exist so a Create message is sent to RtDeviceProxyC to create the necessary device proxy object. In step 2016, RtDeviceProxyC sends a GetDeviceConnIndex message to RtDeviceConnection to get the index of the device connection for the remote device in the device connection table. In step 2018, the device connection does not yet exist so aRtDeviceConnection object is created to manage the connection to the remote device. A lookup is performed in the database to find the remote device entry. The device communications data (for example, ID and IP Addresses) is retrieved from the database and a new entry is added to the configuration devices connection table. This connection is marked permanent in the connection table since the device initiated the connection. In step 2020, a startActiveConnection message is sent to the RtDeviceConnection object to establish a connection to the remote device. In step 2022, the aRtDeviceConnection sends an RtSyncMessage to the remote device. In step 2024, the remote device receives the RtSyncMessage and attempts to find an entry in the device connection table for the sending device. In step 2026, no entry is found so a new entry is added to the device connection table for the sending device and aRtDeviceConnection object is created to handle the connection in the receiving device. In step 2028, a RtSyncReplyMessage is created and sent back to the sending device containing the device connection index from the device table. The device connection is now established and ready to send and receive messages. In step 2030, the RtDeviceProxyC sends a create RtDeviceProxyS message to the remote device. In step 2032, the RtDeviceProxyS is created in the remote device. In step 2034, the Download Application sends the download scripts to the remote device via RtRocReqRespServices using the SendMsg call. In step 2036, RtCommScriptDownload receives the Device Table script and processes each device table item and stores the data in a database Registry used to hold configuration data. For controller/mulitplexers this processing is used to create RtDeviceConnection objects and add the objects to the device connection table, allowing the memory to be acquired on download rather than subsequently.

The digital control system program 115 includes a diagnostic program and display routine for viewing diagnostic information relating to a process in a coherent manner, whether the diagnostic information is derived from a Fieldbus device or a nonFieldbus device. The digital control system program 115 advantageously incorporates diagnostic information relating to all devices within the process control environment 100 and presents this information to a user in a uniform manner using the diagnostic display routine so that the control strategy and the diagnostic information are presented to a user as if all control actions and diagnostic information were performed or generated at a single location.

Figure 22:
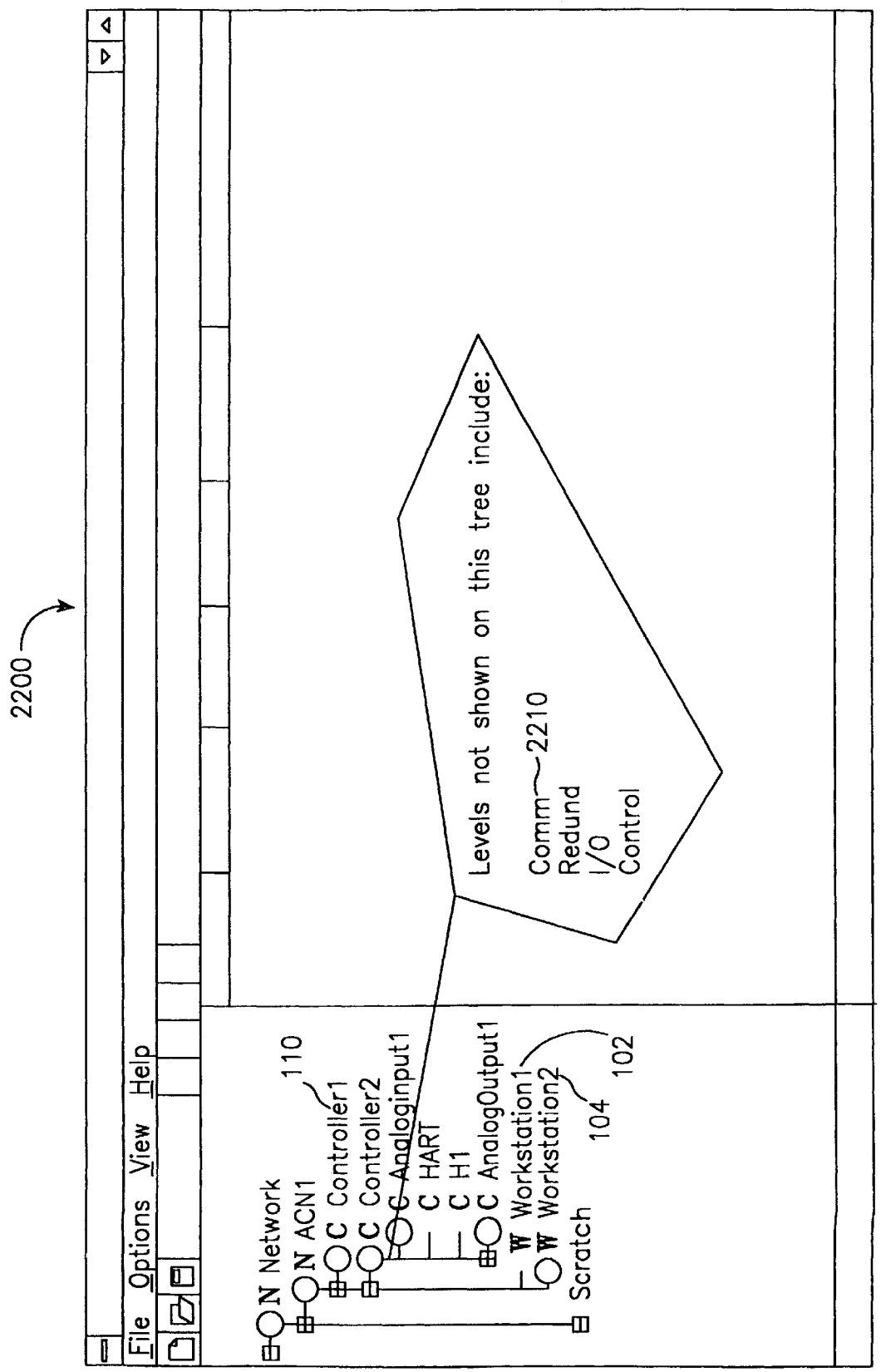
FIG. 22 is a pictorial view of a front-of-screen display which illustrates a flowchart of the operations of a diagnostic display routine.

Referring to FIG. 22, a pictorial view of a front-of-screen display illustrates a flowchart of the operations of a diagnostic display routine 2200 including a communication diagnostics program 2210. A user graphically views the status and integrity of workstations, controllers and network links within the process control system 100 using easily-recognized icons. The diagnostic display routine 2200 also generates summary status information for a device or network link segment. The diagnostic display routine 2200 displays detailed internal integrity information concerning devices connected to the network, including packets sent and received, the number of connections and the like. Some diagnostic information is accessed via modem to implement remote diagnostics functionality.

A workstation 102 or 104 and controller/multiplexer 110 function in combination to supply detailed diagnostic information about the status of the communications subsystem in connected devices including detailed integrity information about the status of the ACN communications links, device connections, Ethernet statistics, and communications stack diagnostic information. A diagnostic check of communication functionality is also supported. The communication diagnostics 2210 support three levels of diagnostics information including basic diagnostics for the entire network, diagnostic information for a single device and diagnostic information for a single device connection.

At the basic network diagnostic level, the communication diagnostics 2210 gather information from all network devices and present the information to a user. The communication diagnostics 2210 collect information from remote controller/multiplexers 110 on demand or as a background task executing periodically. The communication diagnostics 2210 send network communications status requests to a diagnostic port of a particular device to determine integrity of the communications path to that device.

A response to a network communications status request contains communications integrity information including device type information indicative of whether the device is a controller or workstation, and primary and secondary status summary information. The Connection Status Summary, which is set to "Bad" if an error exists on the link, is added as an attribute to a Communications Subsystem Module, allowing a user to display these values on the operator interface upon request.

The communication diagnostics 2210 request diagnostic information from each device connected into the process control environment 100 so that the status of the communications links between the device and a remote device are displayed.

The communications diagnostics 2210 monitor and display diagnostic information for a single device to supply detailed diagnostic information about communications for a particular device, including link status information for device connections and the Ethernet statistics for Ethernet interfaces in the device. The communications diagnostics 2210 request the device communications status using an appropriate diagnostic remote object communications (ROC) message. The device communications status includes information such as a Device Table Index, a Device ID, a Device Connection State Ready, Synching, ACK Pending, Closed), a Primary Device Address, a Secondary Device Address, a Link Status and diagnostic information for a single device connection.

Ethernet statistical information is held in counters which start counting when the device is booted and are not reset until reboot of the device. The counts are implemented as attributes to the Communications subsystem module as part of the module attributes and include input error information including numbers of total input errors, input CRC errors and input overrun errors. Output error information includes numbers of total output errors, output late collisions, output collisions exceeding a preselected number, output overrun errors and output carrier lost errors. Other counts include the numbers of packets received, packets sent, bytes received, bytes sent, broadcast packets received, broadcast packets sent, unknown protocol messages received, transmit deferrals, single collision transmits and multiple collision transmits.

The communications diagnostics 2210 also monitor and display detailed diagnostic information for a particular device connection in a particular device. When a user requests device connection statistics, the communications diagnostics 2210 designate a destination device ID for a connection. Device connection statistics contain link status information and statistical information for the designated device connection, including a Device Connection State (Ready, Synching, ACK Pending, Closed), a Remote Primary Address (Primary ACN IP Address for the destination device), a Remote Secondary Address (Secondary ACN IP Address for this device or 0), a Primary Link Status (Good/Bad), a Secondary Link Status (Good/Bad). The statistics also include counts of messages received on Primary Link, messages received on Secondary Link, messages sent on Primary Link, messages sent on Secondary Link, Synchs Sent, Synchs Received, ACK Time-outs on Primary Link, and ACK Time-outs on Secondary Link.

The communications diagnostics 2210 support checking of a communications path between two devices in a network. A first device sends a message, such as an evoking message, over a specified communication link to a remote device. The remote device echoes the message back to the sender. A successful evoking message and echo are indicative that the communications subsystem is functional in the remote device. This interaction is different from a normal TCP/IP ping which is handled completely by an Ethernet hardware driver.

Figure 23:
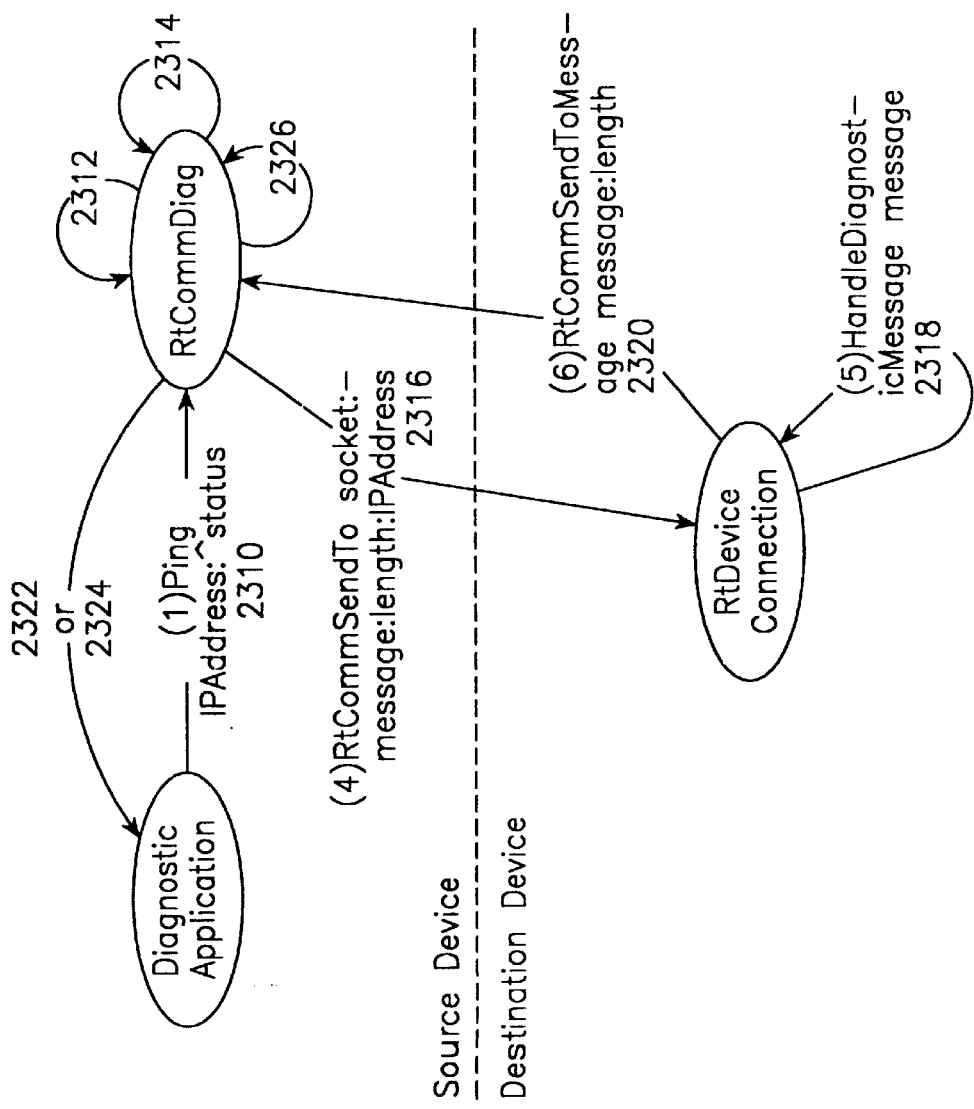
FIG. 23 is an object communication diagram illustrating a method for one device to check whether another device exists on a network.

Referring to FIG. 23, an object communication diagram illustrates a method for one device to check whether another device exists on a network. A diagnostic application program which is either part of the process control environment or a stand-alone application monitors to determine whether a remote device exists on an ACN network and, if so, whether the remote device is capable of communication. The diagnostic application program sends a message to the remote device and expects to receive the message echoed from the remote device or a time-out.

In step 2310, a diagnostic application program sends a Ping message to object RtCommDiag requesting that a communication inquiry (ping) be performed to a specified device name or address. In step 2312, object RtCommDiag creates a communications socket to perform the inquiry. In step 2314, object RtCommDiag creates an RtEchoMessage to send to the remote device. In step 2316, object RtCommDiag sends the RtEchoMessage to the specified device using RtCommSendTo and waits for the message to be echoed back from the remote device. In step 2318, object RtDeviceConnection in the remote device receives the RtEchoMessage and processes the message using the HandleDiagnosticMessage method. In step 2320, object RtDeviceConnection immediately returns an RtEchoMessage with a diag code of echo response to object RtCommDiag in the source device using RtCommSentToMessage. In step 2322, object RtCommDiag receives the echo response message and returns a successful status to the diagnostic application. If no response is received from the remote device, in step 2324, object RtCommDiag returns a failed status to the diagnostic application. In step 2326, object RtCommDiag closes the socket created to perform the inquiry.

Figure 24A:
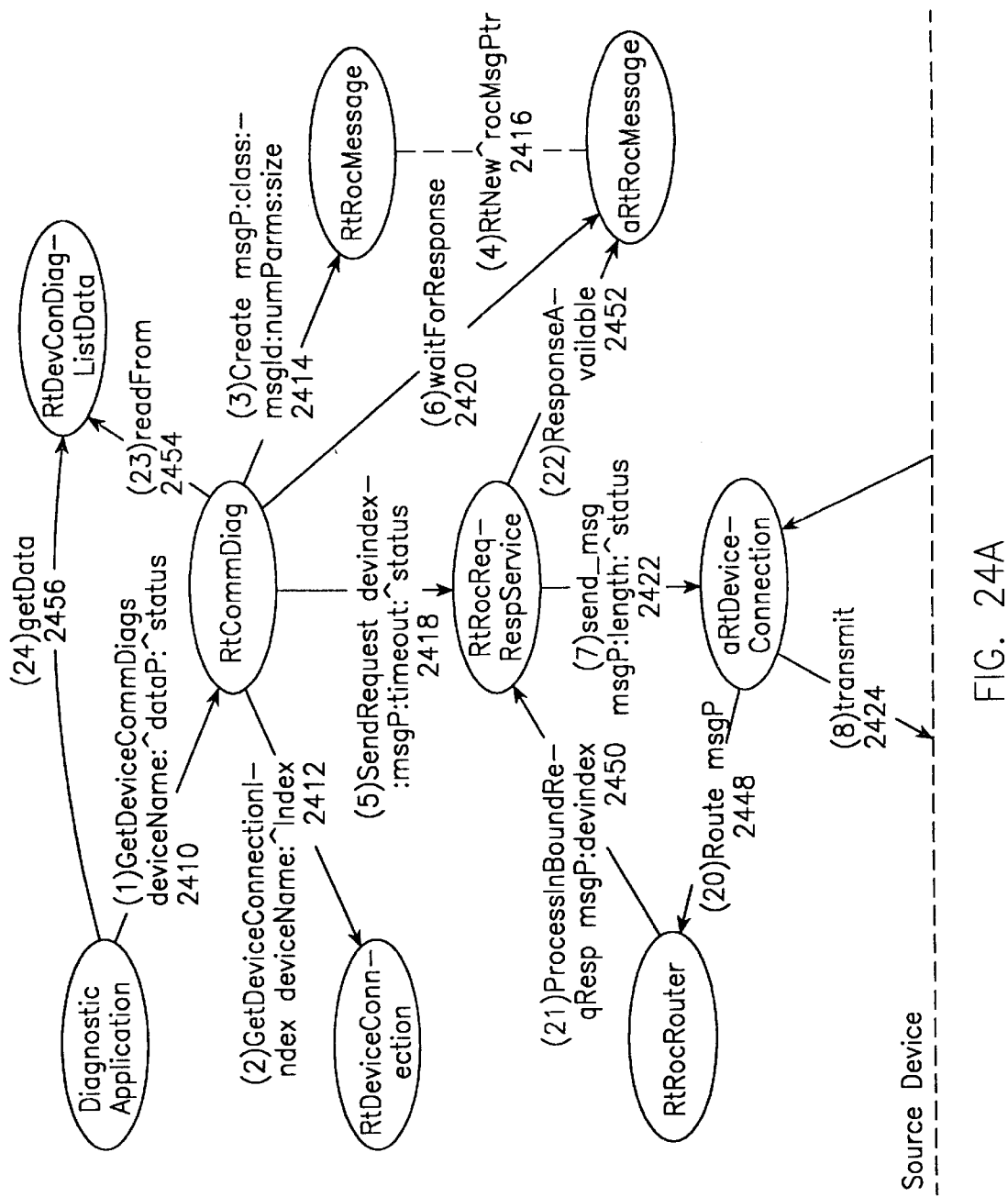
FIG. 24 is an object communication diagram illustrating a method for requesting device communications diagnostics.
Figure 24B:
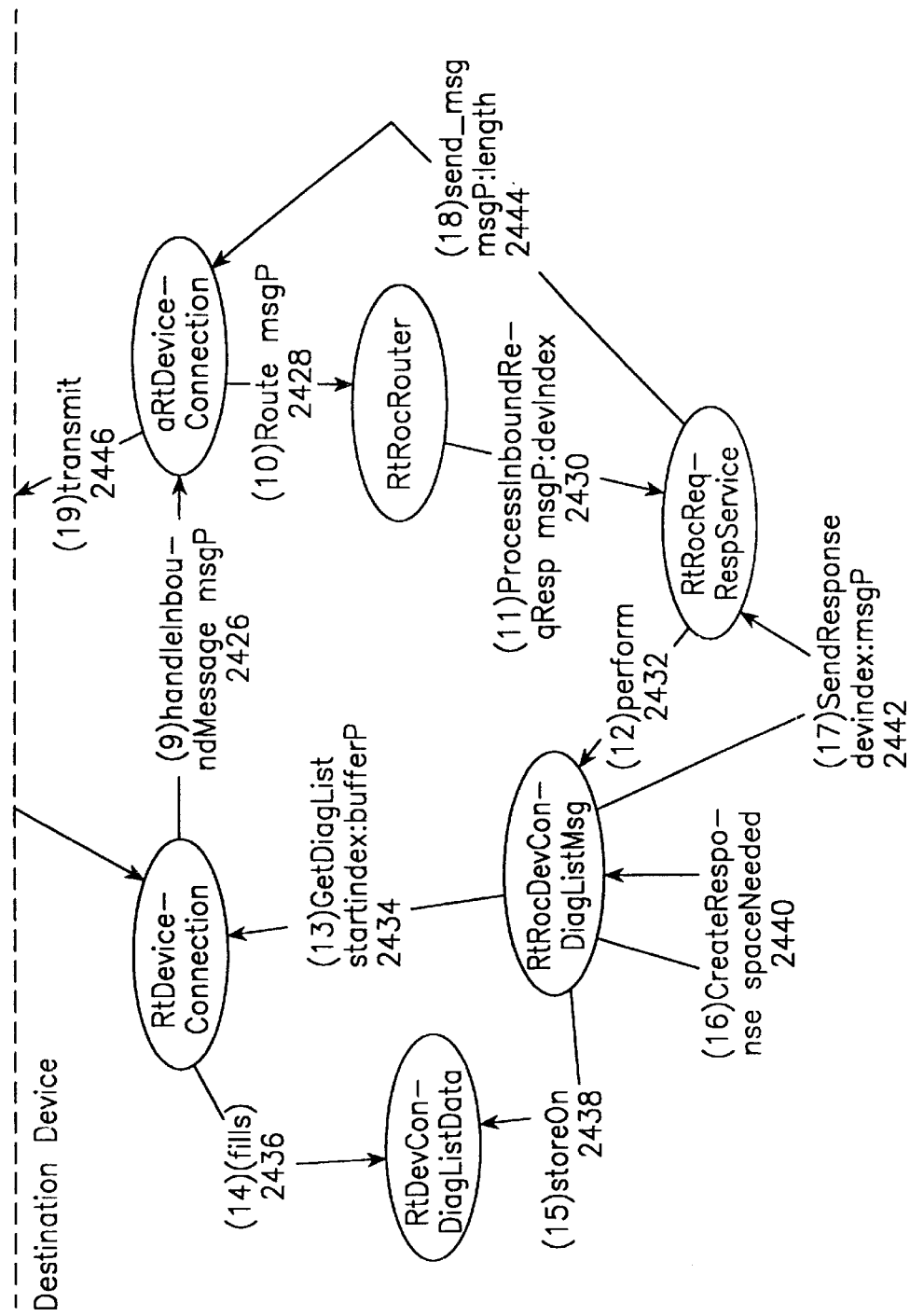

Referring to FIG. 24, an object communication diagram illustrates a method for requesting device communications diagnostics. A diagnostic application program requests, accesses and displays the status of all device connections in a remote device. The diagnostic application program sends a request for the required diagnostic information to the remote device and waits for a response. Once the response is received, all device connections and device status in the remote device are displayed to the user. This information may be communicated in multiple messages so that the diagnostic application program makes multiple requests for diagnostic data.

In step 2410, a Diagnostic Application program sends a GetDeviceCommDiags request to object RtCommDiag to request communications diagnostics for the device connections in the remote device. In step 2412, object RtCommDiag sends a GetDeviceConnectionIndex message to object RtDeviceConnection to request the device connection table index for the remote device. In step 2414, object RtCommDiag issues a Create to object RtRocMessage to create a message to be used to request diagnostic information. In step 2416, object RtRocMessage creates a new instance of aRtRocMessage to be used for the diagnostic request. In step 2418, object RtCommDiag builds the message to be sent and issues a SendRequest to RtRocReqRespService to send the message to the remote device. In step 2420, object RtCommDiag issues a waitForResponse to the aRtRocMessage instance created for the diagnostic request message. In step 2422, object RtRocReqRespService performs a send_msg on the instance of aRtDeviceConnection associated with the remote device. In step 2424, the aRtDeviceConnection instance transmits the request message to the remote device. In step 2426, object RtDeviceConnection in the remote device receives the message and issues a handleInboundMessage to the aRtDeviceConnection instance associated with the sending device. In step 2428, the aRtDeviceConnection instance passes the message off to RtRocRouter via the Route method for processing. In step 2430, object RtRocRouter responds to the message by issuing a ProcessInboundReqResp to the RtRocReqRespService. In step 2432, the RtRocReqRespService determines the message type from the request message ID and issues a perform command on the RtRocDevConDiagListMsg message. In step 2434, RtRocDevConDiagListMsg sends a GetDiagList message to object RtDeviceConnection to get the device connection diagnostic data for the device connections in this device. In step 2436, object RtDeviceConnection puts the diagnostic data into a data buffer using various fill routines provided by the utility class RtDevConDiagListData. In step 2438, RtRocDevConDiagListMsg then performs a CreateResponse to create the response message containing the diagnostic data. In step 2440, RtRocDevConDiagListMsg issues a storeOn message to RtDevConDiagListData to put the diagnostic data into the response message. In step 2442, RtRocDevConDiagListMsg sends the response message back to the requesting device through RtRocReqRespService using the SendResponse method. In step 2444, RtRocReqRespService performs a send_msg to the aRtDeviceConnection instance associated with the requesting device. In step 2446, the aRtDeviceConnection instance transmits the response message back to the requesting device. In step 2448, the aRtDeviceConnection instance in the requesting device receives the response message from RtDeviceConnection via a handleInboundMessage. The response message is then send to RtRocRouter using the Route method. In step 2450, RtRocRouter performs a ProcessInboundReqResp on RtRocReqRespService. In step 2452, RtRocReqRespService informs the aRtRocMessage instance that the response to the original request for diagnostic data is available. In step 2454, RtCommDiag issues a readFrom to RtDevConDiagListData to retrieve the diagnostic data from the response message. In step 2456, RtCommDiag passes the data back to the Diagnostic Application which issues getData messages to RtDevConDiagListData to retrieve the diagnostic data for display. The requesting device returns a buffer containing the general diagnostics for all device connections actively in place.

Figure 25B:
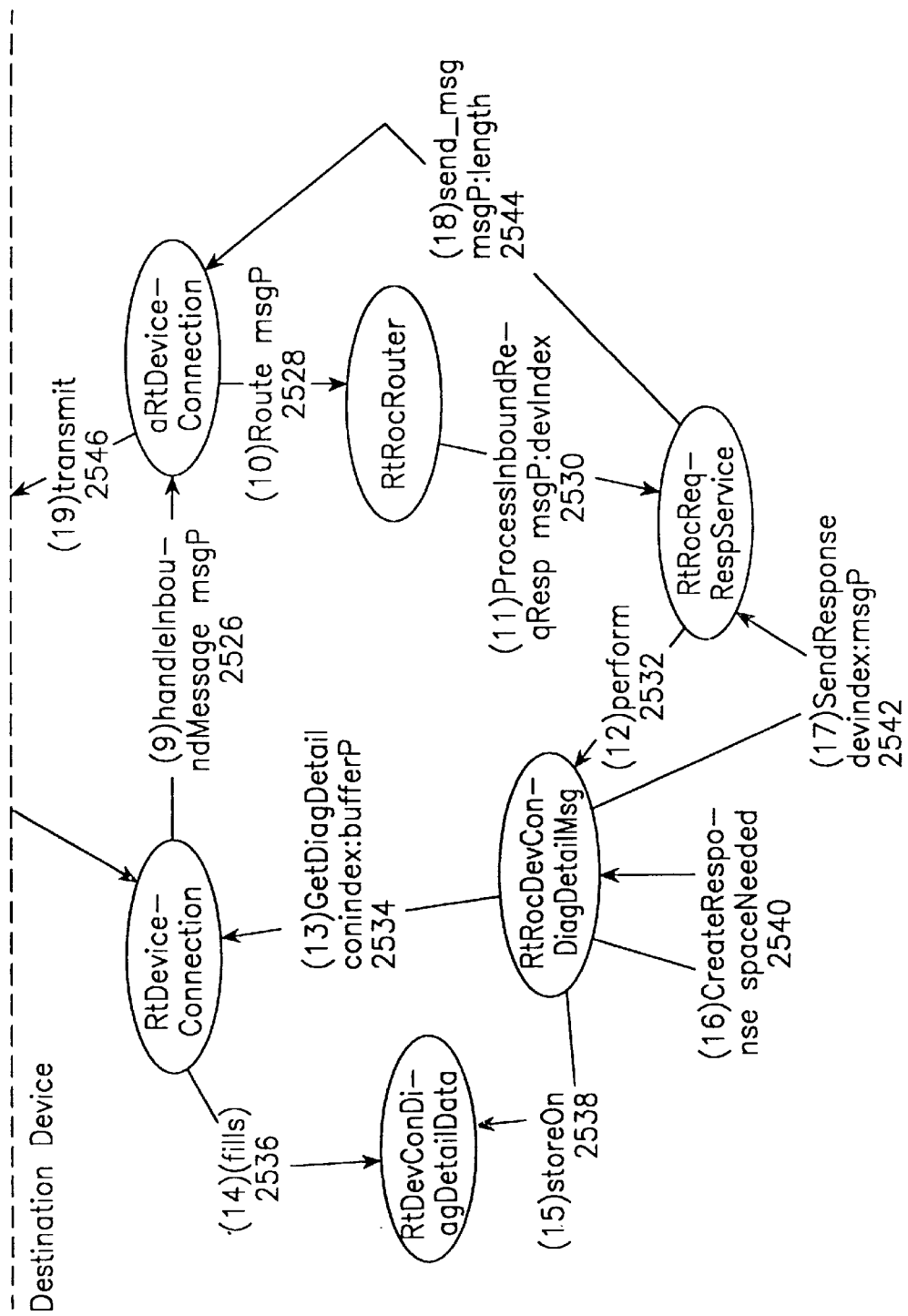
FIG. 25 is an object communication diagram illustrating a method for requesting device connection communications diagnostics.

Referring to FIG. 25, an object communication diagram illustrates a method for requesting device connection communications diagnostics. A diagnostic application program requests, accesses and displays the detailed status of a single device connection existing in a remote device. The diagnostic application program sends a request for device connection statistics information to the remote device and waits for a response. Once the response is received, the device connection statistics for the device connection are displayed to the user. In step 2510, a Diagnostic Application program sends a GetDeviceConDiags request to RtCommDiag to get the device connection statistics for a specific device connection in the remote device. In step 2512, RtCommDiag sends a GetDeviceConnectionIndex message to RtDeviceConnection to get the device connection table index for the remote device. In step 2514, RtCommDiag issues a Create to RtRocMessage to create a message to be used to request the diagnostic information. In step 2516, RtRocMessage creates a new instance of aRtRocMessage to be used for the diagnostic request. In step 2518, RtCommDiag builds the message to be sent and issues a SendRequest to RtRocReqRespService to send the message to the remote device. In step 2520, RtCommDiag issues a waitForResponse to the aRtRocMessage instance created for the diagnostic request message. In step 2522, RtRocReqRespService performs a send_msg on the instance of aRtDeviceConnection associated with the remote device. In step 2524, the aRtDeviceConnection instance transits the request message to the remote device. In step 2526, RtDeviceConnection in the remote device receives the message and issues a handleInboundMessage to the aRtDeviceConnection instance associated with the sending device. In step 2528, the aRtDeviceConnection instance passes the message to RtRocRouter via the Route method for processing. In step 2530, RtRocRouter determines that the message is a request response type message and issues a ProcessInboundReqResp to the RtRocReqRespService. In step 2532, the RtRocReqRespService determines the message type from the request message ID and issues a perform command on the RtRocDevConDiagDetailMsg message. In step 2534, RtRocDevConDiagDetailMsg sends a GetDiagDetail message to RtDeviceConnection to get the device connection statistics for the requested device connection. In step 2536, RtDeviceConnection puts the diagnostic data into a data buffer using various fill routines provided by the utility class RtDevConDiagDetailData. In step 2538, RtRocDevConDiagDetailMsg performs a CreateResponse to create the response message containing the diagnostic data. In step 2540, RtRocDevConDiagDetailMsg issues a storeOn message to RtDevConDiagDetailData to put the diagnostic data into the response message. In step 2542, RtRocDevConDiagDetailMsg sends the response message back to the requesting device through RtRocReqRespService using the SendResponse method. In step 2544, RtRocReqRespService performs a send_msg to the aRtDeviceConnection instance associated with the requesting device. In step 2546, the aRtDeviceConnection instance transmits the response message back to the requesting device. In step 2548, the aRtDeviceConnection instance in the requesting device receives the response message from RtDeviceConnection via a handleInboundMessage. The response message is sent to RtRocRouter using the Route method. In step 2550, RtRocRouter performs a ProcessInboundReqResp on RtRocReqRespService. In step 2552, RtRocReqRespService informs the aRtRocMessage instance that the response to the original request for diagnostic data is available. In step 2554, RtCommDiag issues a readFrom to RtDevConDiagDetailData to retrieve the diagnostic data from the response message. In step 2556, RtCommDiag passes the data back to the Diagnostic Application which issues getData messages to RtDevConDiagDetailData to retrieve the diagnostic data for display.

While the invention has been described with reference to various embodiments, it will be understood that these embodiments are illustrative and that the scope of the invention is not limited to them. Many variations, modifications, additions and improvements of the embodiments described are possible.

What is claimed is:

1. A process control system comprising:
    a field device including a source of diagnostic information;
    a controller coupled to the field device;
    a workstation coupled to the controller and including a user interface; and
    a software system implementing a diagnostic monitoring and display program for the process control system, the diagnostic monitoring and display program including:
        a configuration routine for user-selectively defining and creating the diagnostic modules and event attributes defining the diagnostic information of the diagnostic modules, and for user-selectively distributing the diagnostic modules among the field device, the controller, and the workstation;
        a plurality of diagnostic modules selectively defined and created via the user interface using the configuration routine for access using the diagnostic monitoring and display program, the diagnostic modules operating mutually independently and in parallel accessing the source of diagnostic information; and
        a display routine for accessing diagnostic information from the plurality of diagnostic modules and displaying the diagnostic information accessed from the plurality of diagnostic modules uniformly for all diagnostic modules in the process control system so that the diagnostic information relating to a process that operates both in the controller and in the field device is displayed in the same manner regardless of the source of the diagnostic information.

2. A process control system according to claim 1, wherein: the plurality of diagnostic modules are selectively defined and created, and selectively distributed by a user.

3. A process control system according to claim 1, wherein: the field device includes a control element; and
    a diagnostic module of the plurality of diagnostic modules is distributed to the field device and monitors a condition or status of the control element.

4. A process control system according to claim 1 wherein the field device is a Fieldbus standard device including a control element; and
    a diagnostic module of the plurality of diagnostic modules is distributed to the control element and accesses Fieldbus standard diagnostic information indicative of a condition or status of the control element.

5. A process control system according to claim 1, further comprising:
    a plurality of field devices including a Fieldbus standard field device and a non-Fieldbus standard device.

6. A process control system according to claim 1, further comprising:
    a storage for storing device information including configuration information and status information relating to the field device; wherein
    the display routine further accesses, in addition to the diagnostic information, the configuration and status information from the storage and displays the configuration information, status information and diagnostic information.

7. A process control system according to claim 6 wherein the storage is a common storage for device information in the process control system for single access updating and maintenance.

8. A process control system according to claim 7, further comprising:
a network coupled to the controller; and
an external node coupled to the controller through the network so that device information including real-time data, history information, event statistics, configuration data and diagnostic information are accessed using network standard communications.

9. A process control system according to claim 1, further comprising:
a network coupled to the controller; and
a remote display coupled to the controller through the network so that the diagnostic information is accessed by the remote display.

10. A process control system according to claim 1, further comprising:
a network coupled to the controller including a plurality of separate communications links for carrying network traffic and traffic directed among the field device, the controller and the workstation.

11. A process control system comprising:
a field device including a source of diagnostic information;
a controller coupled to the field device;
a workstation coupled to the controller and including a user interface; and
a software system implementing a diagnostic monitoring and display program for the process control system, the diagnostic monitoring and display program including:
a configuration routine for user-selectively and interactively:
defining and creating new types of control modules and diagnostic modules and modifying previously existing types of control modules and diagnostic modules;
defining and setting control module attributes, the control modules and control attributes specifying a control strategy;
defining and setting diagnostic module attributes; and
selectively distributing the control modules and the diagnostic modules among the field device, the controller, and the workstation;
a plurality of control modules for selectively implementing a process control strategy,
a plurality of diagnostic modules selectively defined and created via the user interface using the configuration routine for access using the diagnostic monitoring and display program, the diagnostic modules operating mutually independently and in parallel accessing the source of diagnostic information; and
a display routine for accessing diagnostic information from the plurality of diagnostic modules and a control scheme from the plurality of control modules and for respectively displaying the diagnostic information accessed from the plurality of diagnostic modules and the control strategy accessed from the plurality of control modules so that the diagnostic information and the control information are accessed in the same manner.

12. A process control system according to claim 11 wherein the diagnostic information accessed from the plurality of diagnostic modules and the control scheme accessed from the control modules are accessed and displayed in a uniform manner.

13. A process control system according to claim 11 wherein a diagnostic module is a primitive module.

14. A process control system comprising:
a plurality of field devices, a field device of the plurality of field devices including a source of diagnostic information;
a plurality of controllers, a controller of the plurality of controllers being coupled to a field device of the plurality of field devices;
a workstation coupled to the controller and including a user interface; and
a software system implementing a diagnostic monitoring and display program for the process control system, the diagnostic monitoring and display program including:
a configuration routine for user-selectively and interactively:
defining and creating new types of diagnostic modules and modifying previously existing types of diagnostic modules;
defining and setting diagnostic module attributes; and
selectively distributing the diagnostic modules among the field device, the controller, and the workstation;
a plurality of diagnostic modules selectively defined and created via the user interface using the configuration routine for access using the diagnostic monitoring and display program, the diagnostic modules operating mutually independently and in parallel; and
a display routine for accessing diagnostic information from the plurality of diagnostic modules operating mutually independently on the field devices, the controllers and the workstation and displaying the diagnostic information accessed from the plurality of diagnostic modules uniformly so that the diagnostic information relating to a process that operates more than one of the field devices, the controllers and the workstation is displayed as being generated at a single location.

15. A process control system according to claim 14, wherein:
the plurality of diagnostic modules are selectively defined and created and selectively distributed by a user.

16. A process control system according to claim 14, wherein:
a field device of the plurality of field devices includes a control element; and
a diagnostic module of the plurality of diagnostic modules is distributed to the field device and monitors a condition or status of the control element.

17. A process control system according to claim 14, further comprising:
a storage for storing device information including configuration information and status information relating to the field device; wherein
the display routine further accesses, in addition to the diagnostic information, the configuration and status information from the storage and displays the configuration information, status information and diagnostic information.

18. A process control system according to claim 17 wherein the storage is a common storage for device information in the process control system for single access updating and maintenance.

19. A process control system according to claim 18, further comprising:
a network coupled to the controller; and an external node coupled to the controller through the network so that device information including real-time data, history information, event statistics, configuration data and diagnostic information are accessed using network standard communications.

20. A process control system according to claim 14, further comprising:
   a network coupled to the controller; and
   a remote display coupled to the controller through the network so that the diagnostic information is accessed by the remote display.

21. A process control system according to claim 14, further comprising:
   a network coupled to the controller including a plurality of separate communications links for carrying network traffic and traffic directed among the plurality of field devices, the plurality of controllers, and the workstation.

22. A process control system comprising:
   a plurality of field devices, a field device of the plurality of field devices including a source of diagnostic information;
   a plurality of control means for controlling a field device, a control means of the plurality of control means being coupled to a field device of the plurality of field devices;
   an interface means coupled to the plurality of control means for interfacing the control process system to a user;
   a configuration means for user-selectively and interactively:
      defining and creating new types of diagnostic means and modifying previously existing types of diagnostic means;
      defining and setting diagnostic means attributes; and
      selectively distributing the diagnostic means among the field device, the controller, and the workstation;
   a diagnostic means for implementing a process control strategy, the diagnostic means being selectively defined and created as a plurality of diagnostic modules, the plurality of diagnostic modules upon creation being selectively distributed among the field device, control means and interface means, the diagnostic modules operating mutually independently and in parallel; and
   a display means for accessing diagnostic information from the plurality of diagnostic means operating mutually independently on the field devices, the controllers and the workstation and displaying the diagnostic information accessed from the plurality of diagnostic modules uniformly so that the diagnostic information relating to a process that operates more than one of the field devices, the controllers and the workstation is displayed as being generated at a single location.

23. A process control system according to claim 22, wherein:
   the diagnostic means is selectively defined and created as diagnostic modules and selectively distributed among the plurality of field devices, the plurality of control means and the interface means by a user.

24. A process control system according to claim 22, wherein:
   a field device of the plurality of field devices includes a field device control means for controlling field device operations; and
   the diagnostic means includes a diagnostic module that is distributed to and operational upon the field device control means.

25. A process control system according to claim 22 wherein
   a field device of the plurality of field devices is a Fieldbus standard device including a field device diagnostic means for accessing Fieldbus diagnostic operations; and
   a diagnostic module is distributed to the field device control means and operates as a Fieldbus standard function block.

26. A process control system according to claim 22 wherein
   the plurality of field devices include a Fieldbus standard field device and a non-Fieldbus standard device.

27. A process control system according to claim 22, further comprising:
   a storage for storing device information including configuration information and status information relating to the field device; wherein
   the display routine further accesses, in addition to the diagnostic information, the configuration and status information from the storage and displays the configuration information, status information and diagnostic information.

28. A process control system according to claim 27 wherein the storage is a common storage for device information in the process control system for single access updating and maintenance.

29. A process control system according to claim 22, further comprising:
   a remote display coupled to the controller so that the diagnostic information is accessed by the remote display.

30. A process control system comprising:
   a field device including a source of diagnostic information;
   a controller coupled to the field device;
   a workstation coupled to the controller and including a user interface; and
   a software system implementing a diagnostic monitoring and display program for the process control system, the diagnostic monitoring and display program including:
      a configuration routine for user-selectively and interactively:
         defining and creating new types of control strategy modules and modifying previously existing types of control strategy modules;
         defining and setting control module attributes, the control strategy modules and control module attributes specifying the control strategy; and
         distributing the control strategy modules among the field device, the controller, and the workstation;
      a control strategy for the process control system, the control strategy being selectively apportioned into a plurality of control strategy modules and selectively distributed among the field device, controller and workstation, the control strategy modules operating mutually independently and in parallel;
      a plurality of diagnostic modules selectively defined and created via the user interface for access using the diagnostic monitoring and display program, the plurality of diagnostic modules upon creation being selectively distributed among the field device, the controller and the workstation, the diagnostic modules operating mutually independently and in parallel accessing the source of diagnostic information; and a display routine for accessing diagnostic information from the plurality of diagnostic modules and displaying the control strategy and the diagnostic information accessed from the plurality of diagnostic modules uniformly so that the diagnostic information relating to a process that operates both in the controller and in the field device is displayed as being generated at a single location.

31. A process control system according to claim 30, wherein:

the plurality of control strategy modules and diagnostic modules are selectively defined and created, and selectively distributed by a user.

32. A process control system according to claim 30, wherein:

the field device includes a control element;

a diagnostic module of the plurality of diagnostic modules is distributed to the field device; and a control strategy of the plurality of control strategies is selectively defined and created, and selectively distributed by a user.

33. A process control system according to claim 30 wherein the field device is a Fieldbus standard device including a control element;

a diagnostic module of the plurality of diagnostic modules is distributed to the control element and accesses Fieldbus standard diagnostic information to monitor a condition or status of the control element; and a control strategy module is distributed to the control element and operates as a Fieldbus standard function block.

34. A process control system according to claim 30, further comprising:

a plurality of field devices including a Fieldbus standard field device and a non-Fieldbus standard device.

35. A process control system according to claim 30, further comprising:

a storage for storing device information including configuration information and status information relating to the field device; wherein the display routine further accesses, in addition to the diagnostic information, the configuration and status information from the storage and displays the configuration information, status information and diagnostic information.

36. A process control system according to claim 35 wherein the storage is a common storage for device information in the process control system for single access updating and maintenance.

37. A computer program product comprising:

a computer usable medium having computable readable code embodied therein for controlling a process control system including a source of diagnostic information, a controller coupled to a field device, and a workstation coupled to the controller and including a user interface, the executing program code implementing a diagnostic monitoring and display program for the process control system, the diagnostic monitoring and display program including:

a configuration routine for user-selectively and interactively:

defining and creating new types of diagnostic modules and modifying previously existing types of diagnostic modules;

defining and setting diagnostic module attributes; and selectively distributing the diagnostic modules among the field device, the controller and the workstation:

a plurality of diagnostic modules selectively defined and created via the user interface using the configuration routine for access using the diagnostic monitoring and display program, and a display routine for accessing diagnostic information from the plurality of diagnostic modules and displaying the diagnostic information accessed from the plurality of diagnostic modules uniformly for all diagnostic modules in the process control system so that the diagnostic information relating to a process that operates both in the controller and in the field device is displayed in the same manner regardless of the source of the diagnostic information.

38. An article of manufacture storing the computer program product according to claim 37.

39. A computer program product comprising:

a computer usable medium having computable readable code embodied therein for controlling a process control system including a field device having a source of diagnostic information, a controller coupled to the field device, a workstation coupled to the controller, and a user interface, the executable program code implementing a diagnostic monitoring and display program for the process control system, the diagnostic monitoring and display program including:

a configuration routine for user-selectively and interactively:

defining and creating new types of control modules and diagnostic modules and modifying previously existing types of control modules and diagnostic modules;

defining and setting control module attributes, the control modules and control attributes specifying a control strategy;

defining and setting diagnostic module attributes; and selectively distributing the control modules and the diagnostic modules among the field device, the controller, and the workstation;

a plurality of control modules for selectively implementing a process control strategy;

a plurality of diagnostic modules selectively defined and created via the user interface for access using the diagnostic monitoring and display program, the diagnostic modules operating mutually independently and in parallel accessing the source of diagnostic information; and a display routine for accessing diagnostic information from the plurality of diagnostic modules and a control scheme from the plurality of control modules and for respectively displaying the diagnostic information accessed from the plurality of diagnostic modules and the control strategy accessed from the plurality of control modules so that the diagnostic information and the control information are accessed in the same manner.

40. An article of manufacture storing the computer program product according to claim 39.

* * * * *